US008780113B1

(12) United States Patent
Ciurea et al.

(10) Patent No.: US 8,780,113 B1
(45) Date of Patent: Jul. 15, 2014

(54) SYSTEMS AND METHODS FOR PERFORMING DEPTH ESTIMATION USING IMAGE DATA FROM MULTIPLE SPECTRAL CHANNELS

(71) Applicant: Pelican Imaging Corporation, Mountain View, CA (US)

(72) Inventors: Florian Ciurea, San Jose, CA (US); Kartik Venkataraman, San Jose, CA (US); Gabriel Molina, Palo Alto, CA (US); Dan Lelescu, Morgan Hill, CA (US)

(73) Assignee: Pelican Imaging Corporation, Santa Clara, CA (US)

( * ) Notice: Subject to any disclaimer, the term of this patent is extended or adjusted under 35 U.S.C. 154(b) by 0 days.

(21) Appl. No.: 14/144,458

(22) Filed: Dec. 30, 2013

Related U.S. Application Data

(63) Continuation of application No. 13/972,881, filed on Aug. 21, 2013, now Pat. No. 8,619,082.

(60) Provisional application No. 61/780,906, filed on Mar. 13, 2013, provisional application No. 61/691,666, filed on Aug. 21, 2012.

(51) Int. Cl.
*G06T 15/00* (2011.01)
*G06K 9/00* (2006.01)

(52) U.S. Cl.
USPC .......................................... 345/427; 382/154

(58) Field of Classification Search
USPC ........................................... 345/427; 382/154
See application file for complete search history.

(56) References Cited

U.S. PATENT DOCUMENTS 8,180,145 B2 * 5/2012 Wu et al. ....................... 382/154

* cited by examiner

*Primary Examiner* — Kee M Tung
*Assistant Examiner* — Haixia Du
(74) *Attorney, Agent, or Firm* — KPPB LLP

(57) ABSTRACT

Systems in accordance with embodiments of the invention can perform parallax detection and correction in images captured using array cameras. Due to the different viewpoints of the cameras, parallax results in variations in the position of objects within the captured images of the scene. Methods in accordance with embodiments of the invention provide an accurate account of the pixel disparity due to parallax between the different cameras in the array, so that appropriate scene-dependent geometric shifts can be applied to the pixels of the captured images when performing super-resolution processing. In a number of embodiments, generating depth estimates considers the similarity of pixels in multiple spectral channels. In certain embodiments, generating depth estimates involves generating a confidence map indicating the reliability of depth estimates.

30 Claims, 33 Drawing Sheets

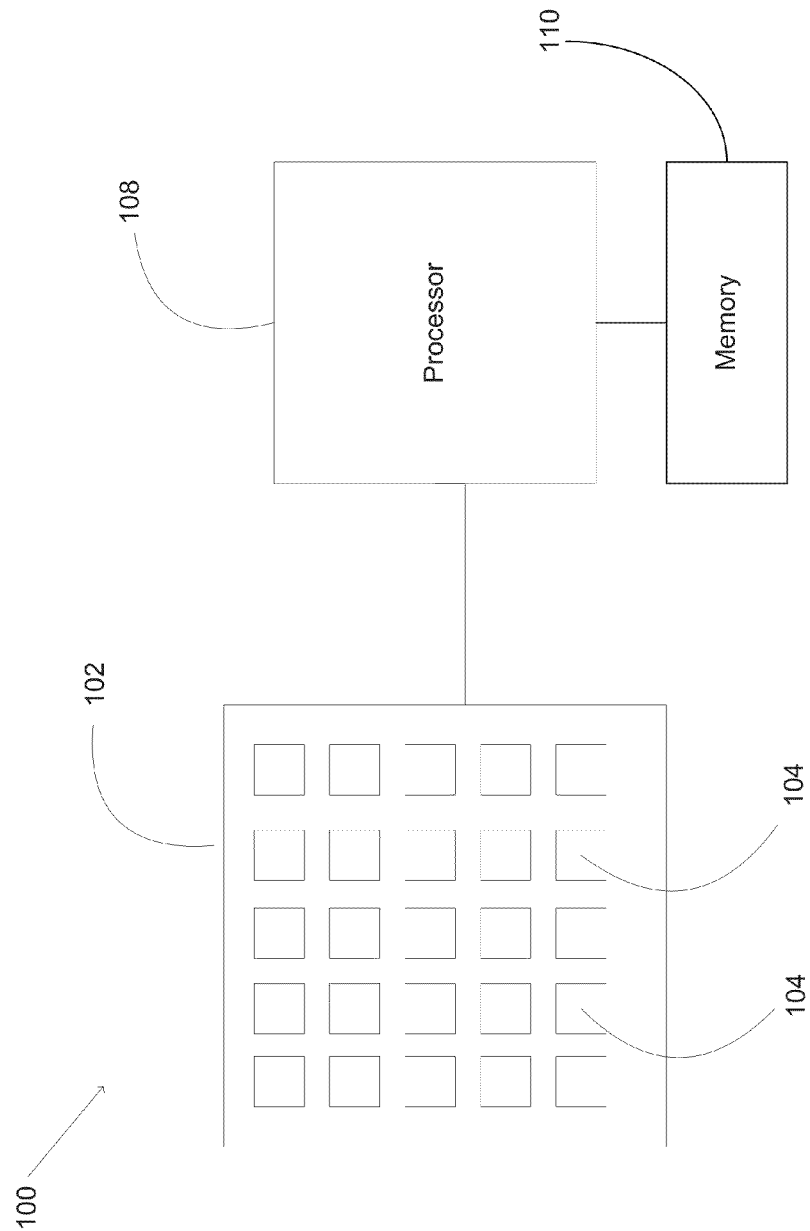

|   |   |   |   |
|---|---|---|---|
| G | R | B | G |
| B | G | G | R |
| R | G | G | B |
| G | B | R | G |

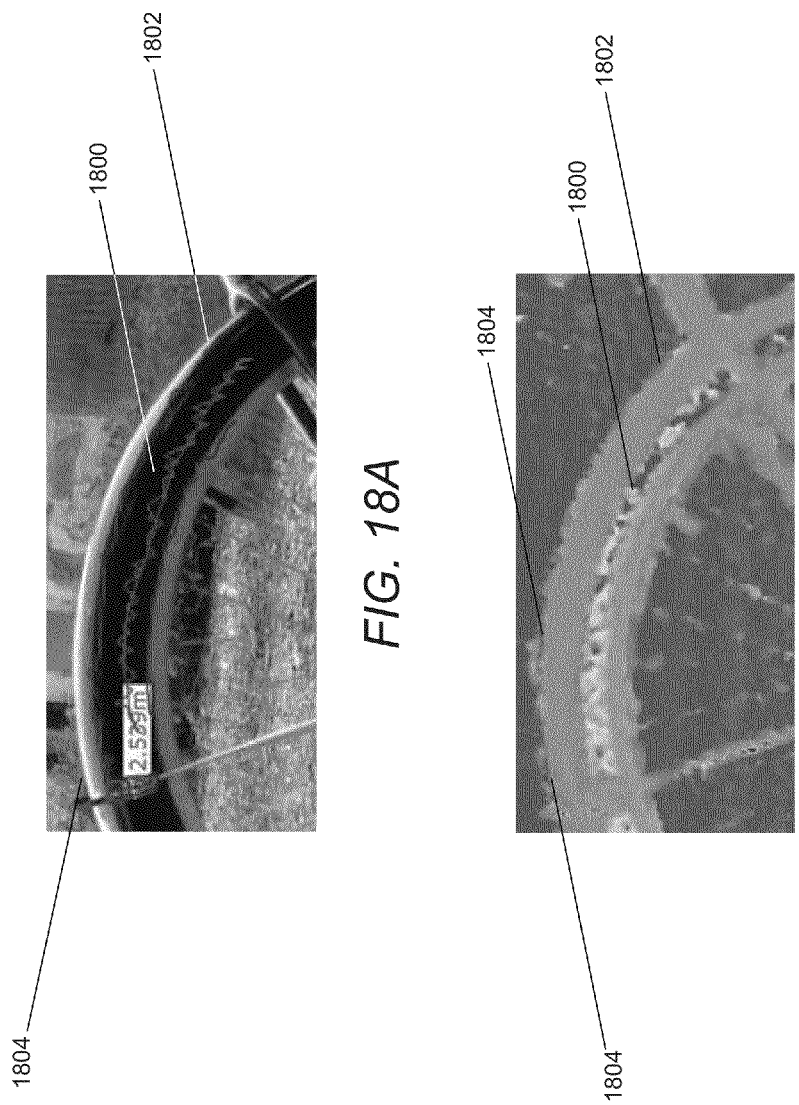

SYSTEMS AND METHODS FOR PERFORMING DEPTH ESTIMATION USING IMAGE DATA FROM MULTIPLE SPECTRAL CHANNELS

CROSS-REFERENCE TO RELATED APPLICATIONS

The current application claims priority as a continuation of U.S. patent application Ser. No. 13/972,881 entitled "Systems and Methods for Parallax Detection and Correction in Images Captured Using Array Cameras that Contain Occlusions using Subsets of Images to Perform Depth Estimation", filed Aug. 21, 2013. The current application also claims priority to U.S. Provisional Patent Application Ser. No. 61/691,666 to Venkataraman et al. entitled "Systems and Methods for Parallax Detection and Correction in Images Captured using Array Cameras", filed Aug. 21, 2012 and U.S. Provisional Patent Application Ser. No. 61/780,906 to Venkataraman et al. entitled "Systems and Methods for Parallax Detection and Correction in Images Captured using Array Cameras", filed Mar. 13, 2013. The disclosures of U.S. patent application Ser. No. 13/972,881 and U.S. Provisional Patent Application Ser. Nos. 61/691,666 and 61/780,906 are hereby incorporated by reference herein in their entirety.

FIELD OF THE INVENTION

The present invention generally relates to digital cameras and more specifically to the detection and correction of parallax in images captured using array cameras.

BACKGROUND

Binocular viewing of a scene creates two slightly different images of the scene due to the different fields of view of each eye. These differences, referred to as binocular disparity (or parallax), provide information that can be used to calculate depth in the visual scene, providing a major means of depth perception. The impression of depth associated with stereoscopic depth perception can also be obtained under other conditions, such as when an observer views a scene with only one eye while moving. The observed parallax can be utilized to obtain depth information for objects in the scene. Similar principles in machine vision can be used to gather depth information.

Two or more cameras separated by a distance can take pictures of the same scene and the captured images can be compared by shifting the pixels of two or more images to find parts of the images that match. The amount an object shifts between different camera views is called the disparity, which is inversely proportional to the distance to the object. A disparity search that detects the shift of an object in multiple images can be used to calculate the distance to the object based upon the baseline distance between the cameras and the focal length of the cameras involved. The approach of using two or more cameras to generate stereoscopic three-dimensional images is commonly referred to as multi-view stereo.

Multi-view stereo can generally be described in terms of the following components: matching criterion, aggregation method, and winner selection. The matching criterion is used as a means of measuring the similarity of pixels or regions across different images. A typical error measure is the RGB or intensity difference between images (these differences can be squared, or robust measures can be used). Some methods compute subpixel disparities by computing the analytic minimum of the local error surface or use gradient-based techniques. One method involves taking the minimum difference between a pixel in one image and the interpolated intensity function in the other image. The aggregation method refers to the manner in which the error function over the search space is computed or accumulated. The most direct way is to apply search windows of a fixed size over a prescribed disparity space for multiple cameras. Others use adaptive windows, shiftable windows, or multiple masks. Another set of methods accumulates votes in 3D space, e.g., a space sweep approach and voxel coloring and its variants. Once the initial or aggregated matching costs have been computed, a decision is made as to the correct disparity assignment for each pixel. Local methods do this at each pixel independently, typically by picking the disparity with the minimum aggregated value. Cooperative/competitive algorithms can be used to iteratively decide on the best assignments. Dynamic programming can be used for computing depths associated with edge features or general intensity similarity matches. These approaches can take advantage of one-dimensional ordering constraints along the epipolar line to handle depth discontinuities and unmatched regions. Yet another class of methods formulate stereo matching as a global optimization problem, which can be solved by global methods such as simulated annealing and graph cuts.

More recently, researches have used multiple cameras spanning a wider synthetic aperture to capture light field images (e.g. the Stanford Multi-Camera Array). A light field, which is often defined as a 4D function characterizing the light from all direction at all points in a scene, can be interpreted as a two-dimensional (2D) collection of 2D images of a scene. Due to practical constraints, it is typically difficult to simultaneously capture the collection of 2D images of a scene that form a light field. However, the closer in time at which the image data is captured by each of the cameras, the less likely that variations in light intensity (e.g. the otherwise imperceptible flicker of fluorescent lights) or object motion will result in time dependent variations between the captured images. Processes involving capturing and resampling a light field can be utilized to simulate cameras with large apertures. For example, an array of M×N cameras pointing at a scene can simulate the focusing effects of a lens as large as the array. Use of camera arrays in this way can be referred to as synthetic aperture photography.

While stereo matching was originally formulated as the recovery of 3D shape from a pair of images, a light field captured using a camera array can also be used to reconstruct a 3D shape using similar algorithms to those used in stereo matching. The challenge, as more images are added, is that the prevalence of partially occluded regions (pixels visible in some but not all images) also increases.

SUMMARY OF THE INVENTION

Systems and methods in accordance with embodiments of the invention can perform parallax detection and correction in images captured using array cameras. An embodiment of the method of the invention for estimating distances to objects within a scene from a light field comprising a set of images captured from different viewpoints using a processor configured by an image processing application includes: selecting a reference viewpoint relative to the viewpoints of the set of images captured from different viewpoints; normalizing the set of images to increase the similarity of corresponding pixels within the set of images; and determining initial depth estimates for pixel locations in an image from the reference viewpoint using at least a subset of the set of images, where an initial depth estimate for a given pixel location in the image from the reference viewpoint is determined by: identifying pixels in the at least a subset of the set of images that correspond to the given pixel location in the image from the reference viewpoint based upon expected disparity at a plurality of depths; comparing the similarity of the corresponding pixels identified at each of the plurality of depths; and selecting the depth from the plurality of depths at which the identified corresponding pixels have the highest degree of similarity as an initial depth estimate for the given pixel location in the image from the reference viewpoint. In addition, the method includes identifying corresponding pixels in the set of images using the initial depth estimates; comparing the similarity of the corresponding pixels in the set of images to detect mismatched pixels. When an initial depth estimate does not result in the detection of a mismatch between corresponding pixels in the set of images, selecting the initial depth estimate as the current depth estimate for the pixel location in the image from the reference viewpoint. When an initial depth estimate results in the detection of a mismatch between corresponding pixels in the set of images, selecting the current depth estimate for the pixel location in the image from the reference viewpoint by: determining a set of candidate depth estimates using a plurality of different subsets of the set of images; identifying corresponding pixels in each of the plurality of subsets of the set of images based upon the candidate depth estimates; and selecting the candidate depth of the subset having the most similar corresponding pixels as the current depth estimate for the pixel location in the image from the reference viewpoint.

In a further embodiment, selecting a reference viewpoint relative to the viewpoints of the set of images captured from different viewpoints includes selecting a viewpoint from the set consisting of: the viewpoint of one of the images; and a virtual viewpoint.

In another embodiment, a pixel in a given image from the set of images that corresponds to a pixel location in the image from the reference viewpoint is determined by applying a scene dependent shift to the pixel location in the image from the reference viewpoint that is determined based upon: the depth estimate of the pixel location in the image from the reference viewpoint; and the baseline between the viewpoint of the given image and the reference viewpoint.

In a still further embodiment, the subsets of the set of images used to determine the set of candidate depth estimates are selected based upon the viewpoints of the images in the sets of images to exploit patterns of visibility characteristic of natural scenes that are likely to result in at least one subset in which a given pixel location in the image from the reference viewpoint is visible in each image in the subset.

In still another embodiment, the set of images are captured within multiple color channels; selecting a reference viewpoint relative to the viewpoints of the set of images captured from different viewpoints includes selecting one of the images as a reference image and selecting the viewpoint of the reference image as the reference viewpoint; and the subsets of the set of images used to determine the set of candidate depth estimates are selected so that the same number of images in the color channel containing the reference image appears in each subset.

In a yet further embodiment, the subsets of the set of images used to determine the set of candidate depth estimates are also selected so that there are at least two images in the color channels that do not contain the reference image in each subset.

Yet another embodiment also includes determining the visibility of the pixels in the set of images from the reference viewpoint by: identifying corresponding pixels in the set of images using the current depth estimates; and determining that a pixel in a given image is not visible in the image from the reference viewpoint when the pixel fails a photometric similarity criterion determined based upon a comparison of corresponding pixels.

In a further embodiment again, selecting a reference viewpoint relative to the viewpoints of the set of images captured from different viewpoints includes selecting one of the images in the set of images as a reference image and selecting the viewpoint of the reference image as the reference viewpoint; and determining that a pixel in a given image is not visible in the image from the reference viewpoint when the pixel fails a photometric similarity criterion determined based upon a comparison of corresponding pixels further includes comparing the pixel in the given image to the corresponding pixel in the reference image.

In another embodiment again, the photometric similarity criterion includes a similarity threshold that adapts based upon at least the intensity of at least one of the pixel in the given image and the pixel in the reference image.

In a further additional embodiment, the photometric similarity criterion includes a similarity threshold that adapts as a function of the photometric distance between the corresponding pixel from the reference image and the corresponding pixel that is most similar to the pixel from the reference image.

In another additional embodiment, the photometric similarity criterion includes a similarity threshold that adapts based upon the signal to noise ratio of the pixel in the reference image.

In a still yet further embodiment, adapting the similarity threshold based upon the signal to noise ratio is approximated by scaling the photometric distance of the corresponding pixel from the reference image and the corresponding pixel that is most similar to the pixel from the reference image is and applying an offset to obtain an appropriate threshold.

In still yet another embodiment, the set of images includes images captured in a plurality of color channels and the reference image is an image captured in a first color channel and the given image is in the second color channel; determining that a pixel in a given image is not visible in the reference viewpoint when the pixel fails a photometric similarity criterion determined based upon a comparison of corresponding pixels further includes: selecting an image in the second color channel in which the corresponding pixel in the image from the reference viewpoint is visible as a reference image for the second color channel; and comparing the pixel in the given image to the corresponding pixel in the reference image for the second color channel.

In a still further embodiment again, selecting a reference viewpoint relative to the viewpoints of the set of images captured from different viewpoints includes selecting a virtual viewpoint as the reference viewpoint; and determining that a pixel in a given image is not visible in the image from the reference viewpoint when the pixel fails a photometric similarity criterion determined based upon a comparison of corresponding pixels further includes: selecting an image adjacent the virtual viewpoint as a reference image; and comparing the pixel in the given image to the corresponding pixel in the reference image.

In still another embodiment again, the image adjacent the virtual viewpoint is selected based upon the corresponding pixel in the selected image to the pixel from the given image being visible in an image from the reference viewpoint.

A yet further embodiment again also includes updating the depth estimate for a given pixel location in the image from the reference viewpoint based upon the visibility of the pixels in the set of images from the reference viewpoint by: generating an updated subset of the set of images using images in which the given pixel location in the image from the reference viewpoint is determined to be visible based upon the current depth estimate for the given pixel; identifying pixels in the updated subset of the set of images that correspond to the given pixel location in the image from the reference viewpoint based upon expected disparity at a plurality of depths; comparing the similarity of the corresponding pixels in the updated subset of images identified at each of the plurality of depths; and selecting the depth from the plurality of depths at which the identified corresponding pixels in the updated subset of the set of images have the highest degree of similarity as an updated depth estimate for the given pixel location in the image from the reference viewpoint.

In yet another embodiment again, the subsets of the set of images are pairs of images; and the updated subset of the set of images includes at least three images.

In a still further additional embodiment, normalizing the set of images to increase the similarity of corresponding pixels within the set of images further includes utilizing calibration information to correct for photometric variations and scene-independent geometric distortions in the images in the set of images, and rectification of the images in the set of images In still another additional embodiment, normalizing the set of images to increase the similarity of corresponding pixels within the set of images further includes resampling the images to increase the similarity of corresponding pixels in the set of images; and the scene-independent geometric corrections applied to the images are determined at a sub-pixel resolution.

In a yet further additional embodiment, utilizing calibration information to correct for photometric variations further includes performing any one of the normalization processes selected from the group consisting of: Black Level calculation and adjustment; vignetting correction; lateral color correction; and temperature normalization.

In yet another additional embodiment, the scene-independent geometric corrections also include rectification to account for distortion and rotation of lenses in an array of cameras that captured the set of images.

In a further additional embodiment again, a cost function is utilized to determine the similarity of corresponding pixels.

In another additional embodiment again, determining the similarity of corresponding pixels further includes spatially filtering the calculated costs.

In another further embodiment, selecting the depth from the plurality of depths at which the identified corresponding pixels have the highest degree of similarity as an initial depth estimate for the given pixel location in the image from the reference viewpoint further includes selecting the depth from the plurality of depths at which the filtered cost function for the identified corresponding pixels indicates the highest level of similarity.

In still another further embodiment, the cost function utilizes at least one similarity measure selected from the group consisting of: the L1 norm of a pair of corresponding pixels; the L2 norm of a pair of corresponding pixels; and the variance of a set of corresponding pixels.

In yet another further embodiment, the set of images are captured within multiple color channels and the cost function determines the similarity of pixels in each of the multiple color channels.

Another further embodiment again also includes generating confidence metrics for the current depth estimates for pixel locations in the image from the reference viewpoint.

In another further additional embodiment, the confidence metric encodes a plurality of confidence factors.

Still yet another further embodiment also includes filtering the depth map based upon the confidence map.

Still another further embodiment again also includes detecting occlusion of pixels in images within the set of images that correspond to specific pixel locations in the image from the reference viewpoint based upon the initial depth estimates by searching along lines parallel to the baselines between the reference viewpoint and the viewpoints of the images in the set of images to locate occluding pixels; when an initial depth estimate results in the detection of a corresponding pixel in at least one image being occluded, selecting the current depth estimate for the pixel location in the image from the reference viewpoint by: determining a set of candidate depth estimates using a plurality of different subsets of the set of images that exclude the at least one image in which the given pixel is occluded; identifying corresponding pixels in each of the plurality of subsets of the set of images based upon the candidate depth estimates; and selecting the candidate depth of the subset having the most similar corresponding pixels as the current depth estimate for the pixel location in the image from the reference viewpoint.

In still another further additional embodiment, searching along lines parallel to the baselines between the reference viewpoint and the viewpoints of the images in the set of images to locate occluding pixels further includes determining that a pixel corresponding to a pixel location $(x_1, y_1)$ in an image from the reference viewpoint is occluded in an alternate view image by a pixel location $(x_2, y_2)$ in the image from the reference viewpoint when $$\left| s_2 - s_1 - \sqrt{(x_2 - x_1)^2 + (y_2 - y_1)^2} \right| \leq \text{threshold}$$

where $s_1$ and $s_2$ are scene dependent geometric shifts applied to pixel locations $(x_1, y_1)$ and pixel $(x_2, y_2)$ to shift the pixels along a line parallel to the baseline between the reference viewpoint and the viewpoint of the alternate view image to shift the pixels into the viewpoint of the alternate view image based upon the initial depth estimates for each pixel.

In yet another further embodiment again, the decision to designate a pixel as being occluded considers at least one of the similarity of the pixels and the confidence of the estimated depths of the pixels $(x_1, y_1)$ and $(x_2, y_2)$.

In a specific embodiment, a cost function is utilized to determine the similarity of corresponding pixels.

In another specific embodiment, determining the similarity of corresponding pixels further comprises spatially filtering the calculated costs.

In a further specific embodiment, the spatial filtering of the calculated costs utilizes a filter selected from the group consisting of: a fixed-coefficient filter; and an edge-preserving filter.

In a still further specific embodiment, selecting the depth from the plurality of depths at which the identified corresponding pixels have the highest degree of similarity as an initial depth estimate for the given pixel location in the image from the reference viewpoint further includes selecting the depth from the plurality of depths at which the filtered cost function for the identified corresponding pixels indicates the highest level of similarity.

In still another specific embodiment, the set of images are captured within a single color channel and the cost function is a function of the variance of the corresponding pixel.

In a yet further specific embodiment, the cost function is an aggregated cost function CV(x,y,d) over each image i in the set of images that includes the following term $$CV(x, y, d) = \sum_i \frac{Cost^{i,Ref}(x, y, d) \times V^{i,Ref}(x, y)}{\text{number of visible cameras at } (x, y)}$$

where $Cost^{i,Ref}$(x,y,d) is a similarity measure (i.e. the cost function),
d is depth of pixel (x, y), and
$V^{i,Ref}$(x,y) is the visibility of pixel (x, y) and initially $V^{i,Ref}$(x,y)=1 for all cameras.

In a further specific embodiment again, the individual costs $Cost^{i,Ref}$(x,y,d) are computed based on each disparity hypothesis d for each pixel (x, y) for cameras i, Ref as follows:

$$Cost^{i,Ref}(x,y,d) = S\{I^i(x,y,d), I^{Ref}(x,y,d)\}$$

where S is the similarity measure (for example), and
$I^i$ is the calibrated image i after geometric calibration.

In yet another specific embodiment, the aggregated cost considers the similarity of the shifted images at the candidate depth as follows:

$$CV(x, y, d) = \sum_{k \in K} \frac{(x, y)Cost^{k,Ref}(x, y, d) \times V^{k,Ref}}{\text{number of cameras in } K} +$$

$$\sum_{i,j \in L} \frac{Cost^{i,j}(x, y, d) \times V^{i,Ref}(x, y) \times V^{j,Ref}(x, y)}{\text{number of pairs of cameras in } L}$$

where K is a set of cameras in the same spectral channel as the reference camera,
L is a set of pairs of cameras, where both cameras in each pair are in the same spectral channel (which can be a different spectral channel to the reference camera where the light field includes image data in multiple spectral channels), $$Cost^{k,Ref}(x,y,d) = S\{ImageRef(x,y), ShiftedImage^k(x,y,d)\}, \text{ and}$$

$$Cost^{i,j}(x,y,d) = S\{ShiftedImage^i(x,y,d), ShiftedImage^j(x,y,d)\}$$

In a further specific embodiment again, the aggregated cost function is spatially filtered using a filter so that the weighted aggregated cost function is as follows:

$$FilteredCV(x, y, d) = \frac{1}{Norm}$$

$$\sum_{\substack{(x_1,y_1) \\ \in N(x,y)}} CV(x_1, y_1, d) \times wd(x, y, x_1, y_1) \times wr(I_{Ref}(x, y) - I_{Ref}(x_1, y_1))$$

where N(x, y) is the immediate neighborhood of the pixel (x, y), which can be square, circular, rectangular, or any other shape appropriate to the requirements of a specific application,
Norm is a normalization term,
$I_{Ref}$(x,y) is the image data from the reference camera,
wd is a weighting function based on pixel distance, and
wr is a weighting function based on intensity difference.
In a further embodiment, the filter is a box filter and wd and wr are constant coefficients.

In another embodiment, the filter is a bilateral filter and wd and wr are both Gaussian weighting functions.

In a still further embodiment, a depth estimate for a pixel location (x, y) in the image from the reference viewpoint is determined by selecting the depth that minimizes the filtered cost at each pixel location in the depth map as follows:

$$D(x,y) = \text{argmin}\{FilteredCV(x,y,d)\}$$

In still another embodiment, the set of images are captured within multiple color channels and the cost function incorporates the L1 norm of image data from the multiple color channels.

In a yet further embodiment, the set of images are captured within multiple color channels and the cost function incorporates the L2 norm of image data from the multiple color channels.

In yet another embodiment, the set of images are captured within multiple color channels including at least Red, Green and Blue color channels; selecting a reference viewpoint relative to the viewpoints of the set of images captured from different viewpoints comprises selecting one of the images in the Green color channel as a Green reference image and selecting the viewpoint of the Green reference image as the reference viewpoint; and the cost function Cost(x,y,d) for a pixel location (x, y) in the image from the reference viewpoint at a depth d is:

$$Cost(x,y,d) = \gamma_G(x,y) \cdot Cost_G(x,y,d) + \gamma_R(x,y) \cdot Cost_R(x,y,d) + \gamma_B(x,y) \cdot Cost_B(x,y,d)$$

where $Cost_s$ (x,y,d) is the measure of the similarity of a pixel location (x, y) in the image from the reference viewpoint to corresponding pixels in locations within a set of Green images based upon the depth d,
$Cost_R$ (x,y,d) is the measure of the similarity of corresponding pixels in locations within a set of Red images determined based upon the depth d and the pixel location (x, y) in the image from the reference viewpoint,
$Cost_B$ (x,y,d) is the measure of the similarity of corresponding pixels in locations within a set of Blue images determined based upon the depth d and the pixel location (x, y) in the image from the reference viewpoint, and
$\gamma_G$, $\gamma_R$, and $\gamma_B$ are weighting factors for the Green, Red and Blue cost functions respectively.

In a further embodiment again, the $Cost_s$ (x,y,d) uses a similarity measure selected from the group consisting of an L1 norm, an L2 norm, and variance across the pixels in the images in the set of images that are within the Green color channel.

In another embodiment again, the cost measures for the Red ($Cost_R$ (x,y,d)) and Blue color channels ($Cost_B$ (x,y,d)) are determined by calculating the aggregated difference between unique pairs of corresponding pixels in images within the color channel.

In a further additional embodiment, calculating the aggregated difference between each unique pair of corresponding pixels in images within a color channel comprises determining a combination cost metric for unique pairs of corresponding pixels in images within the color channel.

In another additional embodiment, the combination cost metric ($Cost_a$ (x,y,d)) for a Red color channel including four images ($C_A$, $C_B$, $C_C$, and $C_D$) can be determined as follows:

$$\text{Cost}_C(x, y, d) = |C_A(x_a, y_A) - C_B(x_B, y_B)| + |C_A(x_A, y_A) - C_C(x_C, y_C)| +$$
$$|C_A(x_A, y_A) - C_D(x_D, y_D)| + |C_B(x_B, y_B) - C_C(x_C, y_C)| +$$
$$|C_B(x_B, y_B) - C_D(x_D, y_D)| + |C_C(x_C, y_C) - C_D(x_D, y_D)|$$

where $(x_A, y_A)$, $(x_B, y_B)$, $(x_C, y_C)$, and $(x_D, y_D)$ are corresponding pixel locations determined based upon the disparity in each of the images $C_A$, $C_B$, $C_C$, and $C_D$ respectively at depth d.

In a still yet further embodiment, the combination cost metric is determined utilizing at least one selected from the group consisting of: the L1 norm of the pixel brightness values; the L2 norm of the pixel brightness values; and the variance in the pixel brightness values.

In still yet another embodiment, the weighting factors $\gamma_G$, $\gamma_R$, and $\gamma_B$ are fixed.

In a still further embodiment again, the weighting factors $\gamma_G$, $\gamma_R$, and $\gamma_B$ vary spatially with the pixel location (x, y) in the image from the reference viewpoint.

In still another embodiment again, the weighting factors $\gamma_G$, $\gamma_R$, and $\gamma_B$ vary based upon the estimated SNR at the pixel location (x, y) in the image from the reference viewpoint; and strong SNR at the pixel location (x, y) in the image from the reference viewpoint is used to reduce the weighting applied to the Red and Blue color channels.

In a further embodiment, the confidence metric encodes a plurality of confidence factors.

In another embodiment, the confidence metric for the depth estimate for a given pixel location in the image from the reference viewpoint comprises at least one confidence factor selected from the group consisting of: an indication that the given pixel is within a textureless region within an image; a measure of the signal to noise ration (SNR) in a region surrounding a given pixel; the number of corresponding pixels used to generate the depth estimate; an indication of the number of depths searched to generate the depth estimate; an indication that the given pixel is adjacent a high contrast edge; and an indication that the given pixel is adjacent a high contrast boundary.

In a still further embodiment, the confidence metric for the depth estimate for a given pixel location in the image from the reference viewpoint comprises at least one confidence factor selected from the group consisting of: an indication that the given pixel lies on a gradient edge; an indication that the corresponding pixels to the given pixel are mismatched; an indication that corresponding pixels to the given pixel are occluded; an indication that depth estimates generated using different reference cameras exceed a threshold for the given pixel; an indication that the depth estimates generated using different subsets of cameras exceed a threshold for the given pixel; an indication as to whether the depth of the given threshold exceeds a threshold; an indication that the given pixel is defective; and an indication that corresponding pixels to the given pixel are defective.

In still another embodiment, the confidence metric for the depth estimate for a given pixel location in the image from the reference viewpoint comprises at least: a measure of the SNR in a region surrounding a given pixel; and the number of corresponding pixels used to generate the depth estimate.

In a yet further embodiment, the confidence metric encodes at least one binary confidence factor.

In yet another embodiment, the confidence metric encodes at least one confidence factor represented as a range of degrees of confidence.

In a further embodiment again, the confidence metric encodes at least one confidence factor determined by comparing the similarity of the pixels in the set of images that were used to generate the finalized depth estimate for a given pixel location in the image from the reference viewpoint.

In another embodiment again, a cost function is utilized to generate a cost metric indicating the similarity of corresponding pixels; and comparing the similarity of the pixels in the set of images that were used to generate the depth estimate for a given pixel location in the image from the reference viewpoint further comprises: applying a threshold to a cost metric of the pixels in the set of images that were used to generate the finalized depth estimate for a given pixel location in the image from the reference viewpoint; and when the cost metric exceeds the threshold, assigning a confidence metric that indicates that the finalized depth estimate for the given pixel location in the image from the reference viewpoint was generated using at least one pixel in the set of images that is a problem pixel.

In a further additional embodiment, the threshold is modified based upon at least one of: a mean intensity of a region surrounding the given pixel location in the image from the reference viewpoint; and noise statistics for at least one sensor used to capture the set of images.

In a still yet further embodiment, the mean intensity of a region surrounding the given pixel location in the image from the reference viewpoint is calculated using a spatial box N×N averaging filter centered around the given pixel.

In still yet another embodiment, the set of images are captured within multiple color channels including at least Red, Green and Blue color channels; selecting a reference viewpoint relative to the viewpoints of the set of images captured from different viewpoints comprises selecting one of the images in the Green color channel as a Green reference image and selecting the viewpoint of the Green reference image as the reference viewpoint; and the mean intensity is used to determine the noise statistics for the Green channel using a table that relates a particular mean at a particular exposure and gain to a desired threshold.

In a still further embodiment again, selecting a reference viewpoint relative to the viewpoints of the set of images captured from different viewpoints comprises selecting one of the images as a reference image and selecting the viewpoint of the reference image as the reference viewpoint; and a cost function is utilized to generate a cost metric indicating the similarity of corresponding pixels; a confidence metric based upon general mismatch is obtained using the following formula:

$$\text{Confidence}(x,y) = F(\text{Cost}_{min}(x,y), \text{Cost}^d(x,y), I(x,y)^{cam}, \text{Sensor})$$

where $\text{Cost}_{min}(x, y)$ is the minimum cost of a disparity search over the desired depth range, $\text{Cost}^d(x, y)$ denotes that cost data from any depth or depths (beside the minimum depth), $I(x, y)^{cam}$ image data captured by any camera can be utilized to augment the confidence;

Sensor is the sensor prior, which can include known properties of the sensor, such as (but not limited to) noise statistics or characterization, defective pixels, properties of the sensor affecting any captured images (such as gain or exposure), Camera intrinsics is the camera intrinsic, which specifies elements intrinsic to the camera and camera array that can impact confidence including (but not limited to) the baseline separation between cameras in the array (affects precision of depth measurements), and the arrangement of the color filters (affects performance in the occlusion zones in certain scenarios).

In still another embodiment again, selecting a reference viewpoint relative to the viewpoints of the set of images captured from different viewpoints comprises selecting one of the images as a reference image and selecting the viewpoint of the reference image as the reference viewpoint; and a cost function is utilized to generate a cost metric indicating the similarity of corresponding pixels; and a confidence metric based upon general mismatch is obtained using the following formula:

$$\text{Confidence}(x, y) = a \times \frac{\text{Cost}_{min}(x, y)}{Avg(x, y)} + \text{offset}$$

where Avg(x,y) is the mean intensity of the reference image in a spatial neighborhood surrounding (x, y), or an estimate of the mean intensity in the neighborhood, that is used to adjust the confidence based upon the intensity of the reference image in the region of (x, y),
  a and offset are empirically chosen scale and offset factors used to adjust the confidence with prior information about the gain and noise statistics of the sensor.
  a and offset are empirically chosen scale and offset factors used to adjust the confidence with prior information about the gain and noise statistics of at least one sensor used to capture images in the set of images.

In a yet further embodiment again, generating confidence metrics for the depth estimates for pixel locations in the image from the reference viewpoint includes determining at least one sensor gain used to capture at least one of the set of images and adjusting the confidence metrics based upon the sensor gain.

In yet another embodiment again, generating confidence metrics for the depth estimates for pixel locations in the image from the reference viewpoint comprises determining at least one exposure time used to capture at least one of the set of images and adjusting the confidence metrics based upon the sensor gain.

A still further additional embodiment also includes outputting a depth map containing the finalized depth estimates for pixel locations in the image from the reference viewpoint, and outputting a confidence map containing confidence metrics for the finalized depth estimates contained within the depth map.

Still another additional embodiment also includes filtering the depth map based upon the confidence map.

Yet another further additional embodiment includes estimating distances to objects within a scene from the light field comprising a set of images captured from different viewpoints using a processor configured by an image processing application by: selecting a reference viewpoint relative to the viewpoints of the set of images captured from different viewpoints; normalizing the set of images to increase the similarity of corresponding pixels within the set of images; determining initial depth estimates for pixel locations in an image from the reference viewpoint using at least a subset of the set of images, where an initial depth estimate for a given pixel location in the image from the reference viewpoint is determined by: identifying pixels in the at least a subset of the set of images that correspond to the given pixel location in the image from the reference viewpoint based upon expected disparity at a plurality of depths; comparing the similarity of the corresponding pixels identified at each of the plurality of depths; and selecting the depth from the plurality of depths at which the identified corresponding pixels have the highest degree of similarity as an initial depth estimate for the given pixel location in the image from the reference viewpoint. In addition, the process of estimating distances further includes identifying corresponding pixels in the set of images using the initial depth estimates; comparing the similarity of the corresponding pixels in the set of images to detect mismatched pixels; when an initial depth estimate does not result in the detection of a mismatch between corresponding pixels in the set of images, selecting the initial depth estimate as the current depth estimate for the pixel location in the image from the reference viewpoint; and when an initial depth estimate results in the detection of a mismatch between corresponding pixels in the set of images, selecting the current depth estimate for the pixel location in the image from the reference viewpoint by: determining a set of candidate depth estimates using a plurality of different subsets of the set of images; identifying corresponding pixels in each of the plurality of subsets of the set of images based upon the candidate depth estimates; and selecting the candidate depth of the subset having the most similar corresponding pixels as the current depth estimate for the pixel location in the image from the reference viewpoint. The process further including determining the visibility of the pixels in the set of images from the reference viewpoint by: identifying corresponding pixels in the set of images using the current depth estimates; and determining that a pixel in a given image is not visible in the reference viewpoint when the pixel fails a photometric similarity criterion determined based upon a comparison of corresponding pixels; and fusing pixels from the set of images using the processor configured by the image processing application based upon the depth estimates to create a fused image having a resolution that is greater than the resolutions of the images in the set of images by: identifying the pixels from the set of images that are visible in an image from the reference viewpoint using the visibility information; and applying scene dependent geometric shifts to the pixels from the set of images that are visible in an image from the reference viewpoint to shift the pixels into the reference viewpoint, where the scene dependent geometric shifts are determined using the current depth estimates; and fusing the shifted pixels from the set of images to create a fused image from the reference viewpoint having a resolution that is greater than the resolutions of the images in the set of images.

Another further embodiment also includes synthesizing an image from the reference viewpoint using the processor configured by the image processing application to perform a super resolution process based upon the fused image from the reference viewpoint, the set of images captured from different viewpoints, the current depth estimates, and the visibility information.

A further embodiment of the invention includes a processor, and memory containing a set of images captured from different viewpoints and an image processing application. In addition, the image processing application configures the processor to: select a reference viewpoint relative to the viewpoints of the set of images captured from different viewpoints; normalize the set of images to increase the similarity of corresponding pixels within the set of images; determine initial depth estimates for pixel locations in an image from the reference viewpoint using at least a subset of the set of images, where an initial depth estimate for a given pixel location in the image from the reference viewpoint is determined by: identifying pixels in the at least a subset of the set of images that correspond to the given pixel location in the image from the reference viewpoint based upon expected disparity at a plurality of depths; comparing the similarity of the corresponding pixels identified at each of the plurality of depths; and selecting the depth from the plurality of depths at which the identified corresponding pixels have the highest degree of similarity as an initial depth estimate for the given pixel location in the image from the reference viewpoint. The application further configures the processor to identify corresponding pixels in the set of images using the initial depth estimates; compare the similarity of the corresponding pixels in the set of images to detect mismatched pixels. When an initial depth estimate does not result in the detection of a mismatch between corresponding pixels in the set of images, the application configures the processor to select the initial depth estimate as the current depth estimate for the pixel location in the image from the reference viewpoint. When an initial depth estimate results in the detection of a mismatch between corresponding pixels in the set of images, the application configures the processor to select the current depth estimate for the pixel location in the image from the reference viewpoint by: determining a set of candidate depth estimates using a plurality of different subsets of the set of images; identifying corresponding pixels in each of the plurality of subsets of the set of images based upon the candidate depth estimates; and selecting the candidate depth of the subset having the most similar corresponding pixels as the current depth estimate for the pixel location in the image from the reference viewpoint.

In another embodiment, the image processing application further configures the processor to: determine the visibility of the pixels in the set of images from the reference viewpoint by: identifying corresponding pixels in the set of images using the current depth estimates; and determining that a pixel in a given image is not visible in the reference viewpoint when the pixel fails a photometric similarity criterion determined based upon a comparison of corresponding pixels; and fuse pixels from the set of images using the depth estimates to create a fused image having a resolution that is greater than the resolutions of the images in the set of images by: identifying the pixels from the set of images that are visible in an image from the reference viewpoint using the visibility information; and applying scene dependent geometric shifts to the pixels from the set of images that are visible in an image from the reference viewpoint to shift the pixels into the reference viewpoint, where the scene dependent geometric shifts are determined using the current depth estimates; and fusing the shifted pixels from the set of images to create a fused image from the reference viewpoint having a resolution that is greater than the resolutions of the images in the set of images.

BRIEF DESCRIPTION OF THE DRAWINGS

FIG. 1 conceptual illustrates of an array camera in accordance with an embodiment of the invention.

FIG. 1C conceptually illustrates a color filter pattern for a 4×4 array camera module in accordance with an embodiment of the invention.

FIGS. 8B-8I conceptually illustrate subsets of cameras in a 5×5 array camera that can be utilized to obtain depth estimates in accordance with embodiments of the invention.

FIGS. 8J-8M conceptually illustrate subsets of cameras in a 4×4 array camera that can be utilized to obtain depth estimates in accordance with embodiments of the invention.

FIGS. 18A and 18B conceptually illustrate sources of noise in depth estimates.

DETAILED DESCRIPTION

Figure 1A:
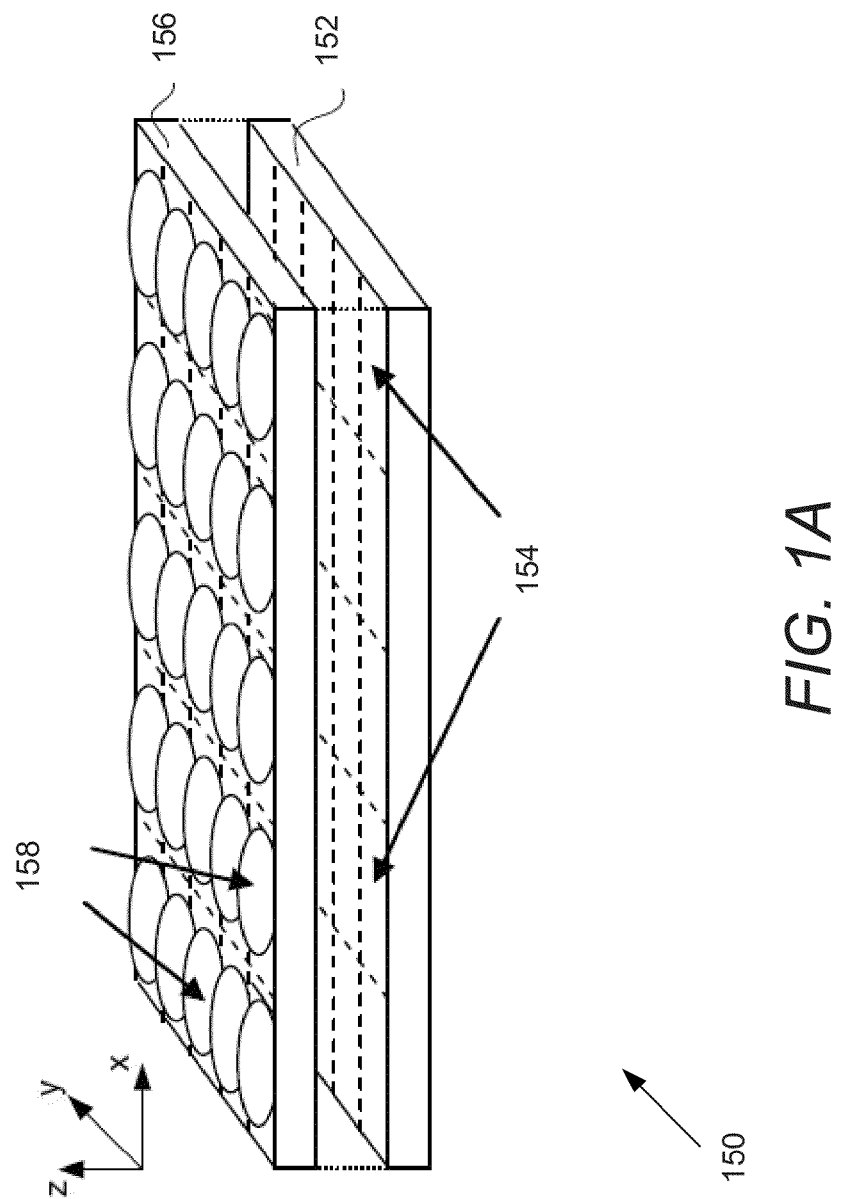
FIG. 1A conceptually illustrates an array camera module in accordance with an embodiment of the invention.

Turning now to the drawings, systems and methods for parallax detection and correction in images captured using array cameras are illustrated. Array cameras, such as those described in U.S. patent application Ser. No. 12/935,504 entitled "Capturing and Processing of Images using Monolithic Camera Array with Heterogeneous Imagers" to Venkataraman et al., can be utilized to capture light field images. In a number of embodiments, super-resolution processes such as those described in U.S. patent application Ser. No. 12/967, 807 entitled "Systems and Methods for Synthesizing High Resolution Images Using Super-Resolution Processes" to Lelescu et al., are utilized to synthesize a higher resolution 2D image or a stereo pair of higher resolution 2D images from the lower resolution images in the light field captured by an array camera. The terms high or higher resolution and low or lower resolution are used here in a relative sense and not to indicate the specific resolutions of the images captured by the array camera. The disclosures of U.S. patent application Ser. No. 12/935,504 and U.S. patent application Ser. No. 12/967,807 are hereby incorporated by reference in their entirety.

Each two-dimensional (2D) image in a captured light field is from the viewpoint of one of the cameras in the array camera. Due to the different viewpoint of each of the cameras, parallax results in variations in the position of objects within the different images of the scene. Systems and methods in accordance with embodiments of the invention provide an accurate account of the pixel disparity as a result of parallax between the different cameras in the array, so that appropriate scene-dependent geometric shifts can be applied to the pixels of the captured images when performing super-resolution processing.

A high resolution image synthesized using super-resolution processing is synthesized from a specific viewpoint that can be referred to as a reference viewpoint. The reference viewpoint can be from the viewpoint of one of the cameras in a camera array. Alternatively, the reference viewpoint can be an arbitrary virtual viewpoint where there is no physical camera. A benefit of synthesizing a high resolution image from the viewpoint of one of the cameras (as opposed to a virtual viewpoint) is that the disparity of the pixels in the light field can be determined with respect to the image in the light field captured from the reference viewpoint. When a virtual viewpoint is utilized, none of the captured image data is from the reference viewpoint and so the process instead relies solely on cameras away from the reference position to determine the best match.

Array cameras in accordance with many embodiments of the invention use the disparity between the pixels in the images within a light field to generate a depth map from the reference viewpoint. A depth map indicates the distance of scene objects from a reference viewpoint and can be utilized to determine scene dependent geometric corrections to apply to the pixels from each of the images within a captured light field to correct for disparity when performing super-resolution processing. In several embodiments, an initial depth map of the reference viewpoint is generated and as part of that process or as a subsequent process occluded pixels and/or other types of mismatched pixels are detected. The process of detecting pixels that are occluded can also be thought of as determining whether a pixel in an image captured from the reference viewpoint is visible in the image from a non-reference viewpoint. When a pixel in the image captured from the reference viewpoint is not visible in a second image, utilizing image data from the second image when determining the depth of the pixel in the reference image introduces error into the depth determination. Therefore, by detecting the pixels in the reference image that are occluded in one or more images in the light field, the accuracy of the depth map can be improved. In several embodiments, the initial depth map is updated by determining the depths of occluded pixels using image data captured from cameras in which the pixels are visible (i.e. not occluded). In a number of embodiments, the likely presence of occlusions and/or other sources of mismatched pixels can be detected during the process of generating an initial depth estimate and subsets of a set of images that correspond to different patterns of visibility within a scene can be used to determine a set of candidate depth estimates. The candidate depth of the subset of images having the most similar corresponding pixels can be used as the new depth estimate and the new depth estimate used to determine the visibility of the corresponding pixels in some or all of the remaining set of images.

A depth map from a reference viewpoint can be utilized to determine the scene dependent geometric shifts that are likely to have occurred in images captured from other viewpoints. These scene dependent geometric shifts can be utilized in super-resolution processing. In addition, the scene dependent geometric shifts can be utilized to refine the determinations of the visibility of pixels within the light field from the reference viewpoint. In a number of embodiments, the scene dependent geometric shifts are utilized to compare the similarity of pixels. Assuming the depth of a pixel from the reference viewpoint is correctly determined, then the similarity of the pixels is indicative of whether the pixel is visible. A similar pixel is likely to be the pixel observed from the reference viewpoint shifted due to disparity. If the pixels are dissimilar, then the pixel observed from the reference viewpoint is likely occluded in the second image. In many embodiments, visibility information is utilized in further updating depth maps. In several embodiments, visibility information is generated and provided along with the depth map for use in super-resolution processing.

In a number of embodiments, the computational complexity of generating depth maps is reduced by generating a sparse depth map that includes additional depth estimates in regions where additional depth information is desirable such as (but not limited to) regions involving depth transitions and/or regions containing pixels that are occluded in one or more images within the light field.

Many array cameras capture color information using different cameras (see for example the array cameras disclosed in U.S. patent application Ser. No. 12/935,504). In many embodiments, the viewpoint of a Green camera is utilized as the reference viewpoint. An initial depth map can be generated using the images captured by other Green cameras in the array camera and the depth map used to determine the visibility of Red, Green, and Blue pixels within the light field. In other embodiments, image data in multiple color channels can be utilized to perform depth estimation. In several embodiments, the similarity of corresponding pixels in each color channel is considered when estimating depth. In a number of embodiments, the similarity of sets of corresponding pixels in different color channels is also considered when estimating depth. Depth estimation using various cost functions that consider the similarity of corresponding pixels at specific depths in a single spectral channel, in multiple spectral channels, and/or across spectral channels in accordance with embodiments of the invention are discussed further below.

In several embodiments, the array camera can include one or more cameras that capture image data in multiple color channels. For example, an array camera may include one or more cameras that have a Bayer color filter pattern, in addition to or as an alternative to monochrome cameras. When the viewpoint of a camera that captures multiple color channels is used as the reference viewpoint for the purpose of generating a depth map, a depth map and visibility information can be determined for each color channel captured from the reference viewpoint. When a reference image contains information concerning multiple color channels, depth and visibility information can be more reliably created based upon the disparity of the pixels in the light field with respect to the reference image than by registering the pixels in one channel with respect to the depth and visibility of pixels in another color channel. A disadvantage of utilizing the viewpoint of a camera that captures image data in multiple color channels as a reference viewpoint is that the resolution of the depth information in each of the captured color channels is reduced relative to a camera that captures image data using the same number of pixels in a single channel. Accordingly, the configuration of the array camera and the selection of the viewpoint to utilize as the reference viewpoint typically depend upon the requirements of a specific application.

Once a depth map and visibility information are generated for the pixels in the light field, the depth map and visibility information can be provided to a super-resolution processing pipeline in accordance with embodiments of the invention to synthesize a higher resolution 2D image of the scene. The depth map can be utilized to correct for parallax between the different low resolution images and visibility information can be utilized during fusion to prevent the fusion of occluded pixels (i.e. pixels in an alternate view image that are not visible from the reference viewpoint). In several embodiments, the process of generating a depth map also includes generating a confidence map that includes confidence metrics for the depth estimates in the depth map. In several embodiments, the depth metrics encode at least one confidence factor indicative of the reliability of the corresponding depth estimate. In a number of embodiments, the confidence metric includes at least a confidence factor based on the signal to noise ratio (SNR) in the region of the pixel location with which the depth estimate is associated, and a confidence factor based upon the number of pixels in a set of images that correspond to the pixel location with which the depth map is associated that were utilized to generate the depth estimate and/or are occluded. Systems and methods for detecting and correcting disparity in images captured by array cameras in accordance with embodiments of the invention are described below. Before discussing the detection and correction of parallax, however, various array cameras in accordance with embodiments of the invention are discussed.

Array Camera Architecture

Array cameras in accordance with embodiments of the invention can include a camera module including an array of cameras and a processor configured to read out and process image data from the camera module to synthesize images. An array camera in accordance with an embodiment of the invention is illustrated in FIG. 1. The array camera 100 includes a camera module 102 with an array of individual cameras 104 where an array of individual cameras refers to a plurality of cameras in a particular arrangement, such as (but not limited to) the square arrangement utilized in the illustrated embodiment. The camera module 102 is connected to the processor 108. The processor is also configured to communicate with one or more different types of memory 110 that can be utilized to store image data and/or contain machine readable instructions utilized to configure the processor to perform processes including (but not limited to) the various processes described below. In many embodiments, the memory contains an image processing application that is configured to process a light field comprising a plurality of images to generate a depth map(s), a visibility map(s), a confidence map(s), and/or a higher resolution image(s) using any of the processes outlined in detail below. As is discussed further below, a depth map typically provides depth estimates for pixels in an image from a reference viewpoint (e.g. a higher resolution image synthesized from a reference viewpoint). A variety of visibility maps can be generated as appropriate to the requirements of specific applications including (but not limited to) visibility maps indicating whether pixel locations in a reference image are visible in specific images within a light field, visibility maps indicating whether specific pixels in an image within the light field are visible from the reference viewpoint, and visibility maps indicating whether a pixel visible in one alternate view image is visible in another alternate view image. In other embodiments, any of a variety of applications can be stored in memory and utilized to process image data using the processes described herein. In several embodiments, processes in accordance with embodiments of the invention can be implemented in hardware using an application specific integration circuit, and/or a field programmable gate array, or implemented partially in hardware and software.

Processors 108 in accordance with many embodiments of the invention are configured using appropriate software to take the image data within the light field and synthesize one or more high resolution images. In several embodiments, the high resolution image is synthesized from a reference viewpoint, typically that of a reference focal plane 104 within the sensor 102. In many embodiments, the processor is able to synthesize an image from a virtual viewpoint, which does not correspond to the viewpoints of any of the focal planes 104 in the sensor 102. The images in the light field will include a scene-dependent disparity due to the different fields of view of the focal planes used to capture the images. Processes for detecting and correcting for disparity are discussed further below. Although a specific array camera architecture is illustrated in FIG. 1, alternative architectures can also be utilized in accordance with embodiments of the invention.

Array Camera Modules

Array camera modules in accordance with embodiments of the invention can be constructed from an imager array or sensor including an array of focal planes and an optic array including a lens stack for each focal plane in the imager array. Sensors including multiple focal planes are discussed in U.S. patent application Ser. No. 13/106,797 entitled "Architectures for System on Chip Array Cameras", to Pain et al., the disclosure of which is incorporated herein by reference in its entirety. Light filters can be used within each optical channel formed by the lens stacks in the optic array to enable different cameras within an array camera module to capture image data with respect to different portions of the electromagnetic spectrum (i.e. within different spectral channels).

Figure 1C:
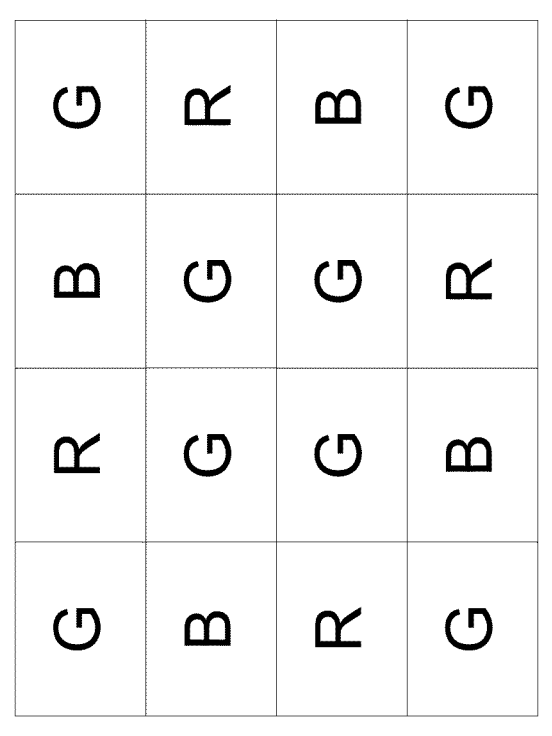

An array camera module in accordance with an embodiment of the invention is illustrated in FIG. 1A. The array camera module 150 includes an imager array 152 including an array of focal planes 154 along with a corresponding optic array 156 including an array of lens stacks 158. Within the array of lens stacks, each lens stack 158 creates an optical channel that forms an image of the scene on an array of light sensitive pixels within a corresponding focal plane 154. Each pairing of a lens stack 158 and focal plane 154 forms a single camera 104 within the camera module. Each pixel within a focal plane 154 of a camera 104 generates image data that can be sent from the camera 104 to the processor 108. In many embodiments, the lens stack within each optical channel is configured so that pixels of each focal plane 158 sample the same object space or region within the scene. In several embodiments, the lens stacks are configured so that the pixels that sample the same object space do so with sub-pixel offsets to provide sampling diversity that can be utilized to recover increased resolution through the use of super-resolution processes. The term sampling diversity refers to the fact that the images from different viewpoints sample the same object in the scene but with slight sub-pixel offsets. By processing the images with sub-pixel precision, additional information encoded due to the sub-pixel offsets can be recovered when compared to simply sampling the object space with a single image.

In the illustrated embodiment, the focal planes are configured in a 5×5 array. Each focal plane 154 on the sensor is capable of capturing an image of the scene. Typically, each focal plane includes a plurality of rows of pixels that also forms a plurality of columns of pixels, and each focal plane is contained within a region of the imager that does not contain pixels from another focal plane. In many embodiments, image data capture and readout of each focal plane can be independently controlled. In this way, image capture settings including (but not limited to) the exposure times and analog gains of pixels within a focal plane can be determined independently to enable image capture settings to be tailored based upon factors including (but not limited to) a specific color channel and/or a specific portion of the scene dynamic range. The sensor elements utilized in the focal planes can be individual light sensing elements such as, but not limited to, traditional CIS (CMOS Image Sensor) pixels, CCD (charge-coupled device) pixels, high dynamic range sensor elements, multispectral sensor elements and/or any other structure configured to generate an electrical signal indicative of light incident on the structure. In many embodiments, the sensor elements of each focal plane have similar physical properties and receive light via the same optical channel and color filter (where present). In other embodiments, the sensor elements have different characteristics and, in many instances, the characteristics of the sensor elements are related to the color filter applied to each sensor element.

In several embodiments, color filters in individual cameras can be used to pattern the camera module with π filter groups as further discussed in U.S. Provisional Patent Application No. 61/641,165 entitled "Camera Modules Patterned with pi Filter Groups" filed May 1, 2012, the disclosure of which is incorporated by reference herein in its entirety. These cameras can be used to capture data with respect to different colors, or a specific portion of the spectrum. In contrast to applying color filters to the pixels of the camera, color filters in many embodiments of the invention are included in the lens stack. Any of a variety of color filter configurations can be utilized including the configuration in FIG. 1C including eight Green cameras, four Blue cameras, and four Red cameras, where the cameras are more evenly distributed around the center of the camera. For example, a Green color camera can include a lens stack with a Green light filter that allows Green light to pass through the optical channel. In many embodiments, the pixels in each focal plane are the same and the light information captured by the pixels is differentiated by the color filters in the corresponding lens stack for each filter plane. Although a specific construction of a camera module with an optic array including color filters in the lens stacks is described above, camera modules including π filter groups can be implemented in a variety of ways including (but not limited to) by applying color filters to the pixels of the focal planes of the camera module similar to the manner in which color filters are applied to the pixels of a conventional color camera. In several embodiments, at least one of the cameras in the camera module can include uniform color filters applied to the pixels in its focal plane. In many embodiments, a Bayer filter pattern is applied to the pixels of one of the cameras in a camera module. In a number of embodiments, camera modules are constructed in which color filters are utilized in both the lens stacks and on the pixels of the imager array.

Although specific array cameras and imager arrays are discussed above, many different array cameras can be utilized to capture image data and synthesize images in accordance with embodiments of the invention. Systems and methods for detecting and correcting parallax in image data captured by an array camera in accordance with embodiments of the invention are discussed below.

Determining Parallax/Disparity

Figure 2:
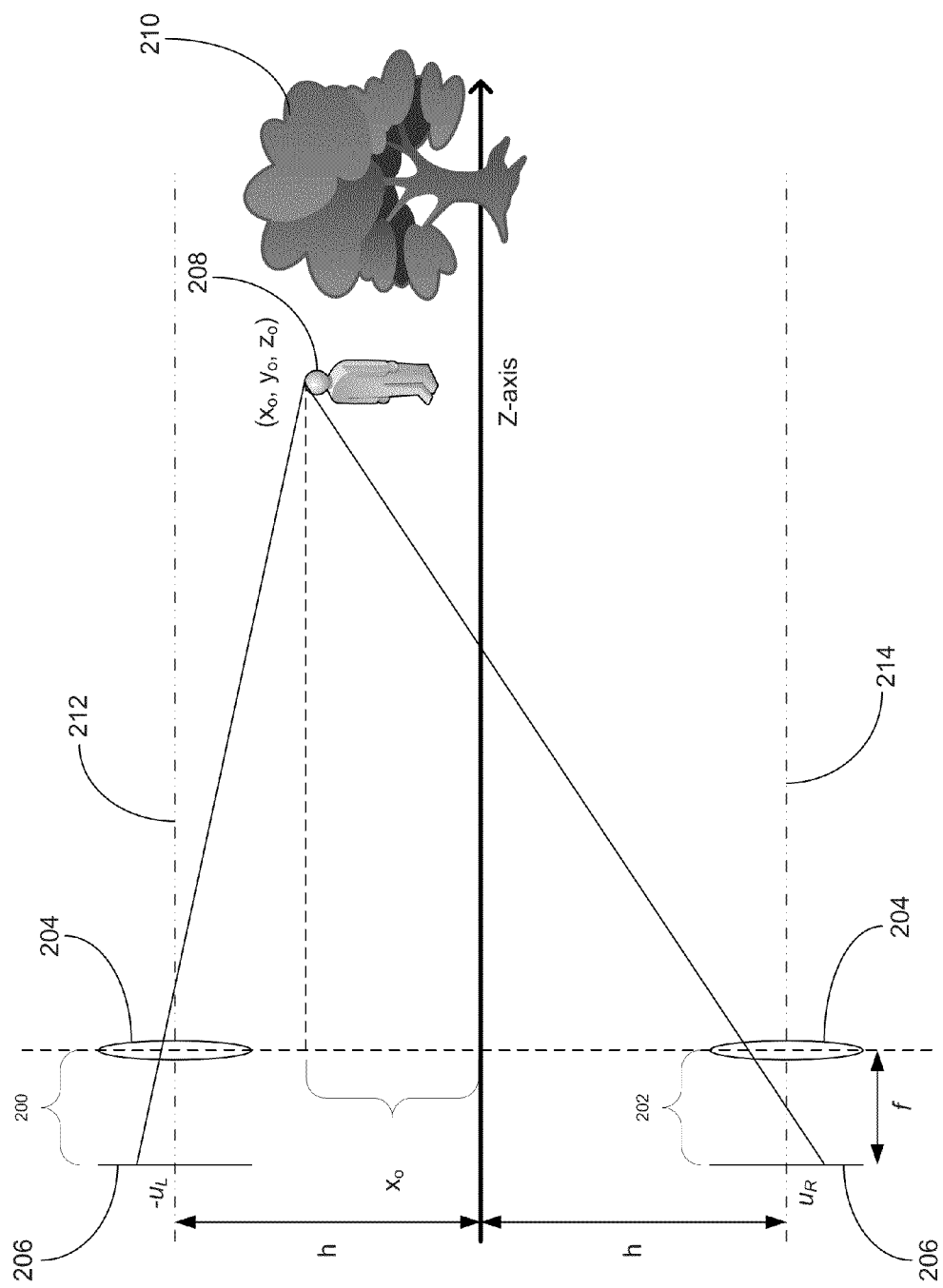
FIG. 2 conceptually illustrates capturing image data using a reference camera and an alternate view camera.
Figure 3:
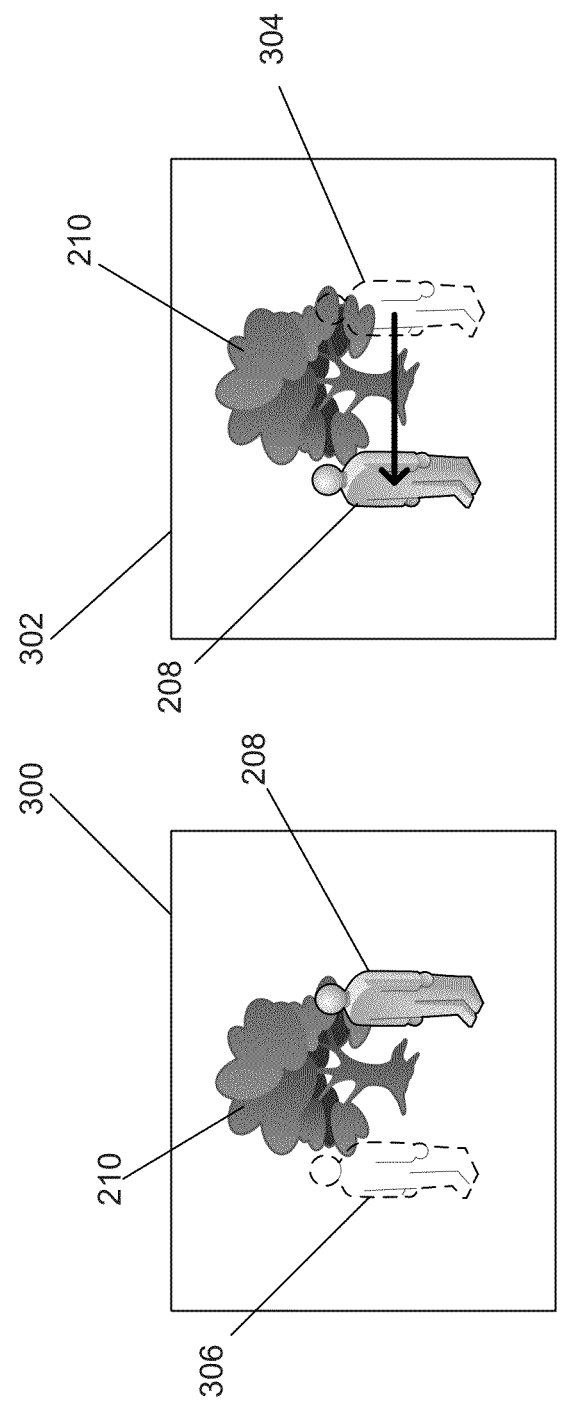
FIGS. 3A and 3B conceptually illustrate the effect of parallax in images of a scene captured by a reference camera and an alternate view camera.

In a number of embodiments, the individual cameras in the array camera used to capture the light field have similar fields of view, fixed apertures, and focal lengths. As a result, the cameras tend to have very similar depth of field. Parallax in a two camera system is illustrated in FIG. 2. The two cameras 200, 202, include a lens stack 204 and a focal plane 206. Each camera has a back focal length f, and the two cameras are separated by the baseline distance of 2h. The field of view of both cameras encompasses a scene including a foreground object 208 and a background object 210. The scene from the viewpoint of the first camera 200 is illustrated in FIG. 3A. In the image 300 captured by the first camera, the foreground object 208 appears located slightly to the right of the background object 210. The scene from the viewpoint of the second camera 202 is illustrated in FIG. 3B. In the image 302 captured by the second camera, the foreground object 208 appears shifted to the left hand side of the background object 210. The disparity introduced by the different fields of view of the two cameras 200, 202, is equal to the difference between the location of the foreground object 208 in the image captured by the first camera (indicated in the image captured by the second camera by ghost lines 304) and its location in the image captured by the second camera. As is discussed further below, the distance from the two cameras to the foreground object can be obtained by determining the disparity of the foreground object in the two captured images.

Referring again to FIG. 2, the point $(x_o, y_o, z_o)$ on the foreground object will appear on the focal plane of each camera at an offset from the camera's optical axis. The offset of the point on the focal plane of the first camera 200 relative to its optical axis 212 is shown as $-u_L$. The offset of the point on the focal plane of the second camera 202 relative to its optical axis 214 is shown as $u_R$. Using similar triangles, the offset between the images captured by the two cameras can be observed as follows:

$$\frac{h - x_o}{z_o} = \frac{-u_L}{f}$$

$$\frac{h + x_o}{z_o} = \frac{u_R}{f}$$

Combining the two equations yields the disparity (or parallax) between the two cameras as:

$$\Delta_{parallax} = u_R - u_L = \frac{2hf}{z_o}$$

From the above equation, it can be seen that disparity between images captured by the cameras is along a vector in the direction of the baseline of the two cameras, which can be referred to as the epipolar line between the two cameras.

Furthermore, the magnitude of the disparity is directly proportional to the baseline separation of the two cameras and the back focal length of the cameras and is inversely proportional to the distance from the camera to an object appearing in the scene.

Occlusions In Array Cameras

When multiple images of a scene are captured from different perspectives and the scene includes foreground objects, the disparity in the location of the foreground object in each of the images results in portions of the scene behind the foreground object being visible in some but not all of the images. A pixel that captures image data concerning a portion of a scene, which is not visible in images captured of the scene from other viewpoints, can be referred to as an occluded pixel. Referring again to FIGS. 3A and 3B, when the viewpoint of the second camera is selected as a reference viewpoint the pixels contained within the ghost lines 304 in the image 302 can be considered to be occluded pixels (i.e. the pixels capture image data from a portion of the scene that is visible in the image 302 captured by the second camera 202 and is not visible in the image 300 captured by the first camera 200). The pixels contained in the ghost line 306 in the first image can be considered to be revealed pixels (i.e. pixels that are not visible in the reference viewpoint, but that are revealed by shifting to an alternate viewpoint). In the second image, the pixels of the foreground object 208 can be referred to as occluding pixels as they capture portions of the scene that occlude the pixels contained within the ghost lines 304 in the image 302. Due to the occlusion of the pixels contained within the ghost lines 304 in the second image 302, the distance from the camera to portions of the scene visible within the ghost lines 304 cannot be determined from the two images as there are no corresponding pixels in the image 300 shown in FIG. 3A.

As is discussed further below, increasing the number of cameras capturing images of a scene from different viewpoints in complementary occlusion zones around the reference viewpoint increases the likelihood that every portion of the scene visible from the reference viewpoint is also visible from the viewpoint of at least one of the other cameras. When the array camera uses different cameras to capture different wavelengths of light (e.g. RGB), distributing at least one camera that captures each wavelength of light in the quadrants surrounding a reference viewpoint can significantly decrease the likelihood that a portion of the scene visible from the reference viewpoint will be occluded in every other image captured within a specific color channel. The distribution of color filters in array cameras to reduce the likelihood of occlusions in accordance with embodiments of the invention is discussed further in U.S. Provisional Patent Application Ser. No. 61/641,164 entitled "Camera Modules Patterned with π Filter Groups", to Nisenzon et al., filed May 1, 2012, the disclosure of which is incorporated herein by reference in its entirety.

Using Disparity To Generate Depth Maps in Array Cameras

Array cameras in accordance with many embodiments of the invention use disparity observed in images captured by the array cameras to generate a depth map. A depth map is typically regarded as being a layer of metadata concerning an image that describes the distance from the camera to specific pixels or groups of pixels within the image (depending upon the resolution of the depth map relative to the resolution of the original input images). Array cameras in accordance with a number of embodiments of the invention use depth maps for a variety of purposes including (but not limited to) generating scene dependent geometric shifts during the synthesis of a high resolution image and/or performing dynamic refocusing of a synthesized image.

Based upon the discussion of disparity above, the process of determining the depth of a portion of a scene based upon pixel disparity is theoretically straightforward. When the viewpoint of a specific camera in the array camera is chosen as a reference viewpoint, the distance to a portion of the scene visible from the reference viewpoint can be determined using the disparity between the corresponding pixels in some or all of the images captured by the camera array. In the absence of occlusions, a pixel corresponding to a pixel in the image captured from the reference viewpoint will be located in each non-reference or alternate view image along an epipolar line (i.e. a line parallel to the baseline vector between the two cameras). The distance along the epipolar line of the disparity corresponds to the distance between the camera and the portion of the scene captured by the pixels. Therefore, by comparing the pixels in the captured images that are expected to correspond at a specific depth, a search can be conducted for the depth that yields the pixels having the highest degree of similarity. The depth at which the corresponding pixels in the captured images have the highest degree of similarity can be selected as the most likely distance between the camera and the portion of the scene captured by the pixel. As is discussed below, similarity can be determined with respect to corresponding pixels within a single spectral channel, within multiple spectral channels, and/or across spectral channels as appropriate to the requirements of specific applications in accordance with embodiments of the invention.

Many challenges exist, however, in determining an accurate depth map using the method outlined above. In several embodiments, the cameras in an array camera are similar but not the same. Therefore, image characteristics including (but not limited to) optical characteristics, different sensor characteristics (such as variations in sensor response due to offsets, different transmission or gain responses, non-linear characteristics of pixel response), noise in the captured images, and/or warps or distortions related to manufacturing tolerances related to the assembly process can vary between the images reducing the similarity of corresponding pixels in different images. In addition, super-resolution processes rely on sampling diversity in the images captured by an imager array in order to synthesize higher resolution images. However, increasing sampling diversity can also involve decreasing similarity between corresponding pixels in captured images in a light field. Given that the process for determining depth outlined above relies upon the similarity of pixels, the presence of photometric differences and sampling diversity between the captured images can reduce the accuracy with which a depth map can be determined.

The generation of a depth map is further complicated by occlusions. As discussed above, an occlusion occurs when a pixel that is visible from the reference viewpoint is not visible in one or more of the captured images. The effect of an occlusion is that at the correct depth, the pixel location that would otherwise be occupied by a corresponding pixel is occupied by a pixel sampling another portion of the scene (typically an object closer to the camera). The occluding pixel is often very different to the occluded pixel. Therefore, a comparison of the similarity of the pixels at the correct depth is less likely to result in a significantly higher degree of similarity than at other depths. Effectively, the occluding pixel acts as a strong outlier masking the similarity of those pixels, which in fact correspond at the correct depth. Accordingly, the presence of occlusions can introduce a strong source of error into a depth map.

Figure 4:
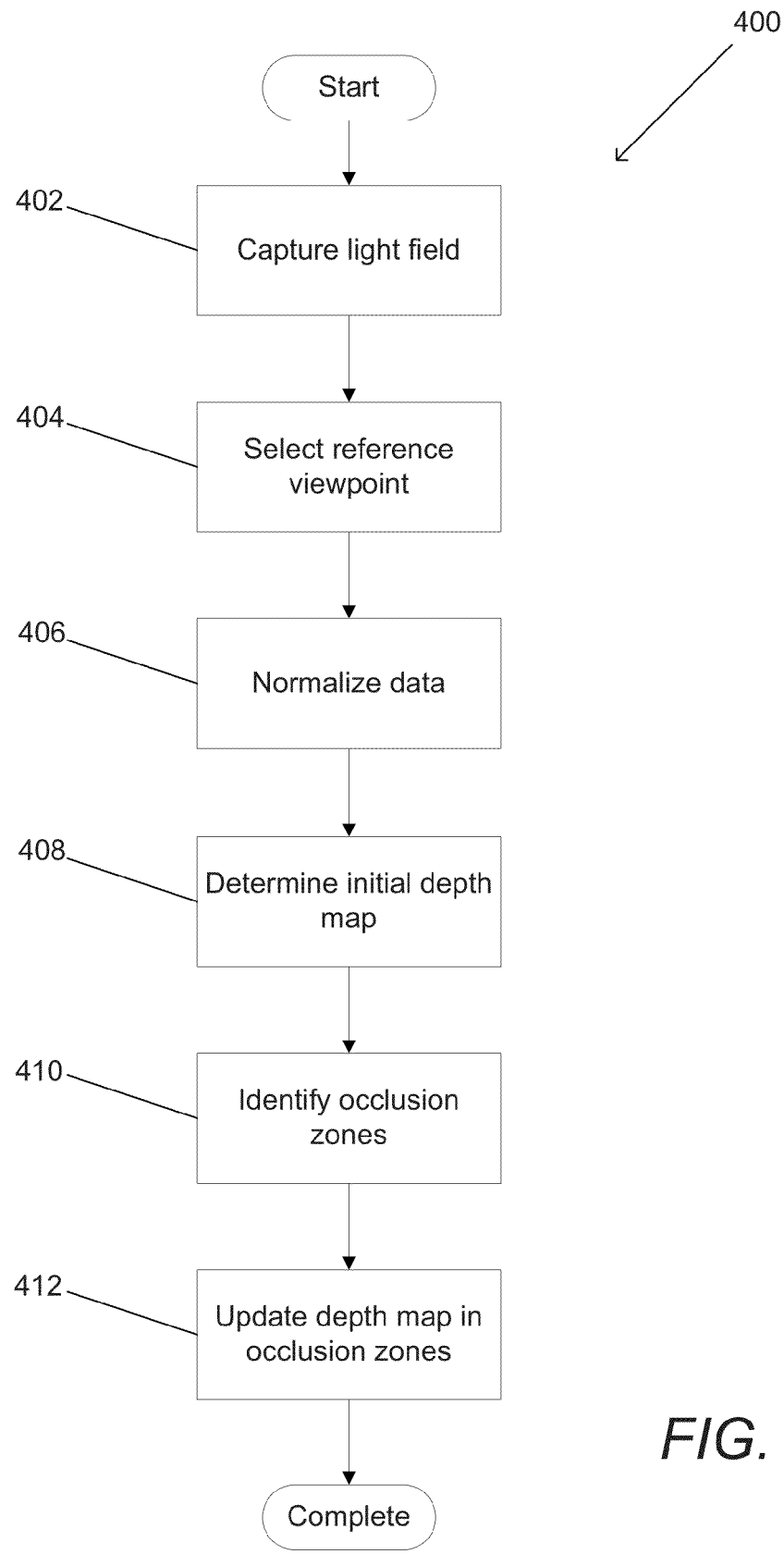
FIG. 4 is a flowchart illustrating a process for generating a depth map from a captured light field including a plurality of images captured from different viewpoints in accordance with an embodiment of the invention.

Processes for generating depth maps in accordance with many embodiments of the invention attempt to minimize sources of error that can be introduced into a depth map by sources including (but not limited to) those outlined above. A general process for generating a depth map in accordance with an embodiment of the invention is illustrated in FIG. 4. The process 400 involves capturing (402) a light field using an array camera. In a number of embodiments, a reference viewpoint is selected (404). In many embodiments, the reference viewpoint is predetermined. In several embodiments, the reference viewpoint can be determined based upon the captured light field or a specific operation requested by a user of the array camera (e.g. generation of a stereoscopic 3D image pair). Prior to determining a depth map, the raw image data is normalized (406) to increase the similarity of corresponding pixels in the captured images. In many embodiments, normalization involves utilizing calibration information to correct for variations in the images captured by the cameras including (but not limited to) photometric variations and scene-independent geometric distortions introduced by each camera's lens stack. In several embodiments, the normalization of the raw image data also involves pre-filtering to reduce the effects of aliasing and noise on the similarity of corresponding pixels in the images, and/or rectification of the image data to simplify the geometry of the parallax search. The filter can be a Gaussian filter or an edge-preserving filter, a fixed-coefficient filter (box) and/or any other appropriate filter. In a number of embodiments, normalization also includes resampling the captured images to increase the similarity of corresponding pixels in the captured images by correcting for geometric lens distortion, for example. Processes performed during the normalization or raw image data in accordance with embodiments of the invention are discussed further below.

An initial depth map is determined (408) for the pixels of an image captured from the reference viewpoint. The initial depth map is used to determine (410) likely occlusion zones and the depths of pixels in the occlusion zones are updated (412) by determining the depths of the pixels in occlusion zones using images in which a corresponding pixel is visible. As is discussed further below, depth estimates can be updated using competing subsets of images corresponding to different visibility patterns encountered in real world scenes. Although a specific sequence is shown in FIG. 4, in many embodiments occlusion zones are detected at the same time the initial depth map is generated.

A normalization process involving resampling the raw image data to reduce scene-independent geometric differences can reduce errors by correcting linear and/or non-linear lens distortion which might otherwise compromise the ability to match corresponding pixels in each of the captured images. In addition, updating the depth map in occlusion zones with depth measurements that exclude occluded pixels further reduces sources of error in the resulting depth map. Although a general process for generating a depth map is illustrated in FIG. 4, variations and alternatives to the illustrated processes for generating depth maps can be utilized in accordance with embodiments of the invention. Processes for calibrating raw image data, determining initial depth maps, and for updating depth maps to account for occlusions in accordance with embodiments of the invention are discussed further below.

Increasing Similarity of Corresponding Pixels in Captured Image Data

The greater the similarity between the images captured by each of the cameras in an array camera, the higher the likelihood that a measurement of corresponding pixels in the images at different hypothesized depths will result in highest similarity being detected at the correct depth. As is disclosed in U.S. patent application Ser. No. 12/935,504 (incorporated by reference above) the images captured by cameras in an array camera typically differ in a number of ways including (but not limited to) variations in the optics from one camera to another can introduce photometric differences, aliasing, noise, and scene-independent geometric distortions. Photometric differences and scene-independent geometric distortions can be corrected through filtering and calibration. Photometric calibration data used to perform photometric normalization and scene-independent geometric corrections that compensate for scene-independent geometric distortions can be generated using an off line calibration process and/or a subsequent recalibration process. The photometric calibration data can be provided to a photometric normalization module or process that can perform any of a variety of photometric adjustments to the images captured by an array camera including (but not limited to) pre-filtering to reduce the effects of aliasing and noise, Black Level calculation and adjustments, vignetting correction, and lateral color correction. In several embodiments, the photometric normalization module also performs temperature normalization. The scene-independent geometric corrections determined using a calibration process can also be applied to the captured images to increase the correspondence between the images. When the captured images are used to synthesize a higher resolution image using super-resolution processing, the scene-independent geometric corrections applied to the images are typically determined at a sub-pixel resolution. Accordingly, the scene-independent geometric corrections are typically determined with a higher degree of precision than the corrections utilized during registration in conventional stereoscopic 3D imaging. In many embodiments, the scene-independent geometric corrections also involve rectification to account for distortion and rotation of the lenses of the array camera relative to the focal planes so that the epipolar lines of the non-reference images are easily aligned with those of the image captured from the reference viewpoint. By normalizing geometrically in this way, the searches performed to determine the depths of corresponding pixels can be simplified to be searches along straight lines in various cameras, and the precision of depth measurements can be improved.

Systems and methods for calibrating array cameras to generate a set of scene-independent geometric corrections and photometric corrections that can be applied to images captured by an array camera in accordance with embodiments of the invention are described in U.S. Patent Application Ser. No. 61/780,748, entitled "Systems and Methods for Calibration of an Array Camera" to Mullis, Jr., filed Mar. 13, 2013, the disclosure of which is incorporated by reference in its entirety.

In a number of embodiments, the correspondence of the pixels in the captured images is increased by resampling the images to detect objects to sub-pixel precision shifts in the fields of view of the cameras in the array camera.

Figure 5:
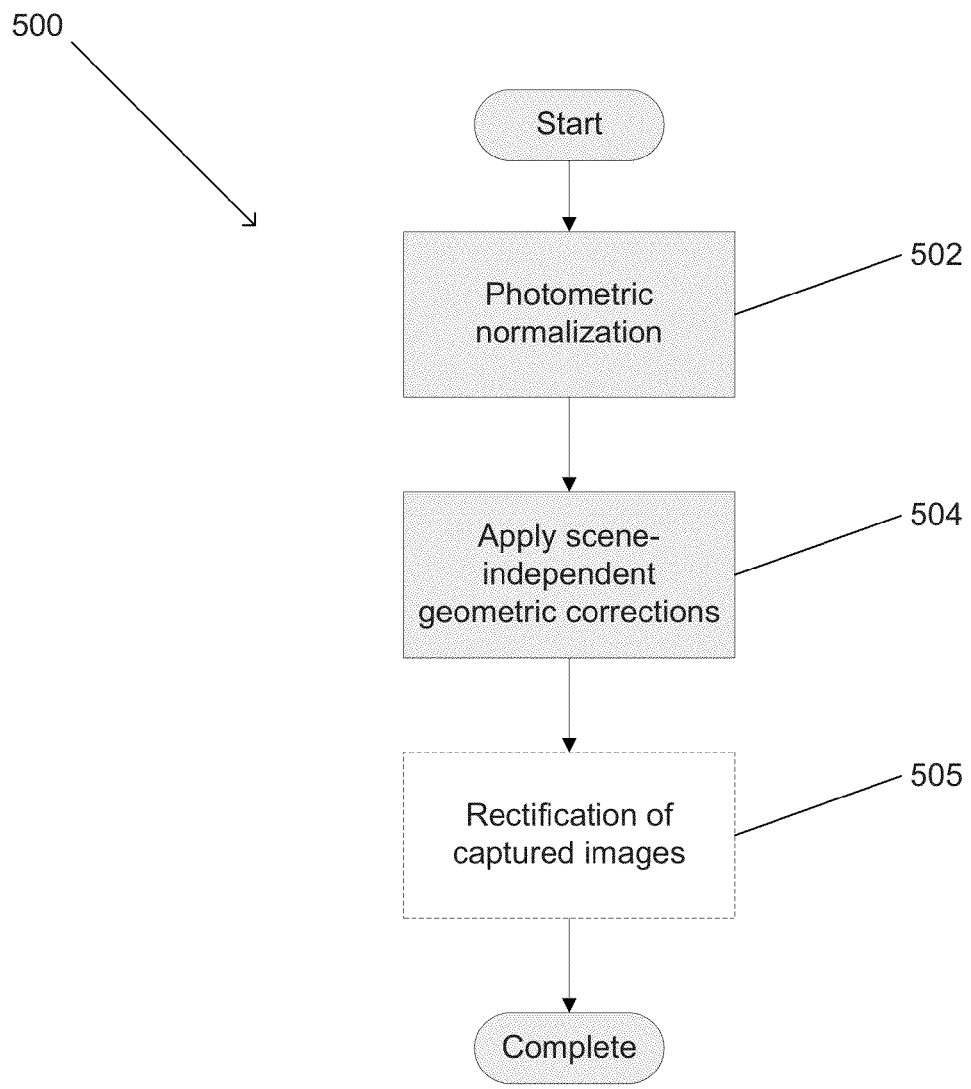
FIG. 5 is a flowchart of a process for normalizing captured image data in accordance with an embodiment of the invention.

A process for applying corrections to images captured by an array camera to increase the correspondence between the captured images in accordance with embodiments of the invention is illustrated in FIG. 5. The process 500 includes photometrically normalizing the captured images (502), applying scene-independent geometric corrections (504) to the normalized images. In some embodiments, an additional rectification process (505) is needed to ensure that all cameras are co-planar and parallax search can be reduced to epipolar lines only. The processes shown in FIG. 5 increase the correspondence between the resulting images. Therefore, searches for pixel correspondence between the images are more likely to result in accurate depth measurements.

Although specific processes for increasing the correspondence between images captured by an array camera(s) in accordance with embodiments of the invention are discussed above with respect to FIG. 5, any of a variety of processes that increase the correspondence between the captured images can be utilized prior to generating a depth map in accordance with embodiments of the invention. Processes for generating depth maps in accordance with embodiments of the invention are discussed further below.

Generating a Depth Map

The process of generating a depth map involves utilizing disparity between images to estimate the depth of objects within a scene. As noted above, occlusions can impact the reliability of depth measurements obtained using cost functions in the manner outlined above. Typically such occlusions will manifest themselves as significant mismatches according to the similarity metric used to compare corresponding pixels (potentially masking the similarity of the visible pixels). However, many embodiments of the invention generate an initial depth map and then address any errors that may have been introduced into the creation of the initial depth map by occlusions. In several embodiments, the initial depth map is utilized to identify pixels in the image captured from a reference viewpoint that may be occluded in images captured by the array camera from other viewpoints. When an occlusion is detected, the depth information for the pixel in the image captured from the reference viewpoint can be updated by excluding pixels from the image in which the pixel is occluded from the similarity comparisons. In several embodiments, depth estimates impacted by occlusions can be updated using competing subsets of images corresponding to different visibility patterns encountered in real world scenes. In certain embodiments, the updated depth estimates can be utilized to identify corresponding pixels that are occluded and the depth estimation process iterated using the visibility information so that the impact of occlusions on the precision of the depth map can be reduced. In several embodiments, the process of generating updated depth estimates using subsets of images is sufficiently robust that the need to iteratively refine the depth map and visibility estimates can be reduced or eliminated.

Figure 6:
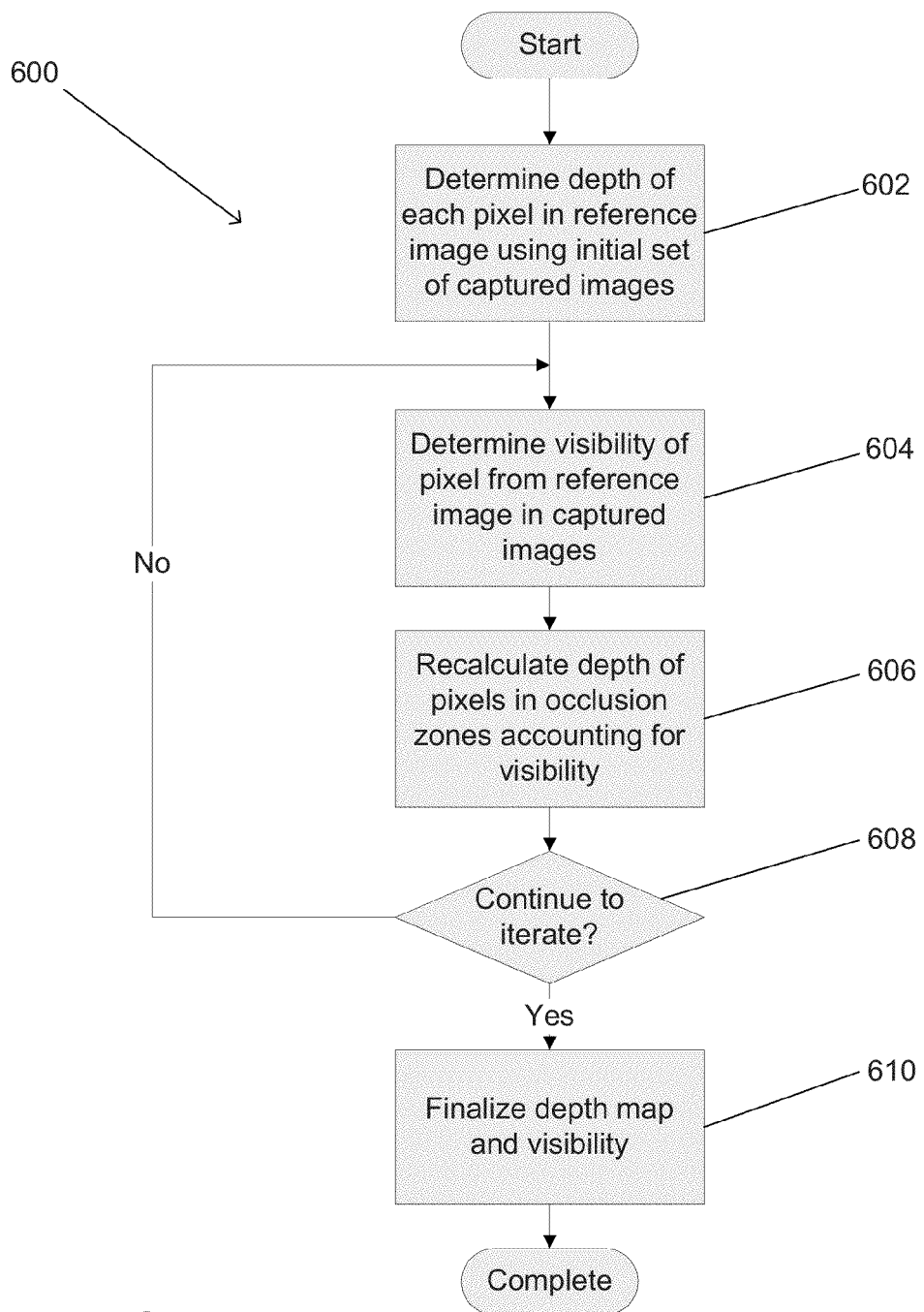
FIG. 6 is a flowchart of a process for iteratively refining a depth map based upon visibility information in accordance with embodiments of the invention.

A process for determining depth of pixels in an image captured from a reference viewpoint in accordance with an embodiment of the invention is illustrated in FIG. 6. The process 600 includes determining (602) an initial depth map using some or all of the images captured by an array camera. The visibility of each pixel in the image captured from the reference viewpoint in each of the captured images is then determined (604). Where a corresponding pixel location is occluded, the depth of the pixel in the image captured from the reference viewpoint can be recalculated (606) excluding the image in which the corresponding pixel location is occluded from the cost function. A decision (608) is made concerning whether to continue to iterate. As depth measurements in occlusion zones are refined, additional information is obtained concerning the visibility of pixels within the occlusion zones in each of the captured images. Therefore, repeating the recalculation of the depths of pixels in the occlusion zones as the visibility information is refined can iteratively improve the precision of the depth map. Any of a variety of termination conditions appropriate to a specific application can be utilized to determine when to terminate the iterative loop including (but not limited to) the completion of a predetermined number of iterations and/or the number of pixels for which updated depth information is determined in a specific pass through the iterative loop falling below a predetermined number. In several embodiments, a single iteration only is performed due to the exploitation of subsets of the set of images corresponding to real world visibility patterns to update depth estimates generated using mismatched pixels.

Once a finalized depth map is obtained, the visibility of each of the pixels in the captured images is determined (610) and the depth map and/or visibility information can be utilized for a variety of purposes including but not limited to the synthesis of a high resolution image using super-resolution processing.

Figure 7:
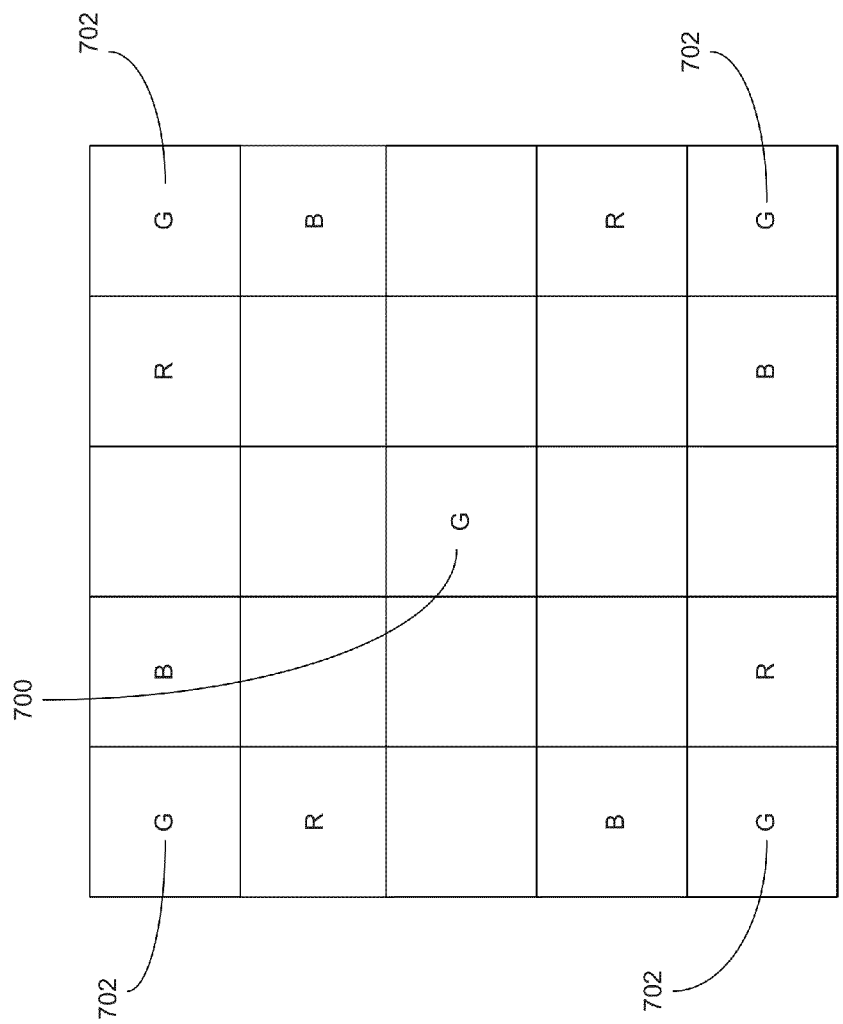
FIG. 7 conceptually illustrates a subset of cameras within an array camera that can be utilized to generate estimates of distances to objects within a scene in accordance with an embodiment of the invention.

The computational complexity of a process similar to the process illustrated in FIG. 7 depends on the number of images compared when performing depth determinations. The further a camera is from the reference viewpoint the larger the disparity that will be observed. In addition, the furthest cameras in the array encompass all the other cameras within their envelope. Typically larger magnitude shifts enable depth to be determined with greater precision. Therefore, using a camera that captures an image from a reference viewpoint and the cameras that are furthest from that camera to determine depth information can improve precision of the detected depth. In addition, using an aggregated cost originating from cameras with various baselines and directions can significantly improve reliability of depth estimates due to increased likelihood of reducing periodicity in matches. In the case of a 5×5 array (see FIG. 7), the central Green camera (700) can be utilized to capture an image from a reference viewpoint and the image data captured by the central camera can be compared to image data captured by the Green cameras (702) located in the four corners of the array to determine depth. In other arrays, images captured by any of a variety of combinations of cameras can be utilized to determine depth in accordance with embodiments of the invention. As is discussed further below, selection of specific subsets of cameras can decrease the likelihood that a pixel in a reference image will be occluded in image data captured by other cameras in the subset.

Although a specific process for generating a depth map and/or visibility information in accordance with an embodiment of the invention is illustrated in FIG. 6, any of a variety of processes can be utilized that involve determining an initial depth map and then refining the depth map by detecting occluded pixels and updating the depth measurements to exclude occluded pixels. Specific processes for determining depth and visibility of pixels in accordance with embodiments of the invention are discussed further below.

Determining an Initial Depth Map

Processes for determining the distance from an array camera to an object in a scene involve locating the depth at which corresponding pixels in images captured by the array camera have the highest degree of similarity. As discussed above, at a specific depth a pixel in an image captured from a reference viewpoint will shift a known distance along an epipolar line between the reference viewpoint and each of the cameras in the camera array. The pixel in the image captured from the reference viewpoint and the "shifted" pixels in the other images (i.e. the pixels in the images located in locations determined based upon the anticipated shift for a specific distance) are the corresponding pixels. When a hypothesized depth is incorrect, the corresponding pixels may exhibit very little similarity (although in some scenes incorrect depths have high degrees of similarity due to features such as periodic texture). When the hypothesized depth is correct, the corresponding pixels will ideally exhibit the highest degree of similarity of any of the hypothesized depths. When a depth map is used in super-resolution processing of a captured light field, a depth map can be determined with sufficient precision to enable detection of sub-pixel shifts. In super-resolution processing, it is the scene-dependent shifts that are utilized and not the depth directly. Therefore, the ability to detect depth corresponding to sub-pixel shift precision can significantly improve the performance of the super-resolution processing. The manner in which resampling of the pixels of the captured images can be utilized to determine depth with sub-pixel shift precision is discussed further below.

In many embodiments, a parallax search of a number of depths within a range in physical distance (e.g. 20 cm to infinity) is utilized to inform the disparities searched when performing depth estimation. The search range can be divided into a number of depth indices such that the parallax shifts between consecutive depth indices is constant in pixels for a particular image and is set based upon a minimum sub-pixel precisions as measured for the images captured by cameras in the array corresponding to the largest baselines with respect to the reference viewpoint (see for example FIG. 7). This increases the likelihood of sufficient accuracy in the depth estimates for use as inputs to a super-resolution process. In other embodiments, consecutive depth indices need not correspond to constant pixel shifts and the depth search can adapt based upon the characteristics of the scene.

In several embodiments, a cost function is utilized to determine the similarity of corresponding pixels. The specific cost function that is used typically depends upon the configuration of the array camera, the number of images captured by the array camera, and the number of color channels utilized by the array camera. In a number of embodiments, the array camera includes a single color channel and/or a depth map is generated using cameras within a single color channel. Where image data from within a single color channel is utilized to generate the depth map, a cost function can be utilized that measures the variance of the corresponding pixels. In several embodiments, sums of L1 norms, L2 norms, or some other metrics can be used. For example, the aggregation of similarity metrics with respect to a target (typically reference but non-reference may also be used). The smaller the variance, the greater the similarity between the pixels.

Image data from multiple spectral channels can also be utilized to generate a depth map. In several embodiments, the depth at a given pixel location is estimated by looking at the similarity of corresponding pixels from images within each of the spectral channels. In a number of embodiments, the process of determining the depth at a given pixel location also involves using information concerning the similarity of corresponding pixels from images across different spectral channels. Cost functions that can be utilized when generating a depth map using image data captured using multiple color channels include (but are not limited to) L1 norms, L2 norms, or a combination of L1 and L2 norms, of the combinations of image data from the different color channels and/or the variance/standard deviation of corresponding pixels within multiple individual color channels. In other embodiments, truncated versions of the L1 and L2 norms and/or any block-based similarity measure based on rank, census, correlation, and/or any other appropriate metric such as those practiced in multiview stereo disparity detection techniques can be utilized.

As is discussed further below, many embodiments of the invention utilize subsets of cameras including cameras from multiple color channels grouped based upon characteristics of natural scenes when determining the depth of a pixel location in an image form a reference viewpoint to decrease the likelihood that a given pixel location is occluded in the alternate view images captured by the other cameras in the subset of cameras. Where an array camera utilizes a Bayer filter in the camera that captures an image from the reference viewpoint, then a variety of cost functions can be utilized to determine pixel similarity including (but not limited to) cost functions that measure the combination of Red variance, Green variance, and Blue variance. In addition, different cost functions can be applied to the pixels in different regions of an image. In several embodiments, a depth map is generated from image data captured by a central Green camera and a cluster of Red, Blue and Green cameras in each of the four corners of a camera array using this technique (see for example FIG. 7).

Figure 8:
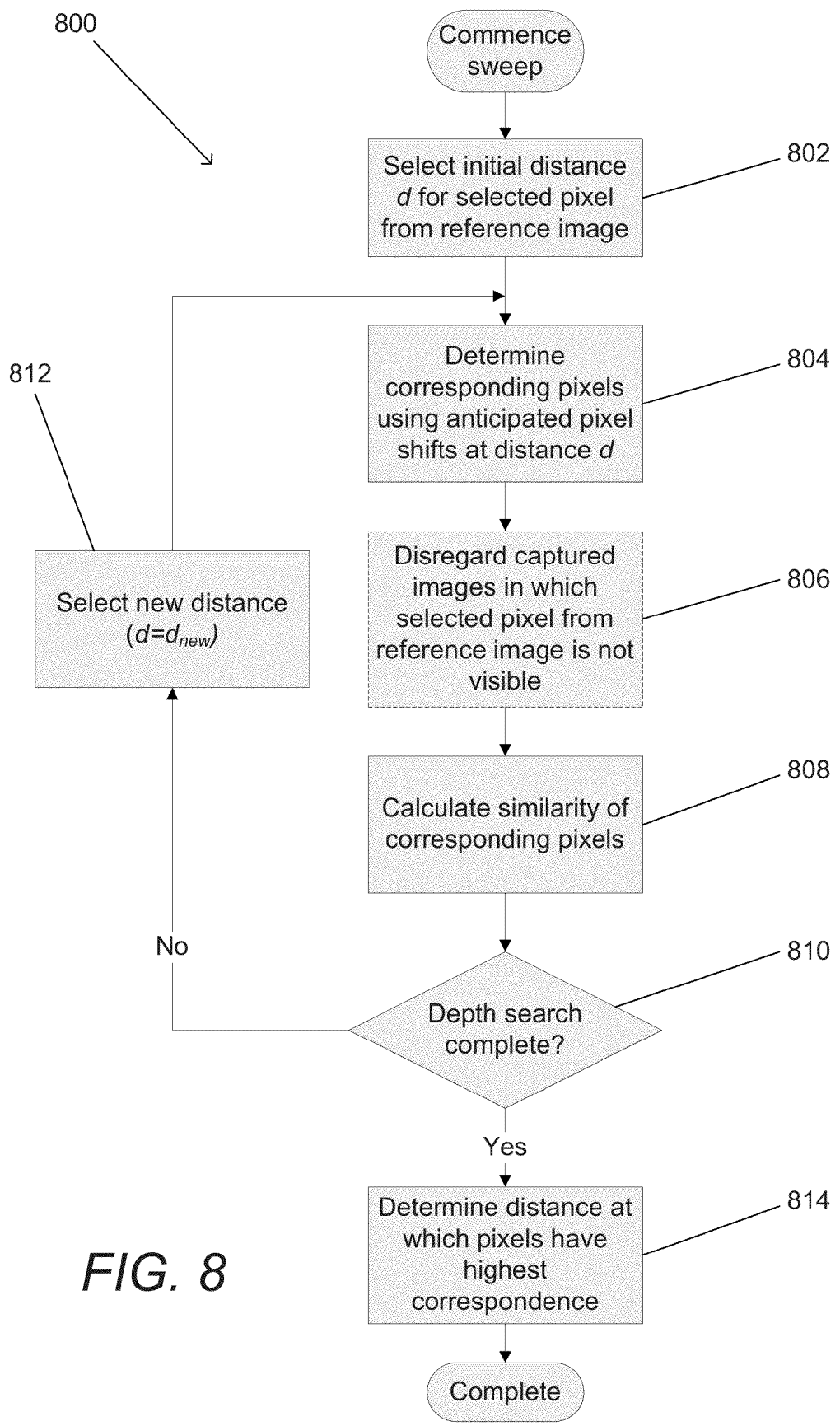
FIG. 8 is a flowchart illustrating a process for performing a disparity search using visibility information in accordance with an embodiment of the invention.

A process for determining the depth of a pixel using images captured by an array camera in accordance with an embodiment of the invention is illustrated in FIG. 8. The process 800 includes selecting (802) an initial hypothesized depth or distance d for a selected pixel from an image captured from a reference viewpoint. Based upon the location of the pixel within the reference image and information concerning the baseline between the reference viewpoint and the viewpoints of the other cameras used to perform the depth measurement, the corresponding pixel locations in each of the captured images at the hypothesized depth d are determined (804). In many embodiments, the input images to the parallax detection process are not geometrically corrected, and the geometric correction is applied on-the-fly by adding a vector offset to the parallax shift during the search to identify corresponding pixels at a given depth d. In other embodiments, the geometric correction is applied to the images before the search commences during a normalization process and no geometric correction vector must be added during the search when calculating pixel correspondences (i.e. the geometric corrections are pre-calculated). In the latter case, the pre-correction of geometric distortion can make the algorithm significantly more efficient on parallel processors such as SIMD and GPUs.

As noted above, occlusions can introduce errors into depth estimates. When occlusion/visibility information is available, occluded pixels can be disregarded (806) as part of the depth measurement. When information concerning the visibility of pixels is not available (e.g. during the generation of an initial depth map and/or during the generation of a depth estimate using a subset of images), the similarity of all of the pixels in the corresponding pixel locations is used to determine depth. As is discussed below with reference to FIGS. 8A-8I, initial depth searches can be performed with respect to image data captured from subsets of images captured by the array camera to identify a specific subset of cameras in which a given pixel in the reference image is visible.

When the corresponding pixels have been identified, the similarity of the corresponding pixels can be measured (808). In many embodiments, the similarity of the pixels is determined using a cost function. The specific cost function utilized depends upon the pixel information that is compared. As noted above, in one embodiment, when pixels from a single color channel are compared the cost function can consider L1 norms, L2 norms, and/or the variance of corresponding pixels. When pixels from multiple color channels are compared, more complex cost functions can be utilized including (but not limited to) cost functions that incorporate the L1 and/or L2 norms of the image data from multiple color channels and/or the variance/standard deviation of corresponding pixels within multiple individual color channels. In other embodiments, truncated versions of the L1 and L2 norms and/or any block-based similarity measure based on rank, census, correlation, and/or any other appropriate metric such as those practiced in multiview stereo disparity detection techniques can be utilized. In several embodiments, the process of determining similarity utilizing a cost function involves spatially filtering the calculated costs using a filter such as (but not limited to) a fixed-coefficient filter (such as a Gaussian filter), or in an alternative embodiment, an edge-preserving filter. In the latter embodiment, filtering with an edge-preserving filter in this way is a form of adaptive support that utilizes information from photometrically similar neighboring pixels to improve the depth estimates. Without the filtering the depth measurements are pixel-wise and are noisier than if they are filtered. Smoothing the cost function using adaptive support can prevent the generation of incorrect depths. In a number of embodiments, the calculated costs are spatially filtered using a bilateral filter, where the bilateral filter weights are determined from the reference image but, in contrast to a normal bilateral filter, the resulting filter weights applied to the calculated costs and not the reference image. In this way the reference image data can be used as a guide to improve the denoising of the cost estimates. In a number of embodiments, a box filter and/or any other filter appropriate to the requirements of a specific application can be utilized.

The calculation of the cost function for corresponding pixels at different depths is repeated sweeping across a range of hypothesized depths (812) until the depth search is complete (810). The most likely depth can then be determined (814) as the hypothesized depth at which the (filtered) cost function indicates that the corresponding pixels have the highest level of similarity. In several embodiments, for a given depth computation early termination can occur if a single camera shows a very high mismatch. In this condition, the process can skip onto the next hypothesized depth since match at the current depth would be unacceptable. In many embodiments, the process of performing depth sampling (i.e. comparing pixels in alternate view images based upon the disparity at a specific depth) involves sampling depth uniformly in disparity space. Stated another way, depth samples can be taken at uniform pixel shifts along an epipolar line. In a number of embodiments, the search does not involve uniform sampling in disparity space. In several embodiments, the search exploits image characteristics to increase the efficiency of the search. In several embodiments, the search uses prior information about where objects are in the scene, such as from a coarser or lower spatial resolution depth map or reduced search resolution in disparity (e.g. from an image preview), to determine or restrict which depths are sampled in trying to form a higher resolution depth map. For example, a preview depth map may be used to determine that there are no objects beyond a particular distance, in which case for the depth search, no depth samples would be allocated beyond that distance.

Many images exhibit regions of similar color, therefore, the search for the most likely hypothesized depth can be performed intelligently by selecting a first set of hypothesized depths that are more coarsely distributed across the range of possible hypothesized depths and then locating the depth among these that exhibits the highest degree of similarity. A second search can then be performed to refine within a more granular range of depths around the depth that exhibited the highest degree of similarity in the first set of depths. In the event that the more granular search fails and the best pixel found is not from a region exhibiting similar color, a full search can be performed across the entire range of depths at more precise intervals than in the original first coarse search. However, if a satisfactory match is found in the second search, the depth that exhibits the highest level of similarity within the second search can be used as the most likely hypothesized depth.

In many embodiments, searches for the most likely depth of a pixel are performed utilizing depth information determined for adjacent pixels. In several embodiments, the search is performed by searching around the depth of one or more adjacent pixels, by searching around a depth determined based on the depths of adjacent pixels (e.g. based on the average depth of adjacent pixels or based on linear interpolations of pairs adjacent pixels) and/or by searching around a previously identified depth (e.g. a depth determined with respect to a preview image and/or a previous frame in a video sequence). Searching in this way can also simplify the application of spatial filters when determining depth (see discussion below). In other embodiments, any of a variety of techniques can be utilized to reduce the computational complexity of locating the most likely depth of the pixels in an image.

Although specific processes for determining the depth of a pixel in an image captured from a reference viewpoint are discussed above with respect to FIG. 8, any of a variety of processes can be utilized to determine the depth of a pixel including process that determine the depth of a pixel from a virtual viewpoint based upon a plurality of images captured by an array camera. Processes similar to the process illustrated in FIG. 8 can be utilized to generate an initial depth map and then to refine the depth map by ignoring images in which a corresponding pixel to a pixel location in an image from the reference viewpoint is occluded. Processes for determining pixel correspondence using adaptive support in accordance with embodiments of the invention are discussed further below.

Determining Pixel Correspondence in the Presence of Occlusions

Wherever there is a depth transition or discontinuity in the reference viewpoint, pixels adjacent the depth transition are likely to be occluded in at least one of the images captured by the array camera. Specifically, the pixels adjacent to the transition that are further in distance from the camera are likely to be occluded by the pixels adjacent the camera that are closer to the camera. Ideally, a depth map is determined using an aggregated cost function CV(x,y,d) for each visible camera i in the array that excludes occluded pixels as follows:

$$CV(x, y, d) = \sum_i \frac{\text{Cost}^{i,Ref}(x, y, d) \times V^{i,Ref}(x, y)}{\text{number of visible cameras at } (x, y)}$$

where $\text{Cost}^{i,Ref}(x,y,d)$ is a similarity measure (i.e. the cost function), d is depth of pixel (x, y), and $V^{i,Ref}(x,y)$ is the visibility of pixel (x, y) and initially $V^{i,Ref}(x,y)=1$ for all cameras.

In a number of embodiments, the individual costs $\text{Cost}^{i,Ref}(x,y,d)$ are computed based on each disparity hypothesis d for each pixel (x, y) for cameras i, Ref as follows:

$$\text{Cost}^{i,Ref}(x,y,d) = S\{I^i(x,y,d), I^{Ref}(x,y,d)\}$$

where S is the similarity measure (for example), and $I^i$ is the calibrated image i after geometric calibration.

In several embodiments, the process of generating an aggregated cost can involve use of images to which the scene-dependent geometric shifts corresponding to a specific hypothesized or candidate depth are applied to all pixels in the image. In this way, a shifted image can be generated for each candidate depth searched. Using the shifted images, an aggregated cost at each depth for a specific pixel location (x, y) in an image from the reference viewpoint can be generated in the manner outlined above utilizing the similarity between the shifted images and the reference image. In addition, the aggregated cost can consider the similarity of the shifted images at the candidate depth as follows:

$$CV(x, y, d) = \sum_{k \in K} \frac{(x, y) \text{Cost}^{k, Ref}(x, y, d) \times V^{k, Ref}}{\text{number of cameras in } K} +$$

$$\sum_{i, j \in L} \frac{\text{Cost}^{i,j}(x, y, d) \times V^{i, Ref}(x, y) \times V^{j, Ref}(x, y)}{\text{number of pairs of cameras in } L}$$

Where K is a set of cameras in the same spectral channel as the reference camera, L is a set of pairs of cameras, where both cameras in each pair are in the same spectral channel (which can be a different spectral channel to the reference camera where the light field includes image data in multiple spectral channels), $\text{Cost}^{k, Ref}(x,y,d) = S\{\text{ImageRef}(x,y), \text{ShiftedImage}^k(x,y,d)\}$, and $\text{Cost}^{i,j}(x,y,d) = S\{\text{ShiftedImage}^i(x,y,d), \text{ShiftedImage}^j(x,y,d)\}$ In a number of embodiments, the sets K and L do not necessarily contain all cameras or pairs of cameras that satisfy the requirements in K and L. Furthermore, the cumulative cost function can also be constructed using a cost term in which the set of L includes arbitrarily large groups of cameras for which the cost of corresponding pixels is determined. In many embodiments, the similarity metric S is the L1 norm. In several embodiments, the similarity metric can be any of a number of well known similarity metrics including (but not limited to) the L2 norm, the variance or standard deviation of the corresponding pixels (particularly where L includes larger groups of cameras) window-based similarity metrics incorporating correlation, rank, census and/or any other measure appropriate to the requirements of a specific application. Although comparisons are discussed above in the context of shifted images, as can be readily appreciated comparisons can be performed by applying shifts to individual pixel locations and comparing corresponding pixels at a hypothesized depth (as opposed to applying shifts to all pixels in an image and then comparing the shifted images).

In a number of embodiments, the cost function can also consider similarity between corresponding pixels across different spectral channels. In several embodiments, the similarity of neighborhoods of pixels in pixels from different spectral channels can be evaluated using any of a variety of metrics including (but not limited to) the cross-correlation of the pixels in the neighborhoods, the normalized cross-correlation between the pixels in the neighborhoods and/or any other metric for measuring the similarity of the relative values of two sets of pixels such as (but not limited to) entropy measures including measuring mutual information.

In several embodiments, different weightings can be applied to the similarity of corresponding pixels within a spectral channel containing a reference image and the reference image, the similarity of corresponding pixels within alternate view images in the same spectral channel, and/or the similarity of corresponding pixels within images in different spectral channels.

As discussed above, the aggregated cost function can be spatially filtered as follows:

$\text{FilteredCV}(x,y,d) = \text{Filter}_{x_n, y_n \in N(x,y)} \{\text{Cost}(x_n, y_n, d)\}$ where the Filter is applied in a neighborhood N(x, y) surrounding pixel location (x, y).

The filter can be a simple 3×3 or N×N box filter or some other filter including (but not limited to) a joint bilateral filter that uses the reference image as guidance, a fixed coefficient filter (such as a Gaussian filter, or a box filter), or any appropriate edge preserving filter. In several embodiments, the weighted aggregated cost function is as follows:

$$\text{FilteredCV}(x, y, d) = \frac{1}{\text{Norm}} \sum_{\substack{(x_1, y_1) \\ \in N(x,y)}} CV(x_1, y_1, d) \times$$

$$wd(x, y, x_1, y_1) \times wr(I_{Ref}(x, y) - I_{Ref}(x_1, y_1))$$

where N(x, y) is the immediate neighborhood of the pixel (x, y), which can be square, circular, rectangular, or any other shape appropriate to the requirements of a specific application, Norm is a normalization term, $I_{Ref}(x,y)$ is the image data from the reference camera, wd is a weighting function based on pixel distance, and wr is a weighting function based on intensity difference.

In many embodiments, the filter is a bilateral filter and wd and wr are both Gaussian weighting functions.

Based upon the filtered aggregated cost function, a depth map can be computed by selecting the depth that minimizes the filtered cost at each pixel location in the depth map as follows:

$D(x,y) = \text{argmin}_d \{\text{FilteredCV}(x,y,d)\}$

When the aggregated cost function is filtered using an edge preserving filter in the manner outlined above, the likelihood that noise will result in the incorrect detection of occluded pixels is reduced. Instead of computing depths for individual pixels, an adaptive support window is used around each pixel to filter noise in a manner that preserves depth transitions. Utilizing a filter such as (but not limited to) a bilateral filter provides an adaptive window of support that adapts based upon the content. In many embodiments, a bilateral filter is used in which the reference image is used to define the spatial and range support for the bilateral filter (i.e. the parameters that define the size of the window of pixels that contribute to the aggregated cost function for a specific pixel). As a result, smoothing of the cost function of a pixel can be achieved using the calculated cost function of pixels that are part of the same surface. In other embodiments, filters such as (but not limited to) box filters are less computationally complex and provide sufficient filtering for the requirements of specific applications.

Determining Pixel Correspondence for Pixels in Multiple Spectral Channels

Array cameras in accordance with many embodiments of the invention include cameras in multiple spectral channels such as, but not limited to, Red, Green and Blue cameras. The cost metric CV(x,y,d) is described above in the context of a single spectral channel and multiple spectral channels. In the case of an array camera including Red, Green, and Blue cameras, the cost function can consider the similarity of pixels in the Green cameras, the similarity in pixels in the Red cameras, and the similarity of pixels in the Blue cameras at a particular depth. Where a camera in a specific color channel is chosen as the reference camera (e.g. a Green camera), pixels in the other channels (e.g. Red and Blue cameras) are difficult to directly compare to pixels in the reference image. However, the disparity at a particular depth can be determined and the intensity values of corresponding pixels in other color channels can be compared. Incorporating these additional comparisons into the depth estimate can improve depth estimates by utilizing information across all color channels. Various cost functions that can be utilized to perform depth estimation in array cameras that include Red, Green, and Blue cameras are discussed further below. As can be readily appreciated, however, the same cost functions can be utilized with respect to any set of spectral channels in accordance with embodiments of the invention.

In several embodiments, image data is captured using an array camera including Red, Green and Blue cameras and a Green camera is selected as a reference camera. A cost function can be utilized that considers pixel correspondence between pixels in a set of Green cameras, between pixels in a set of Red cameras, and between pixels in a set of Blue cameras when determining depth estimates. In several embodiments, the following cost function can be utilized:

$$\text{Cost}(x, y, d) = \gamma_G(x, y) \cdot \text{Cost}_G(x, y, d) +$$
$$\gamma_R(x, y) \cdot \text{Cost}_R(x, y, d) + \gamma_B(x, y) \cdot \text{Cost}_B(x, y, d)$$

where $\text{Cost}_G(x,y,d)$ is the measure the similarity of pixels in locations within a set of Green cameras determined based upon the depth d and the location of the pixel (x, y) in the reference Green camera, $\text{Cost}_R(x,y,d)$ is the measure of the similarity of corresponding pixels in locations within a set of Red cameras determined based upon the depth d and the location of the pixel (x, y) in the reference Green camera, $\text{Cost}_B(x,y,d)$ is the measure of the similarity of corresponding pixels in locations within a set of Blue cameras determined based upon the depth d and the location of the pixel (x, y) in the reference Green camera, and $\gamma_G$, $\gamma_R$, and $\gamma_B$ are weighting factors for the Green, Red and Blue cost functions respectively which may be constants for the entire reference viewpoint, or may vary spatially.

The spatial weighting may depend on the captured image data (for example using edge gradients), may correct or use known properties of the sensor (for example using a noise model prior for a given sensor to calculate SNR), as well as properties of the cost function (which is another case where the spatial weighting depends on the image data). Additionally, imaging parameters utilized during the capture of image data can also be considered in determining the weightings, such as (but not limited to) the gain or detected light level at which the image is captured, can be used to modulate the weighting factors.

The cost function $\text{Cost}_G(x,y,d)$ can be one of the metrics described above. In many embodiments, $\text{Cost}_G(x,y,d)$ uses a similarity measure based upon an L1 norm comparing a pixel in an alternate view image with a pixel in the reference image, an L2 norm comparing a pixel in an alternate view image with a pixel in the reference image, and/or variance across the pixels in the set of images captured by the Green cameras. In other embodiments, truncated versions of the L1 and L2 norms and/or any block-based similarity measure based on rank, census, correlation, and/or any other appropriate metric such as those practiced in multiview stereo disparity detection techniques can be utilized.

In a number of embodiments, the cost functions for the other color channels (i.e. $\text{Cost}_R(x,y,d)$ and $\text{Cost}_B(x,y,d)$) do not utilize a comparison that includes a pixel from the reference image as the basis of determining pixel correspondence. In several embodiments, the similarity of corresponding pixels are performed by calculating the aggregated difference between each unique pair of corresponding pixels in the set of cameras within the color channel. In the example of an array camera in which depth is determined using four Red cameras, $R_A$, $R_B$, $R_C$, and $R_D$, the cost can be determined as follows:

$$\text{Cost}_R(x, y, d) = |R_A(x_a, y_A) - R_B(x_B, y_B)| + |R_A(x_A, y_A) - R_C(x_C, y_C)| +$$
$$|R_A(x_A, y_A) - R_D(x_D, y_D)| + |R_B(x_B, y_B) - R_C(x_C, y_C)| +$$
$$|R_B(x_B, y_B) - R_D(x_D, y_D)| + |R_C(x_C, y_C) - R_D(x_D, y_D)|$$

where $(x_A, y_A)$, $(x_B, y_B)$, $(x_C, y_C)$, and $(x_D, y_D)$ are pixel locations determined based upon the disparity in each of the cameras $R_A$, $R_B$, $R_C$, and $R_D$ respectively at depth d.

The above metric can be referred to as the combination cost metric and can be applied within any color channel that does not contain the reference camera. In several embodiments, a combination metric can be utilized that does not include all combinations of unique pairs of corresponding pixels in the set of cameras within the color channel. In several embodiments, unique pairs of corresponding pixels from a subset of the images captured by an array camera can be utilized. When depths are determined for a virtual viewpoint, none of the spectral channels contain the "reference camera" and the combination cost metric can be applied in each of the spectral channels. Although the combination cost metric is shown above utilizing the L1 norm to determine the similarity between pixel intensity values, in other embodiments, the L2 norm, the pixel variance, truncated versions of the L1 and L2 norms and/or any block-based similarity measure based on rank, census, correlation, and/or any other appropriate metric such as those practiced in multiview stereo disparity detection techniques can be utilized.

Weighting factors (e.g. $\gamma_G$, $\gamma_R$, and $\gamma_B$) can be used to determine the contribution of each of the spectral channels to a depth estimate. The weights can be fixed or vary from pixel to pixel (i.e. spatially-varying) in the reference image. In many embodiments, a map of signal-to-noise ratio (SNR) can be generated with respect to the reference image using an SNR estimator. In several embodiments, the SNR estimator can determine SNR based upon a prior characterization of signal noise. Areas where the SNR response is high can indicate the presence of texture or high signal. Areas where the SNR estimate is low can indicate a textureless region, consisting almost entirely of noise. In certain situations, the data from the images might be noisy in certain spectral channels, but not in others. For example, an area may appear textureless in Green images, but have signal content in images captured by Red cameras. Therefore, the Green cameras will contribute little useful information to the cost function and may actually introduce noise into the depth estimation process, resulting in a less reliable depth estimate than if only Red or Blue cameras were included in the cost function. Therefore, an SNR map can be utilized to determine weightings to apply to each of the color channels. In several embodiments, if the SNR estimate in the reference image for a pixel (x, y) is low, meaning that the immediate region around pixel (x, y) is likely textureless and does not contain significant signal, then the weighting for the color channel containing the reference image should be reduced at the pixel (x, y).

In many embodiments, a stricter condition can also be used and/or used as an alternative in which the weighting for the spectral channel containing the reference image should be reduced at the pixel (x, y), when the SNR estimate in the reference image at a pixel (x, y) and for the radius of maximum parallax (along epipolar lines) in the reference image for all of the cameras show low SNR, then the weighting for the spectral channel containing the reference image should be reduced at the pixel (x, y).

The radius of maximum parallax can be determined only with respect to pixels located along epipolar lines determined with respect to the other cameras in the camera array within the spectral channel. The stricter criterion acknowledges that though the SNR may be low at the pixel location (x, y) in the reference image, there may be content some distance away (less than a maximum parallax shift) from pixel (x, y) in another camera within the color channel containing the reference camera which could disqualify a candidate depth from being a likely match. Therefore, though the pixel location (x, y) may have low SNR, nearby content may still provide useful information to disqualifying certain depths as possibilities.

In a number of embodiments, strong SNR in the reference image may be used to reduce the weighting applied to the other color channels to save computation (i.e., fewer cameras must be searched). In addition, the SNR may be estimated for a camera in one of the other color channels to determine the weighting that should be applied to the color channel in the cost function. In many embodiments, the process of determining the SNR involves estimating SNR along the epipolar line which connects the pixel location (x, y) in the alternate view camera to the reference camera. Then, the epipolar line or line(s) may be searched for regions of high SNR. If high SNR contributions are found in the alternate view camera along the epipolar line, the weighting of the color channel to which the alternate view camera belongs can be set so that the color channel contributes to the cost metric for the pixel location (x, y) in the reference image. If, instead, along the epipolar line beginning at the pixel location (x, y), the alternate view image shows only low SNR, then the contribution of the color channel containing the alternate view image can be correspondingly reduced. In many embodiments, multiple cameras in each color channel are considered when determining the weighting to apply to the color channel when determining depth estimates. Although specific processes for estimating depth using information contained within color channels that do not include the reference camera are described above, any of a variety of processes can be utilized to determine depth estimates based upon information contained in multiple color channels as appropriate to the requirements of specific applications in accordance with embodiments of the invention.

Based upon the initial depth map, visibility $V^{i,Ref}(x, y)$ can be updated based upon the computed depth map $D(x,y)$ or based upon a filtered depth map $F(D(x,y))$ that is filtered using either a fixed coefficient filter (such as a Gaussian or a box filter), or adaptive or edge preserving filter such as (but not limited to) a joint bilateral filter that uses the reference image as guidance. A variety of techniques can be utilized for determining whether a pixel in an image captured from a reference viewpoint is occluded in another image. In a number of embodiments, an initial depth map is utilized to identify pixels that may be occluded. Information concerning foreground objects can be utilized to identify zones in which occlusions are likely to occur. In addition, any of a variety of additional characteristics of an initial depth map can be utilized to detect occlusions including (but not limited to) unusual depth transitions within the depth map and/or pixel depth values that are inconsistent with local pixel depth values.

Although much of the discussion above with respect to FIG. 8 relates to generation of depth estimates using image data in a single spectral channel or in the Red, Green, and Blue color channels, the techniques described above are equally appropriate with respect to any of a variety of spectral channels (the terms color channel and spectral channels being used hererin interchangeably). An aggregated cost function similar to those described above can be utilized including a cost term determined with respect to each spectral channel using any of the techniques described above. In addition, the cost function can include cost terms that weight the similarity of pixels across spectral channels using techniques similar to the those described above. The accuracy of resulting depth estimates can depend upon the extent to which the depth estimate utilizes pixels from an image in which a pixel location (x, y) in a reference image is occluded. Techniques for improving the accuracy of depth estimates when a pixel location (x, y) in an image from a reference viewpoint are occluded within one or more images in the set of images are discussed further below.

Generating a Depth Map Accounting for Occlusions Using Subsets of Images

Patterns of visibility occur in natural scenes. Therefore, the pattern $V^{i,Ref}(x,y)$ is typically not arbitrary. A strong prior exists concerning the cameras in which a pixel in the reference image is visible. In many embodiments, a depth map can be determined in a manner that also provides an estimate for $V^{i,Ref}(x,y)$ in which there is a low likelihood that cameras in which pixel (x,y) is occluded are incorrectly identified. Based upon the estimate for $V^{i,Ref}(x,y)$, a depth estimate can be determined without the need to iterate to refine the visibility of $V^{i,Ref}(x,y)$. Alternatively, additional iterations can be performed to refine the depth map by including additional cameras based upon visibility information obtained using a reliable depth estimate. By obtaining a better initial depth map, however, the iterative process is likely to converge more rapidly.

Figure 8A:
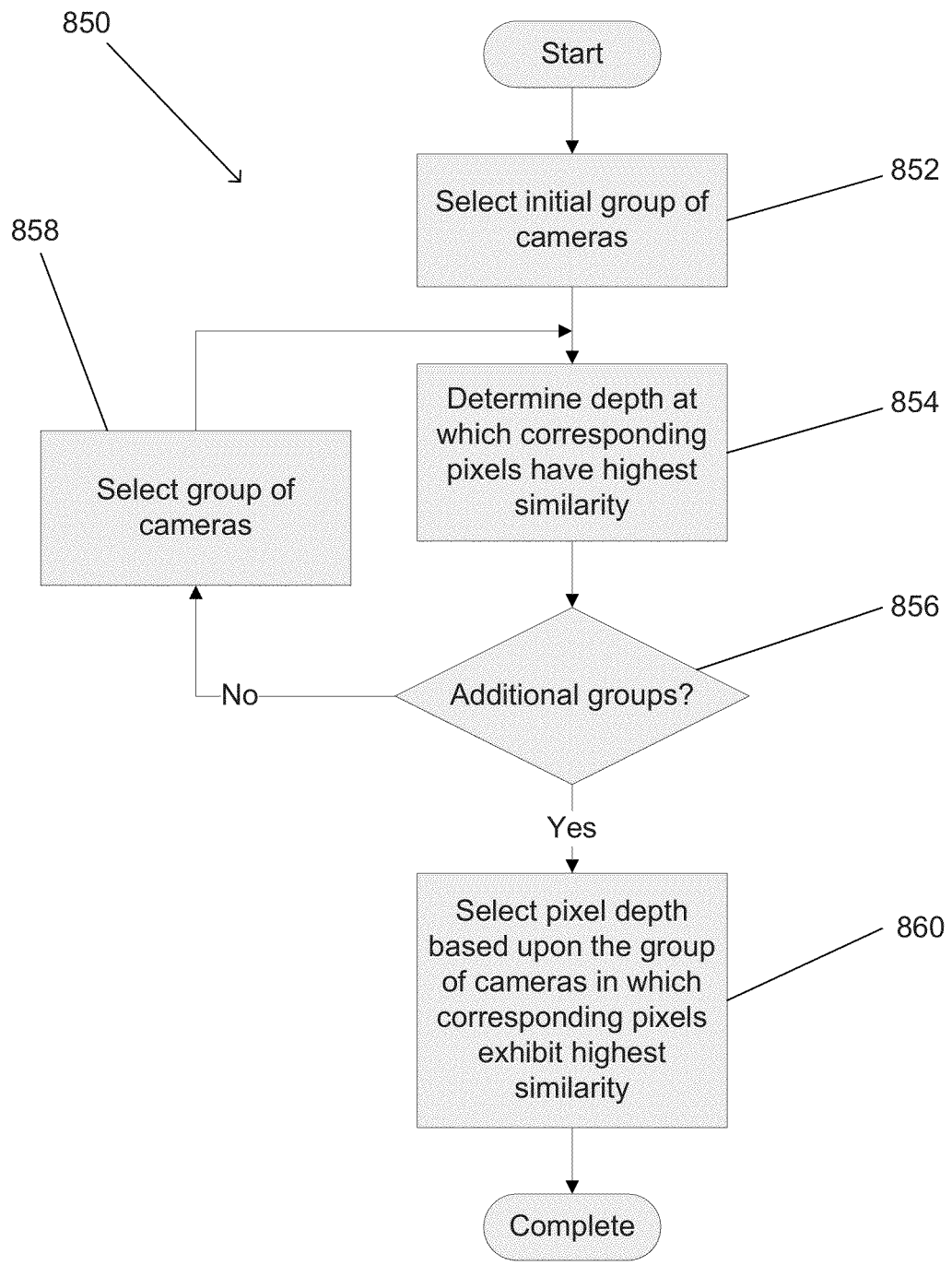
FIG. 8A is a flowchart illustrating a process for estimating depth using images captured by subsets of cameras in a camera array in accordance with an embodiment of the invention.
Figures 8B, 8C, 8D, 8E:
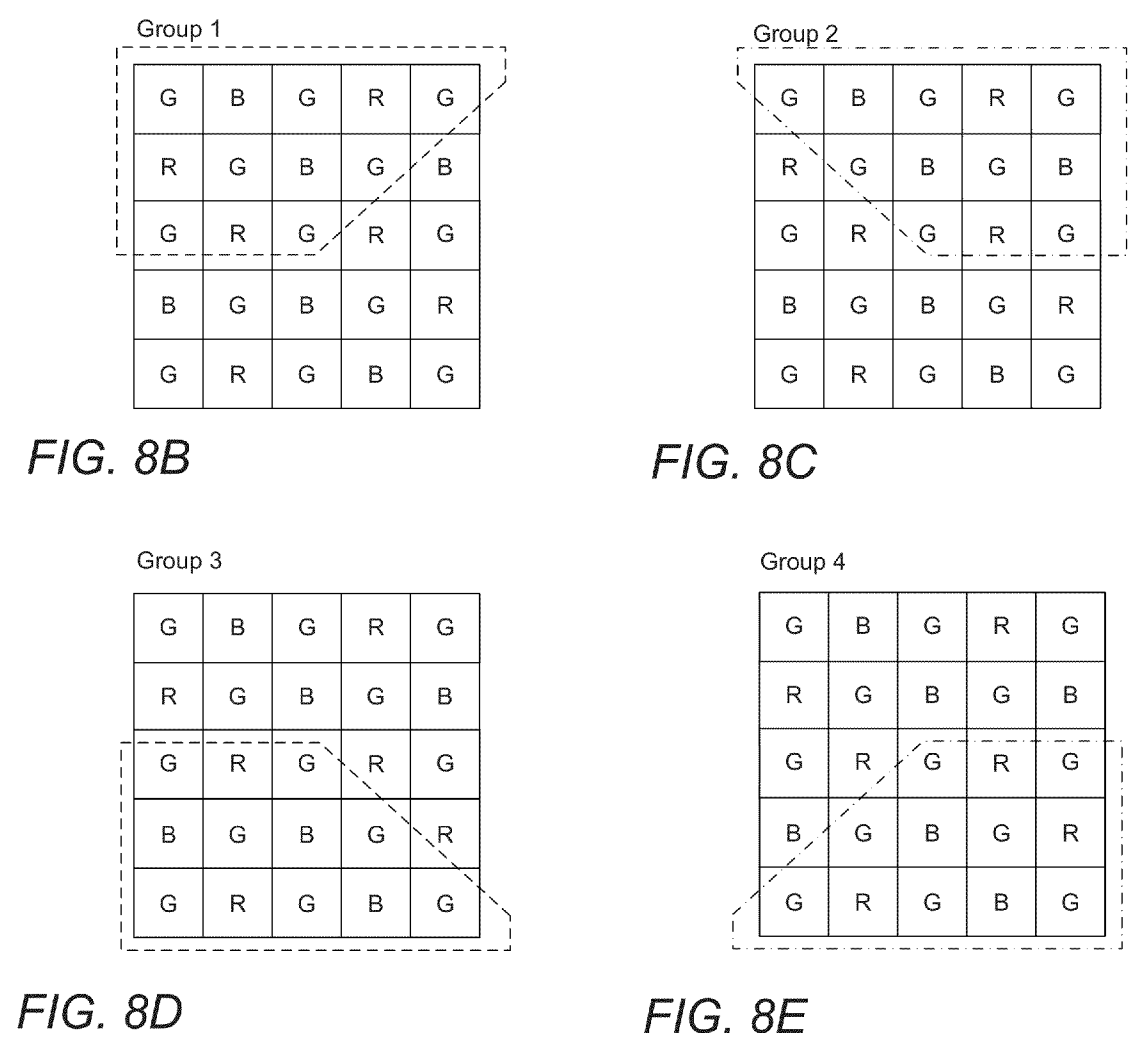
Figures 8F, 8G, 8H, 8I:
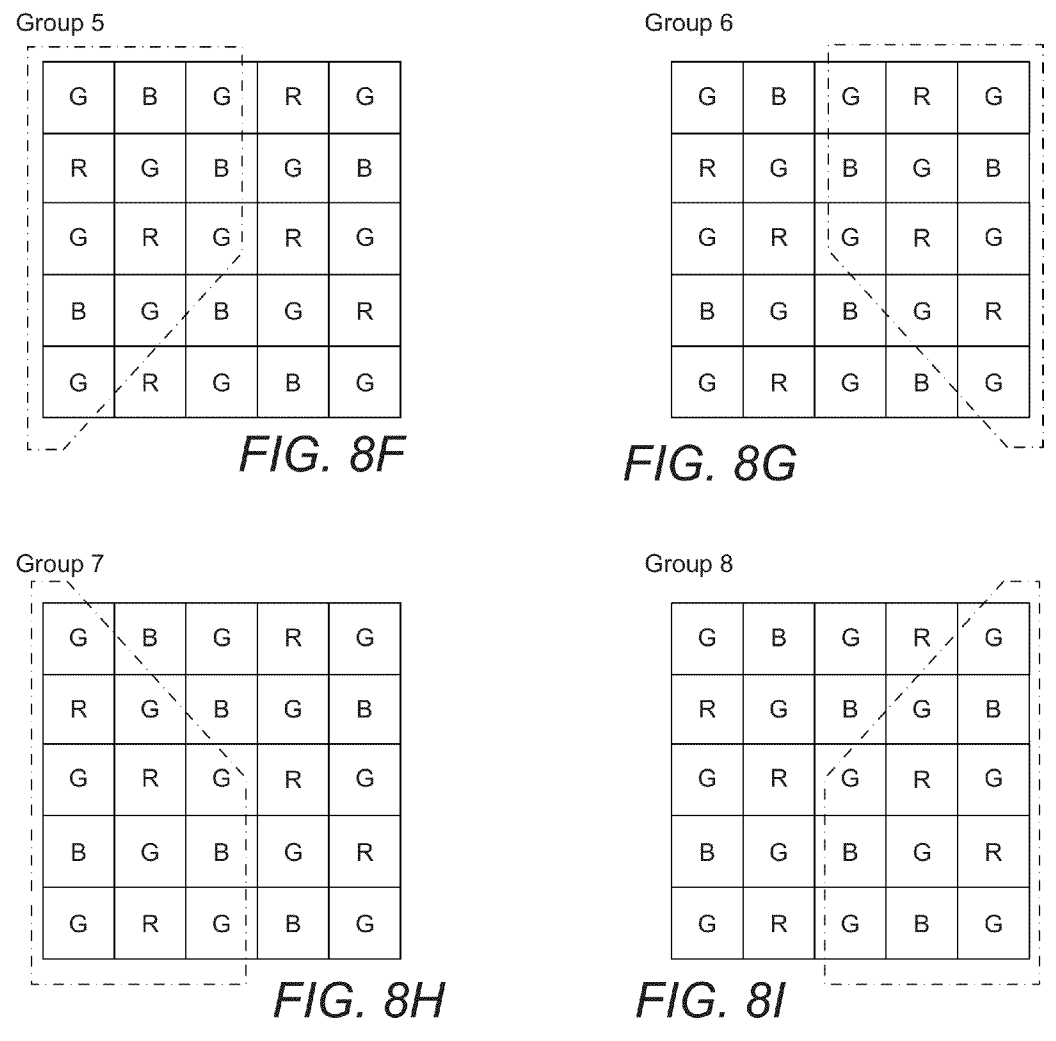
Figures 8J, 8K, 8L, 8M:
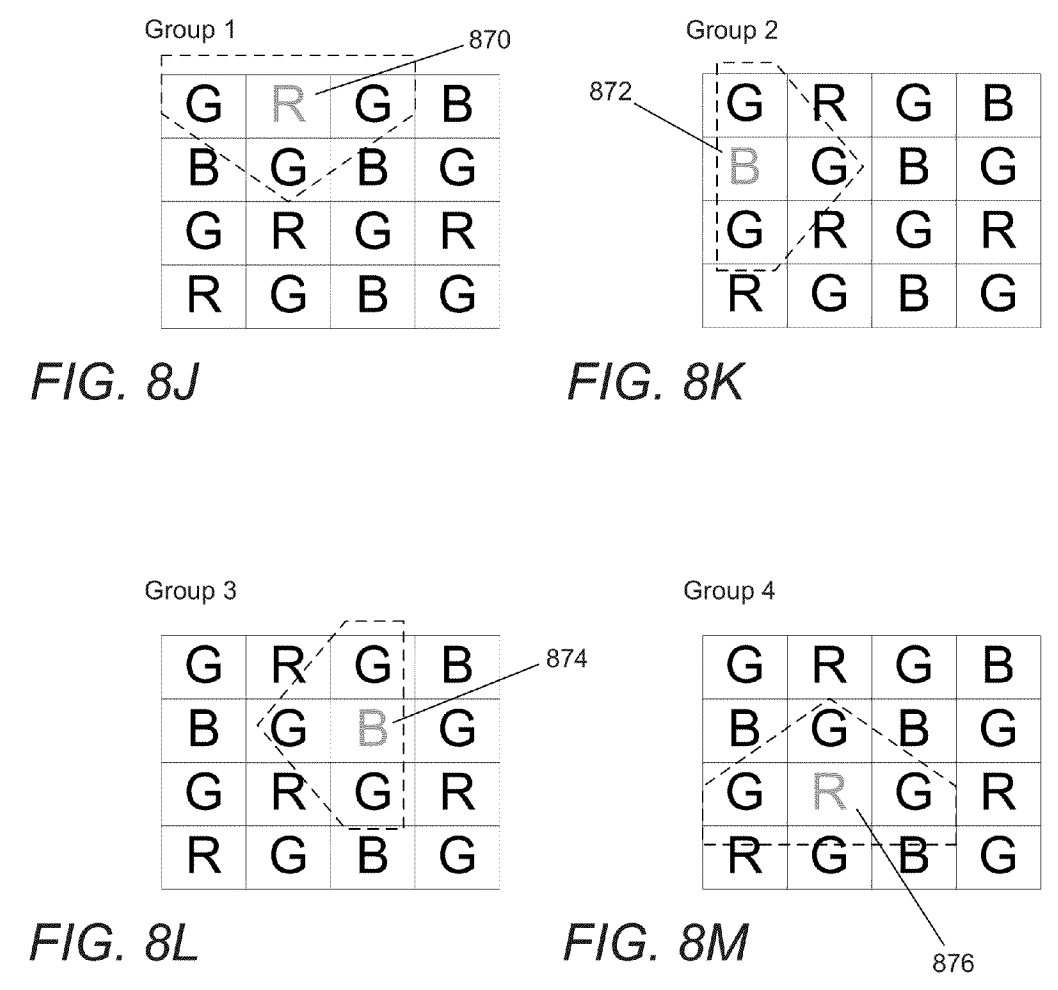

In many embodiments, the process of generating a depth map involves determining depth using multiple clusters or subsets of cameras that each correspond to a different pattern of visibility within the scene and selecting the depth estimate as the depth determined using the subset of images captured by the cluster of cameras in which corresponding pixels have the highest similarity. A process for determining a depth for a pixel (x, y) using images captured by groups of cameras representing subsets of a camera array in accordance with an embodiment of the invention is illustrated in FIG. 8A. The process 850 includes selecting (852) an initial group of cameras corresponding to a specific pattern of visibility within the scene and determining (854) a candidate depth estimate using the subset of image data captured by the group of cameras is generated based upon the depth at which corresponding pixels within the group of cameras have the highest similarity. In several embodiments, the process is similar to that outlined above with respect to FIG. 8 with the exception that the costs are determined for each subset of images and the lowest cost depth estimate generated using the subsets is selected as a candidate depth estimate for a relevant pixel location. As is discussed further below, the similarity of corresponding pixels within the subset of images at the candidate depth estimate is then compared against the similarity of corresponding pixels within other subsets of images at other candidate depth estimates to determine the candidate depth estimate that is most reliable within the context of a given application. In many embodiments, the candidate depth estimate that is selected as the depth estimate for the pixel location is determined based upon the subset of images having the most similar corresponding pixels at the candidate depth estimate.

In many embodiments, the group of cameras can include cameras from multiple color channels and a cost metric weighting similarity in each color channel is utilized to estimate the depth of pixel (x, y) in the reference image using the group of cameras. The process then iterates (856, 858, 854) through a plurality of different groups of cameras that each correspond to different patterns of visibility within the scene until a depth estimate is determined for each of the groups of cameras. The depth estimate for pixel location (x, y) in an image from the reference viewpoint can be obtained by selecting the depth estimate from the group of cameras in which the corresponding pixels at the estimated depth have the highest similarity. As noted above, similarity of pixels can be determined using a cost function that weights similarity of pixels in multiple spectral channels and/or across spectral channels. The subset of images in which the corresponding pixels at the estimated depth have the highest similarity corresponds to a specific pattern of visibility and provides an initial estimate of $V^{i,Ref}$ (x, y) that has a low likelihood of incorrectly identifying that the pixel location (x, y) in an image from the reference viewpoint is visible in a camera in which it is occluded.

Although the discussion provided above is presented in the context of performing searches with respect to each group of cameras with respect to pixel locations (x, y) in the reference image, depth maps can be separately estimated for the pixels in the reference image using each group of cameras corresponding to a specific visibility pattern. In this way, the cost metrics determined for pixel location (x, y) using a particular group of cameras can be filtered to smooth out noise in the cost function. Therefore, the depth estimate for the pixel location (x, y) can be selected using the depth estimate for the group of cameras having the smallest filtered cost metric. The filters applied to the cost metrics determined using a specific group of cameras can be fixed, or can be spatially adaptive. The specific filters utilized can be determined based upon the requirements of specific applications in accordance with embodiments of the invention. Following selection of the depth estimates for the pixels in the reference image, additional filtering can be performed to further smooth noise in the initial depth map.

The clusters or groupings of cameras utilized to detect particular patterns of visibility within a scene can depend upon the numbers of cameras in an array camera, the camera that is selected as the reference camera, and/or the distribution of cameras from different color channels within the array. Eight groups of cameras in a 5×5 array corresponding to different patterns of visibility that are likely to be present within a scene with respect to pixels in a reference camera located at the center of the array are shown in FIGS. 8B-8I. The eight groups are generated by rotating and flipping the same group template, which includes 12 cameras. Depending upon the orientation of the group template, this includes seven Green cameras, and either three Red cameras and 2 Blue cameras, or 3 Blue cameras and 2 Red cameras. As noted above, the group template can be utilized to select groups of cameras when estimating depth for a pixel (x, y) in a reference Green camera located at the center of the 5×5 array. The depth of the pixel location (x, y) can be estimated by selecting the depth estimate from the group of cameras in which the corresponding pixels in the three color channels at the estimated depth have the highest similarity.

Although specific groups are shown in FIGS. 8B-8I for selecting groups of cameras, any of a variety of templates corresponding to common visibility patterns within a scene can be utilized. For example, groups of cameras along a single epipolar line can be selected as described below with reference to FIG. 10. In many embodiments the groups are selected so that the same number of cameras in the color channel containing the reference camera appears in each group of cameras. In addition, the groups can be determined so that there are at least two cameras in the other color channels in each group of cameras. If the groups include an uneven number of cameras, then the cost metric with respect to different sized groups may be biased and the bias can be accounted for through normalization. In many embodiments, the groups of cameras are selected to provide baseline diversity (contrast with the groups illustrated in FIG. 10 that are selected based upon sharing a common baseline). The greater the number of different radial epipolar lines on which depth searches are performed, the more likely one of the images captured by a group of cameras will contain information that can assist in identifying incorrect depths. In several embodiments, the group of cameras are selected so that the central angle of the sector defined by the epipolar lines of each group is the same.

In smaller array cameras, such as (but not limited to) 4×4 array cameras, and depending upon the pattern of color filters utilized within the array it may not be possible to select groups of cameras that contain the same number of cameras in each color channel. In several embodiments, a color filter pattern is utilized so that groups of cameras corresponding to common visibility patterns contain the same number of cameras in a single color channel. In this way, image data captured within the color channel can be utilized to estimate depths for occluded or otherwise mismatched pixels by comparing the filtered costs of depth estimates obtained using the different subgroups. Four groups of cameras in a 4×4 array corresponding to different patterns of visibility that are likely to be present within a scene with respect to pixels in a reference camera located at the center of the array are shown in FIGS. 8J-8M. The four groups are generated by rotating and flipping the same group template, which includes 4 cameras. In the illustrated embodiment, there are three color channels: Red, Green, and Blue. Each group of cameras includes three Green cameras and one Blue or Red camera. Due to the presence of a single Red or Blue camera, in several embodiments depth estimates are determined using the image data captured in the Green color channel. For a given pixel location (x, y), the image data in the Red or Blue camera of the group that yielded the most reliable depth estimate (i.e. the lowest cost) is assumed visible in an image from the reference viewpoint. Accordingly, the pixel value in the pixel location in the Red or Blue image corresponding to the pixel location (x, y) in the image from the reference viewpoint can be utilized as a reference pixel for the purpose of calculating the visibility of corresponding pixels in other images within the Red or Blue color channels. For each of the groups shown in FIGS. 8J-8M, one of the spectral channels is excluded from the group. The use of a π filter group can, however, be utilized to identify which of the images in the excluded color channel should be used as a reference image for the purpose of determining the visibility of pixels in the excluded color channel. When the viewpoint of a central camera of a π camera group is utilized as a reference viewpoint, two images in the excluded color channel will have been captured from viewpoints on opposite sides of the reference viewpoint. In typical natural scenes, a pixel location within an image from the reference viewpoint is likely to be visible in at least one of images captured by the adjacent cameras in the excluded color channel. In order to determine which (if any) of the images is most likely to contain a corresponding pixel to a pixel location in an image from the reference viewpoint that is visible, the similarity of the corresponding pixels within the two subgroups that contain the two images. Assuming that the corresponding pixels in at least one of the subgroups achieves a threshold level of similarity, then the image in the subgroup in which the corresponding pixels have the highest level of similarity can be selected as a reference image for the excluded color channel. In this way, the visibility of corresponding pixels in any image within the excluded color channel can be determined based upon its similarity with the corresponding pixel from the reference image for the excluded color channel. Where neither image captured from the adjacent viewpoints to the reference viewpoint reliably contain a visible pixel corresponding to a pixel location within an image from the reference viewpoint, then alternative techniques can be utilized to identify an image within the excluded color channel that contains a corresponding pixel that is visible and/or to determine the visibility of pixels within individual images from the excluded color channel. In several embodiments, visibility can be determined by performing epipolar line searches in the manner described herein. In a number of embodiments, cross-channel similarity measures can be used to determine a corresponding pixel within the images in an excluded color channel that can be utilized as a reference pixel. In several embodiments, the image in which the neighborhood surrounding the corresponding pixel exhibits the highest cross-correlation (or any other appropriate cross-channel similarity measure) with the reference image can be utilized as a reference pixel for the purpose of determining the visibility of the other corresponding pixels in the images in the excluded color channel. A similar approach can be taken with array cameras including different sized camera arrays.

In many embodiments, the groups of cameras used to estimate depth for a pixel in a reference camera correspond to pairs of cameras within the array. Through use of thresholds, cameras in which a pixel (x, y) is likely to be visible can be identified and an initial visibility map $V^{i,Ref}(x, y)$ constructed. The threshold can be a hard threshold, and/or a threshold based upon the SNR in the reference image. The same is also true of larger groups of cameras such as those illustrated in FIGS. 8B-8I. Thresholds can be used to detect the presence of one or more outlier pixels within a set of corresponding pixels. Groups of cameras that are found to not contain outliers can then be combined, and the depth recalculated with this new combined set, to improve the precision of depth estimates. In a similar manner, an initial depth map can be constructed by initially assuming that all cameras are visible in the visibility map $V^{i,Ref}(x, y)$. Any of a variety of techniques can be utilized to determine whether a pixel (x, y) is occluded in at least one of the cameras in the camera array including (but not limited to) use of thresholds in the manner outlined above, and/or performing occlusion searches along epipolar lines. The depth of pixels that are likely to be occluded in at least one of the cameras in the array can then be estimated again using a process similar to the process outlined above with respect to FIG. 8A. In this way, the cameras in which the pixel is occluded can be rapidly identified.

Although a variety of processes for determining depth maps and visibility maps when estimating depth for pixels within a reference image are described above with reference to FIGS. 8A-8I, any of a variety of processes can be utilized to determine an initial depth map and/or visibility map in accordance with the requirements of specific applications in accordance with embodiments of the invention. Processes for identifying occluded pixels including processes that involve performing searches for occluded pixels along epipolar lines in accordance with embodiments of the invention are discussed further below.

Identifying Occluded Pixels

A challenge associated with identifying occluded pixels from an initial depth map is that depths within the depth map that are determined using occluded pixels may be incorrect.

Figure 9:
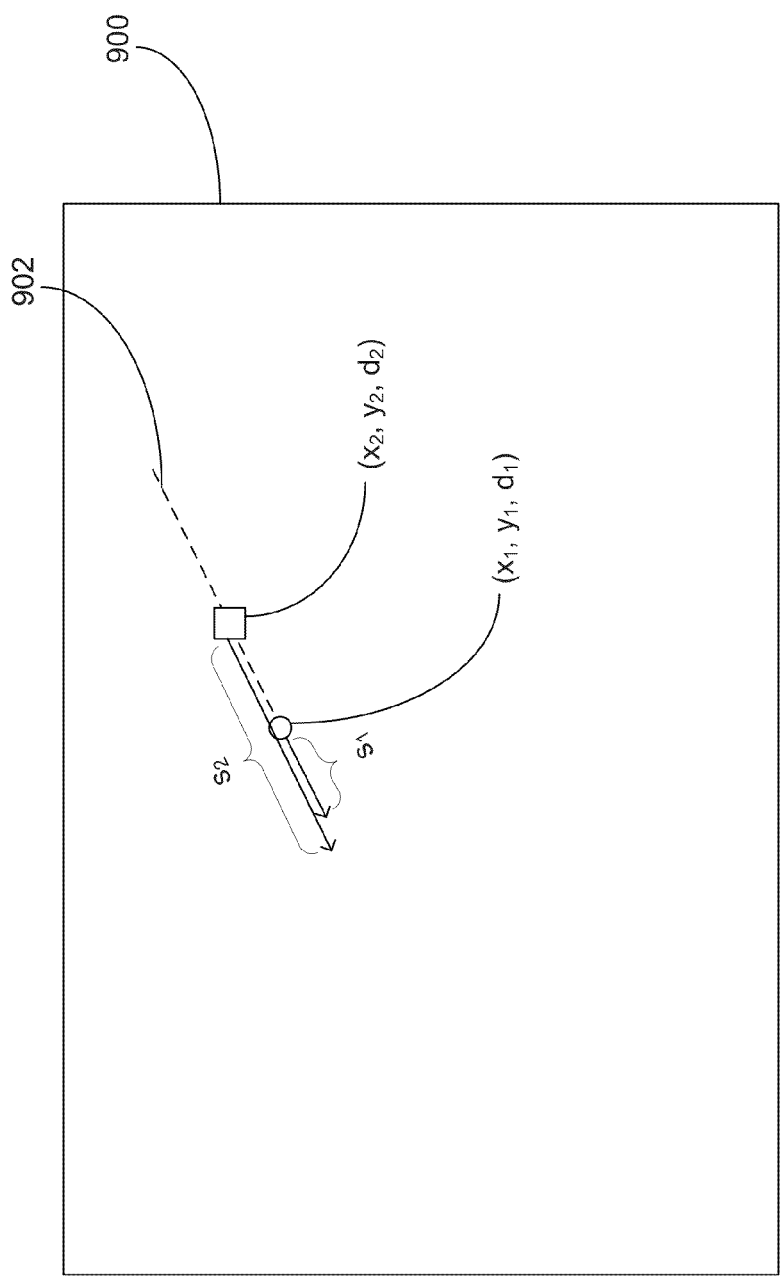
FIG. 9 conceptually illustrates a process for searching an epipolar line for pixels that occlude a given pixel in accordance with an embodiment of the invention.

The most reliable depth estimates are those of the objects in the scene that are closest to the camera. These are the objects that also give rise to the greatest disparity and can potentially result in the largest number of pixel occlusions (depending upon the distribution of objects within the scene. Therefore, a determination can be made concerning whether a pixel visible in the reference image is occluded in a second image by searching for an occluding pixel in the reference image along the baseline vector. An occluding pixel is a pixel that is sufficiently close to the camera that the disparity observed from the perspective of the second image would be sufficiently large as to occlude the pixel visible in the reference image. The search for occluding pixels can be understood with reference to FIG. 9. An image captured from a reference viewpoint 900 is shown in FIG. 9. In order to determine the visibility of pixel $(x_1, y_1)$ with a depth $d_1$ in a second image captured by the array camera, a search is conducted along a line 902 parallel to the baseline between the camera that captured the reference image and the camera that captured the second image. The pixel $(x_1, y_1)$ will be occluded, when a pixel $(x_2, y_2)$ is closer to the camera (i.e. located at a depth $d_2 < d_1$). Therefore, all pixels $(x_2, y_2)$ where $d_2 \geq d_1$ can be disregarded. Where the scene-dependent geometric shifts of each pixel ($s_2$ and $s_1$ respectively) are greater than the distance between the two pixels along the line 902 parallel to the baseline vector, then pixel $(x_2, y_2)$ will also occlude the pixel $(x_1, y_1)$. Stated another way, pixel $(x_2, y_2)$ occludes pixel $(x_1, y_1)$ when $$\left| s_2 - s_1 - \sqrt{(x_2 - x_1)^2 + (y_2 - y_1)^2} \right| \leq \text{threshold}$$

In several embodiments, the threshold in the above expression can be determined as the inverse of the super-resolution factor used during subsequent super-resolution processing (e.g. when the super-resolution process attempts to achieve an increase in resolution of a factor of 3, then a threshold of ⅓ of a pixel is appropriate). When no pixel can be found satisfying the above expression, then the pixel $(x_1, y_1)$ can be concluded to be visible in the second image. Where the above expression is satisfied for some pixel $(x_2, y_2)$, then the pixel $(x_1, y_1)$ can be considered to be occluded. Therefore, the process illustrated in FIG. 8 can be repeated to create an updated depth estimate for the pixel (x, y) disregarding the second image (and any other images in which the pixel is occluded). As can readily be appreciated, incorrect depths in the initial depth estimate can result in visible pixels being disregarded in future iterations of the process for determining a depth map. Using adaptive support to provide depths that are photometrically consistent decreases the likelihood that noise will result in the detection of false pixel occlusions, which eliminate useful information from subsequent process iterations. In many embodiments, the decision to designate a pixel as being occluded considers the similarity of the pixels and the confidence of the estimated depths of the pixels $(x_1, y_1)$ and $(x_2, y_2)$. As is discussed further below, a confidence map can be generated with respect to the depth map of the reference image and the confidence map indicates the reliability of a specific depth map. Therefore, a possible occlusion identified using the expression provided above in which scene-dependent geometric shifts of each pixel ($s_2$ and $s_1$ respectively) are based upon unreliable depth estimates can be disregarded. Similarly, a possible occlusion involving pixels where the difference in the intensities of the pixels is below a predetermined threshold can be disregarded. Where the pixels values are sufficiently similar, a depth estimate generated in reliance on the pixel will largely be unaffected even if the pixel is occluded. In other embodiments, a variety of other considerations can be taken into account when determining whether to indicate a pixel as occluded in a visibility map as appropriate to the requirements of specific applications.

The search discussed above with respect to FIG. 9 can be conducted along the epipolar line corresponding to every camera utilized to perform the depth estimation. When the captured images are rectified correctly, the search can be simplified by aligning the baselines of the cameras relative to the rows and columns of the pixels captured from the reference viewpoint (see discussion of rectification above). The search for occluding pixels need not be performed with respect to every pixel in the reference image. Instead, an initial search can be conducted for pixels that are likely to be occluded in one or more images captured by the array camera including (but not limited to) pixels proximate depth transitions. Searches can then be performed for occluding pixels with respect to pixels that are considered likely to be occluded. In addition, the search for occluding pixels can be performed more efficiently by computing the projections of pixels based upon distance in advance (the projections indicate the depth at which adjacent pixels along the baseline will be occluded). In addition, once a pixel is determined to be occluded the process for detecting occlusion of adjacent pixels can be simplified by utilizing the projection of the occluding pixel. In other embodiments, any of a variety of techniques can be utilized to more efficiently locate occluding and occluded pixels including (but not limited to) rendering the image based on depth in accordance with embodiments of the invention.

As noted above, including occluded pixels in the determination of the initial depth map can introduce errors in the resulting pixel depths. When occlusions are detected using a process similar to any of the processes outlined above and the depth map updated, errors in the depth map are removed. As errors in the depth map are removed, more accurate predictions can be made as to the pixels that are occluded. Accordingly, the process of detecting occlusions can be performed iteratively until a stopping criterion is reached. In a number of embodiments, the stopping criterion can be (but is not limited to) the number of occluded pixels detected in a specific iteration (that were not previously detected) falling below a predetermined number and/or the completion of a predetermined number of iterations.

Referring back to FIG. 6, a process for generating and refining a depth map in accordance with an embodiment of the invention is illustrated. In many instances, the processes for determining (602) the initial depth map will have a tendency to overestimate the disparity of occluded pixels. This has the effect of pushing occluded pixels into the foreground. Therefore, in a number of embodiments, a pixel that occludes another pixel can also be treated like an occluded pixel for the purposes of updating (606) the depth map. In this way, the depth of background pixels that have incorrect initial depth measurements can be detected and updated. As is discussed further below, the visibility of pixels that are ignored can be separately determined (610) once the depth map is finalized. In a number of embodiments, processes such as the process 600 illustrated in FIG. 6 also involve application of a bilateral filter to the depth map to help stabilize the depth map as the process iterates.

The accuracy of a depth estimate typically increases with the number of images in the light field captured by the array camera utilized in generating the depth estimate. Considering a smaller number of images can, however, reduce the computational complexity of obtaining a depth estimate. When a depth transition occurs, occlusions will typically occur in images captured on one side of the reference viewpoint. Therefore, a search for occluding pixels similar to the search described above can be utilized to determine whether a pixel is occluded in a group of images captured to one side of the reference camera. If the search indicates that no occlusions occurred, then the depth of the pixel can be determined using that group of images and the depth map updated.

Figure 10:
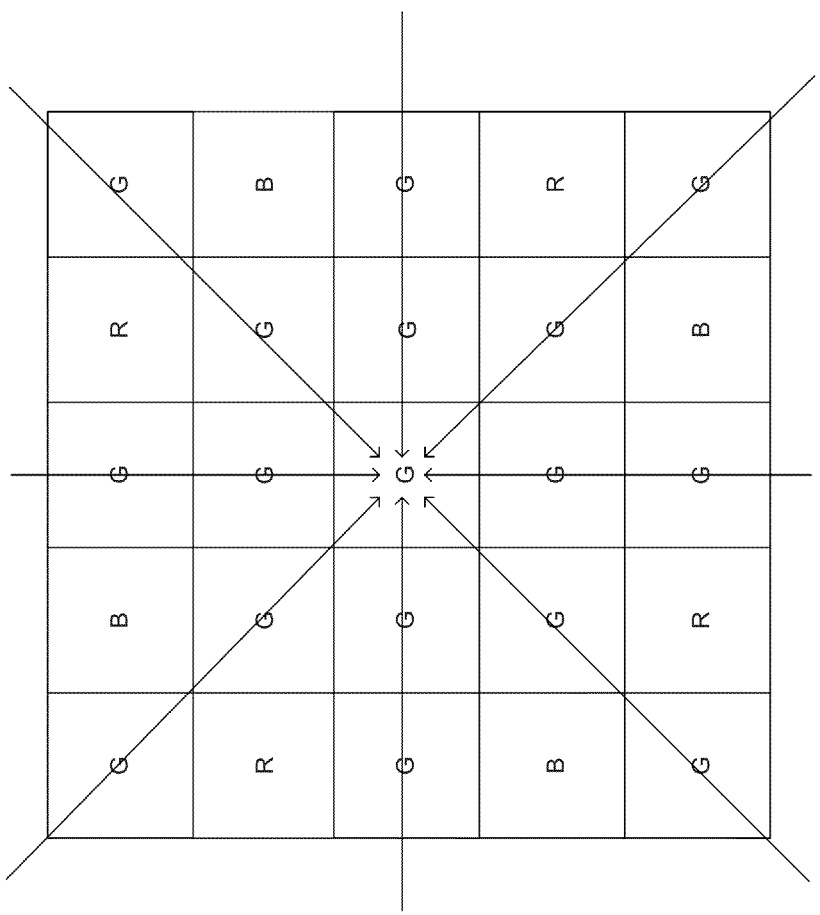
FIG. 10 conceptually illustrates a 5×5 array camera that can be utilized to construct a depth map in accordance with an embodiment of the invention.

A 5×5 array camera that can be utilized to construct a depth map using the Green cameras in the array is illustrated in FIG. 10. The array camera 1010 includes a central reference Green camera (1012). The remaining Green cameras in the array can be utilized to form eight radial groups of three Green cameras for the purpose of determining depth of pixels that are occluded in at least one of the images captured by the Green cameras. Although radial groups are illustrated in FIG. 10, groups of cameras in each of four quadrants surrounding the reference viewpoint can also be utilized. A group may be as small as a pair of cameras, one of which is the camera that captures an image from the reference viewpoint. In many embodiments, groups such as those discussed above with reference to FIGS. 8A-8I can also be utilized.

Although specific processes for detecting pixel occlusions are discussed above with respect to FIGS. 6, 8A-8I, 9, and 10, any of a variety of processes can be utilized to generate a depth map including (but not limited to) processes that reduce the computational complexity of detecting occlusions in accordance with embodiments of the invention. In several embodiments, the process of determining the depth of each pixel can involve searching based upon both hypothesized depths and hypothesized visibility and the combination of depth and visibility that yields the highest pixel correspondence selected as the most likely depth and set of occlusions. Visibility determined in this way can be confirmed by using the approach described above for detecting occluding pixels.

In many embodiments, information concerning the visibility of pixels in the captured images from the reference viewpoint is utilized in processes including (but not limited to) super-resolution processing. Processes for determining the visibility of pixels in images captured by an array camera from a reference viewpoint using a depth map in accordance with embodiments of the invention are discussed further below.

Determining Visibility of Pixels

Pixel visibility can be utilized in determining a depth map and in a variety of other applications including (but not limited to) super-resolution processing. In several embodiments, a depth map for an image captured from a reference viewpoint generated using a process similar to the processes outlined above is utilized to generate a visibility map for the other images captured by an array camera (i.e. the images captured from alternate viewpoints). In several embodiments, visibility maps can be determined with respect to whether pixels in alternate view images are visible from the reference viewpoint and whether a pixel in a first alternate view image is visible any of the other alternate view images. In a number of embodiments, the process of determining visibility maps for the images captured within a single color channel involves comparing the photometric similarity of pixels corresponding to a pixel in the image captured from the reference viewpoint. Pixels that are considered to have a predetermined level of similarity can be considered visible and pixels that are below a threshold level of similarity can be considered occluded. The threshold utilized to determine the photometric similarity of corresponding pixels can adapt based upon the similarity of the corresponding pixels. In several embodiments, the threshold is determined as a function of the photometric distance between the pixel from the reference image and the corresponding pixel that is most similar to the pixel from the reference image. When an array captures image data in multiple color channels, the visibility of pixels in a single color channel can be utilized to determine the visibility of pixels in other channels.

Figure 11:
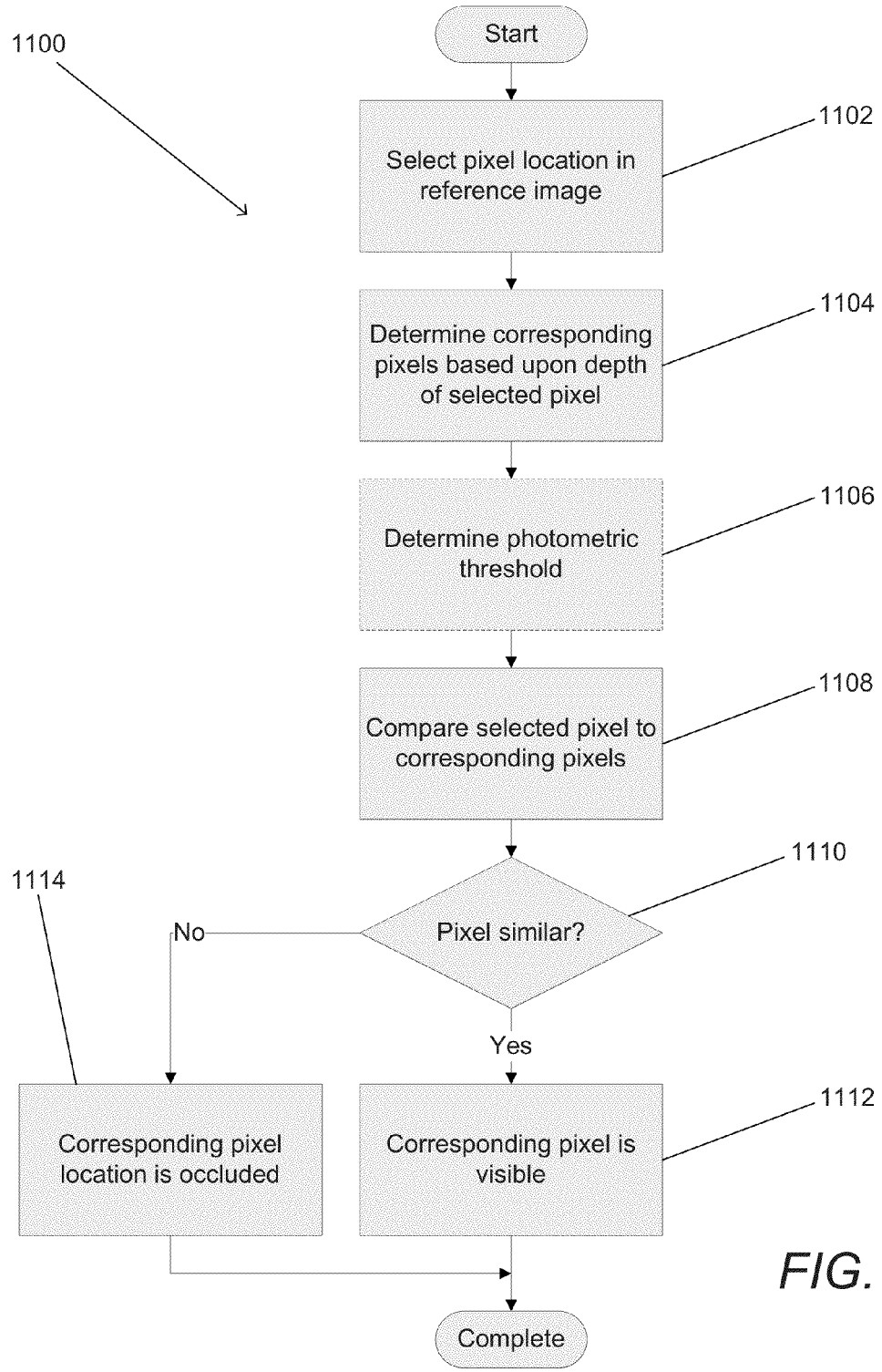
FIG. 11 is a flowchart illustrating a process for determining visibility based upon the photometric similarity of corresponding pixels in accordance with an embodiment of the invention.

A process for determining the visibility of corresponding pixels to a pixel within a reference image in accordance with an embodiment of the invention is illustrated in FIG. 11. The process 1100 includes selecting (1102) a pixel from an image captured from the reference viewpoint. A depth map generated using a process similar to the processes described above can be utilized to determine the depth of the selected pixel. Based upon the depth of the selected pixel, the locations of the corresponding pixels in each image captured by the array camera can be determined (1104). The similarity of the corresponding pixels to the selected pixel from the reference image can be utilized to determine the visibility of the corresponding pixels. In a number of embodiments, the photometric distance of the pixels is utilized as a measure of similarity and a threshold used to determine pixels that are likely visible and pixels that are likely occluded. In many embodiments, the threshold varies depending upon the characteristics of the pixels that are compared. In certain embodiments, the threshold value used to determine similarity of corresponding pixels is determined using the intensity of a reference pixel, as the average of a subset of pixel intensity values for corresponding pixels that are found to be visible in a given color channel. In several embodiments, the specific corresponding pixel intensities that are averaged can depend upon corresponding camera baseline and confidence values for the pixels (if available) and associated matching costs for the pixels. In several embodiments, the threshold is determined (1106) as a function of the photometric distance between the selected pixel from the reference image and the corresponding pixel that is photometrically closest to the selected pixel. In a number of embodiments, the threshold is based upon the pixel intensity of the corresponding pixel in the reference image and/or the intensity of the pixel in the alternate view image. In certain embodiments, the threshold is determined using an SNR model for the captured image. In a number of embodiments, the photometric distance of the selected pixel and the closest corresponding pixel is scaled and/or an offset is added to obtain an appropriate threshold. In other embodiments, any of a variety of techniques can be utilized for determining a threshold for determining the visibility of a corresponding pixel including (but not limited to) using a fixed threshold.

The selected pixel from the reference image and the corresponding pixels are compared (1108) and the threshold used to determine (1110) the similarity of the pixels. When the photometric distance of the selected pixel from the reference image and one of the corresponding pixels is less than the threshold, then the corresponding pixel is determined (1112) to be visible. When the photometric distance of the selected pixel from the reference image and one of the corresponding pixels exceeds the threshold, then the corresponding pixel is determined (1114) to be occluded.

The process (1100) illustrated in FIG. 11 can be repeated for a subset or all of the pixels in the reference image to generate visibility maps for the corresponding pixels in other images captured by the array camera. In embodiments where all of the pixels in the camera that captures an image from the reference viewpoint are in a single color channel, then processes similar to the process illustrated in FIG. 11 effectively generate visibility for images captured within a single color channel. When the array camera also includes images captured in other color channels, the visibility of pixels in images that are not in the same color channel as the reference image can be determined by performing similar comparisons to those described above with respect to corresponding pixels from images within the spectral channel that known or are likely visible in the reference viewpoint. In other embodiments, the camera that captures the reference image employs a Bayer filter (or another appropriate filter pattern) that enables the capture of image data in multiple color channels from the reference viewpoint. In which case, processes similar to those illustrated in FIG. 11 can be utilized to generate visibility information for images in multiple color channels, where the process involves demosaicing the Bayer filter pattern to obtain a Red and Blue pixel value at each position in the reference view.

Although specific processes are discussed above in the context of FIG. 11, any of a variety of processes can be utilized to determine the visibility of pixels in images captured by an array camera in accordance with embodiments of the invention including (but not limited to) processes that iteratively refine visibility information as part of the process of generating a depth map. In many embodiments, the process of generating a depth map and a visibility map also includes generating a confidence map that can provide information concerning the reliability of the estimated depths within the confidence map. Processes for determining confidence maps in accordance with embodiments of the invention are discussed further below.

Confidence Maps

Processes for generating depth maps, including those described above, can result in regions within a depth map in which depth estimates are unreliable. A textureless region of an image synthesized using image data captured by an array camera is illustrated in FIG. 18A and the depth map for the image generated using processes similar to those described above in accordance with embodiments of the invention is illustrated in FIG. 18B. In the textureless region 1800, the cost metric used to determine depth in the manner described above is noisy and though a minimum cost (i.e., at a depth where the cameras show maximum correspondence) can be found, the result depends largely on sensor and photon noise and not any significant underlying signal. The pixel correspondence in such regions (as measured by the cost metric) is indeed greatest at the depth shown, but the resulting depth shown is not the correct depth of the object. In contrast, in the edge region 1802, the cost function shows a depth at which the cost is minimized with great certainty. There, the edge signal is much greater than the noise and so the disparity corresponding to the actual depth of the object can be detected with higher confidence.

Depth errors are not limited to textureless regions, however. Another class of depth errors occurs in zones of occlusion, where certain background regions are visible in some cameras, and not others. This sort of error can be seen along the rim of the tire, where the foreground region intersects the background region. In the depth map, there appear to be regions 1804 containing incorrect depth estimates at the interface between the foreground to background.

When generating a depth map, a confidence map can be generated, which describes numerically, through some measure, the reliability of different depth estimates within the depth map. The confidence map can be used by later processing stages, or by third-party applications, to determine which regions of the depth map can be most relied upon for further processing. For example, a depth measurement utility can allow a user to click on regions of an image synthesized using a super-resolution process to obtain the depth of a particular pixel. If the user clicks on a pixel of the image, the confidence map can be checked before returning a result. If the confidence of the depth at the requested location is low, then the user interface can avoid reporting the depth at that location. If the confidence map is high, then the user interface can safely report the depth at the selected location. That is, the confidence map can be used to qualify the results for particular applications and not return an inaccurate value where the depth map is known to contain errors.

The confidence map can be encoded in a variety of ways, and there may be multiple classes or axes of confidence encoded within a single confidence map. A variety of confidence measures that can be utilized to encode a confidence metric in a confidence map in accordance with embodiments of the invention are discussed below.

In several embodiments, a confidence map is encoded with a confidence measure based on whether the depth estimate of a pixel is within a textureless region within an image. As noted above, textureless regions can be detected based upon SNR in the region surrounding a given pixel. If the SNR is above a known tunable threshold, the region may be marked textureless in a binary fashion. Alternatively, the SNR itself (without being thresholded) may be remapped linearly or non-linearly and used to serve as a continuous indicator of confidence.

In many embodiments, a gradient edge map (e.g. Prewitt or Canny) may be calculated and used as a confidence metric within a confidence map. Since edges and texture typically have high confidence, gradient maps and SNR maps often provide a good coarse measure of confidence for a depth map.

In a number of embodiments, the confidence map can be encoded based upon whether a particular region is low confidence due to occlusions and/or mismatch and conflicting measurements between cameras (i.e. there may be texture in a region that is detected by an SNR map, but there may still be a depth error occurring because in that area the parallax detection process detects and/or is unable to resolve occlusions or otherwise confidently estimate depth for any other reason).

In a number of embodiments, a confidence metric is determined as the "best cost" achieved during the depth estimation process, or a linear, non-linear, or quantized remapping of this quantity. If the minimum cost achieved during depth estimation is above a selected threshold, the region may be marked low confidence on the basis of a lack of correspondence between multiple views at the estimated depth.

In a number of embodiments, occlusions may be detected by comparing the best costs between different subgroups or depth maps generated between different groups of cameras and if the difference between best costs is greater than a threshold, marking low confidence for the pixel locations where the costs found in subsets of images differ.

In a number of embodiments, the confidence map can be encoded based upon whether a particular region is low confidence due to adaptive processing steps in the depth estimation process itself. For example, if fewer depths were searched in a particular region, this information can be encoded numerically in the confidence map to highlight that the depth is less reliable. In many embodiments, certain regions of the depth map are actually searched through correspondence search, and other regions of the depth map, the depths are interpolated based on results from a depth search on a sparser set of points. In such a case, the pixels with interpolated depths are given lower confidence values than pixels where the correspondences have actually been searched.

In several embodiments, the expected precision of a depth measurement can also be coded in the confidence map as a numerical quantity. In many instances, depths farther away from the camera are measured with greater error and so should be less trusted. In such cases the confidence map can mark such areas as involving lower confidence depth estimates. The confidence can be proportional to the expected depth error between adjacent search positions at that depth. In certain embodiments, the disparity corresponding to the minimum distance supported by the parallax search (i.e. this will be the maximum disparity observed between any two cameras for all supported depths) can be determined. Once the maximum disparity is found, the search will search a number of disparities up to the maximum disparity. In many embodiments the maximum disparity is D low resolution pixels and the number of depths searched is N. The number of pixels of disparity between adjacent search positions along an epipolar line is $D/(N-1)$. The depth in meters for any one of the N disparities that is searched (indexed by $n<N$) are $d_n = C/(n*D/(N-1))$ where C is a constant that incorporates information about the baselines and focal lengths of the individual low resolution cameras having the maximum baselines. If, at a particular point in the depth map, the depth is $d_n$, then the expected measurement error at $d_n$ is $e_n = \frac{1}{2} * \max(|d_n - d_{n+1}|, |d_n - d_{n-1}|)$. Basically, the expected measurement error is the error due to searching a fixed, discrete number of points along the epipolar line. The error value itself may be mapped linearly or non-linearly to provide a confidence value with respect to a depth estimate at a particular pixel location within the depth map. The higher the error, the less confident the depth estimate. In several embodiments, disparities searched are not spaced equally, but may be coarser in some regions than others. Accordingly, error can be calculated similarly between adjacent indices (whatever the distribution of search positions along the epipolar line) so that the confidence map reflects the calculated error in depth. In a number of embodiments, the confidence map reflects the maximum error in estimated disparity (not depth), the inverse of the quantity listed above. This may be more useful for applications such as image fusion, whereas the depth error would be more useful for measurement applications that occur in real world coordinates (such as, but not limited to, 3D modeling).

In a number of embodiments, the confidence map can mark regions as low confidence due to known or detected lens or sensor defects that make the depth map unreliable. Defective pixels (a term that includes both defective pixels on the sensor as well as pixels affected by lens defects) may be detected during image processing or offline in a pre-processing calibration step. In one embodiment, if the total number of pixel defects within a radius of a particular pixel (x, y) in any reference camera exceeds a pre-set threshold, the pixel (x, y) is marked low confidence in the depth map due to pixel defects. In another embodiment, a similar confidence value may be defined where confidence increases proportionally (not as a hard threshold) as a function of the number of pixel defects in any camera within a radius and/or region surrounding the reference pixel (x, y) (or pixels known to be affected by lens defects). In another embodiment, the confidence may be a pre-calculated value for specific configurations of defective pixels that are known to create errors of varying severity. In several embodiments the confidence value for the defect takes into account the local image content in calculating the confidence value.

In several embodiments, the confidence map may mark as low confidence areas where the reference image appears textureless but in other color channels there is textured content.

In one embodiment, a pixel (x, y) in the reference camera is searched within a local radius and/or region. If within this local radius and/or region the content is considered to be textureless in Green, but if the same search within another (perhaps larger) local radius/region for Red and/or Blue cameras turns up sufficient texture in images within the Red and/or Blue color channels, the region can be marked as lower confidence due to the fact that the Green color channel is less useful in this detection scenario and depth results will be less reliable (though often correct).

In a number of embodiments the confidence map numerically encodes as low confidence scenarios in which there is photometric mismatch due to lens flare or features in the scene. In many embodiments, the local statistics (mean and variance) of a region of interest around the pixel location (x, y) may be calculated and compared to the local statistics of a similar region in another camera. In this way, local image statistics between two neighborhoods in the same general region of multiple images can be compared to detect possible lens flare, the presence of which reduces confidence. In other embodiments, any of a variety of techniques can be utilized to compare neighborhoods in multiple images to detect lens flare. The resulting confidence measure can be a scaled or non-linearly mapped function of the difference between the mean and variance of the regions across images captured by multiple cameras. The greater the mean and variance differences between the images captured by the cameras, the less likely the depth is reliable and the lower the confidence will be.

In a number of embodiments the confidence map adapts to lighting conditions to reduce the confidence when the image is very dark and noisy. In certain embodiments, the sensor gain at the time the image was taken will result in an absolute reduction in confidence for all depths. In another embodiment, the analog gain and exposure time of the sensor are taken into account when computing a SNR ratio, or thresholds for edge gradients at different levels of noise. In many embodiments, the analog gains and exposure times for different focal planes can be utilized for different cameras in a camera array used to capture a set of images.

To detect regions which are of low confidence due to occlusions, the best-achieved cost metric may be stored during the parallax search. For regions which show significant occlusion, the best achieved cost metric usually greatly exceeds the minimum value that would occur if there were no occlusion and all cameras saw the same content. Accordingly, a threshold can be applied to the best achieved costs. If the best achieved cost exceeds the threshold, then the region is marked as likely to have been occluded or to have had some other problem (such as photometric non-uniformity).

For certain similarity metrics, the low-confidence threshold for occlusion can be corrected for the mean intensity of the region as well as the noise statistics of the sensor. In many embodiments, the mean of the region in the reference image is calculated using a spatial box N×N averaging filter centered around the pixel of interest. In other embodiments, once the mean is known, the noise statistics for the color channel containing the reference camera may be calculated by a table lookup which relates a particular mean at a particular exposure and gain to a desired threshold. If the best matching value greatly exceeds the expected noise, then the pixel can be marked as unreliable due to possible occlusion.

A non-binary measure of confidence due to general mismatch can be obtained using the following formula:

$$\text{Confidence}(x,y) = F(\text{Cost}_{min}(x,y), \text{Cost}^d(x,y), I(x,y)^{cam}, \text{Sensor}, \text{Camera intrinsics})$$

where $\text{Cost}_{min}(x, y)$ is the minimum cost of a disparity search over the desired depth range, $\text{Cost}^d(x, y)$ denotes that cost data from any depth or depths (beside the minimum depth), $I(x, y)^{cam}$ image data captured by any camera can be utilized to augment the confidence;

Sensor is the sensor prior, which can include known properties of the sensor, such as (but not limited to) noise statistics or characterization, defective pixels, properties of the sensor affecting any captured images (such as gain or exposure), Camera intrinsics is the camera intrinsic, which specifies elements intrinsic to the camera and camera array that can impact confidence including (but not limited to) the baseline separation between cameras in the array (affects precision of depth measurements), and the arrangement of the color filters (affects performance in the occlusion zones in certain scenarios).

In several embodiments, Confidence(x, y) may make use of values neighboring pixel location (x, y) (i.e. spatial neighborhoods) for all the arguments.

In many embodiments, a confidence map can be encoded based upon factors including (but not limited to) one or more of the above factors. Each factor may be encoded in a binary fashion or may be represented as a range of (quantized) degrees of confidence, or may be non-quantized ranges or derivatives thereof. For example, the confidence along a particular axis may be represented not as a single bit, but as multiple bits which represent the level of confidence that a region is textureless. In certain embodiments the confidence along a particular axis may be represented as a continuous or approximately continuous (i.e. floating point) quantity. Other factors considered when determining confidence can be determined using any of a variety of ranges of degrees of confidence as appropriate to the requirements of specific applications in accordance with embodiments of the invention. In several embodiments, an arbitrary number of confidence codes or values are included in a confidence map for a particular pixel where one may specify any or all of these conditions. Specific confidence metrics are discussed further below.

In a particular embodiment where only the minimum cost is considered and noise statistics of the sensor follow a linear model, a simplified form may be used:

$$\text{Confidence}(x, y) = a \times \frac{\text{Cost}_{min}(x, y)}{Avg(x, y)} + \text{offset}$$

where Avg(x,y) is the mean intensity of the reference image in a spatial neighborhood surrounding (x, y), or an estimate of the mean intensity in the neighborhood, that is used to adjust the confidence based upon the intensity of the reference image in the region of (x, y), a and offset are empirically chosen scale and offset factors used to adjust the confidence with prior information about the gain and noise statistics of the sensor.

In this case, higher values would indicate lower confidence, and it would be up to the image processing pipeline to determine how to threshold the results.

Figure 18C:
FIGS. 18C-18H conceptually illustrate the generation of a depth map and a confidence map from captured image data and the use of the confidence map to filter the depth map in accordance with an embodiment of the invention.
Figure 18D:
Figure 18E:
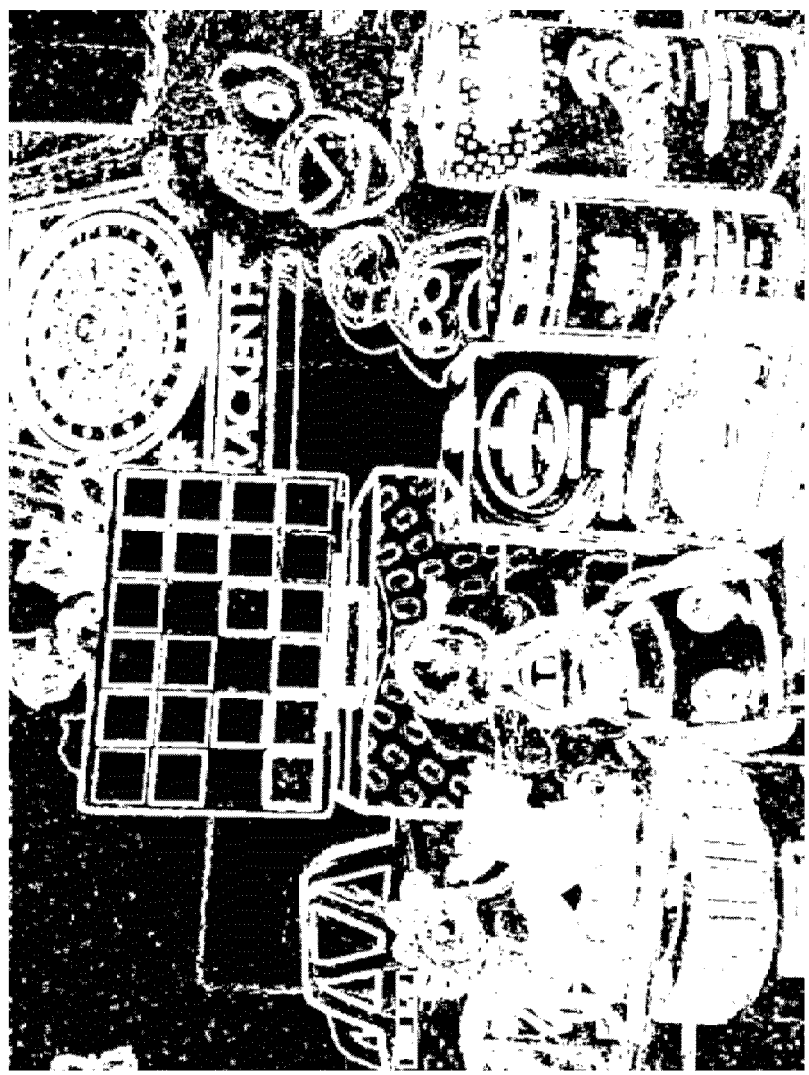
Figure 18F:
Figure 18G:
Figure 18H:
Figure 18J:
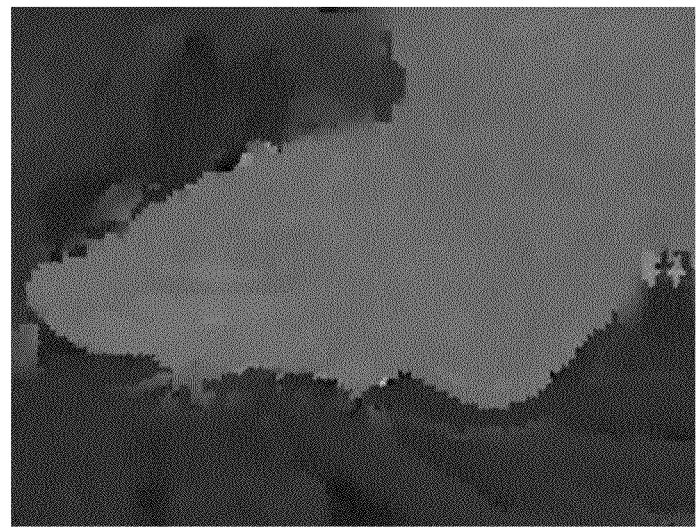
FIGS. 18I-18N similarly conceptually illustrate the generation of a depth map and a confidence map from captured image data and the use of the confidence map to filter the depth map using close up images in accordance with an embodiment of the invention.
Figure 18I:
Figure 18L:
Figure 18K:
Figure 18N:
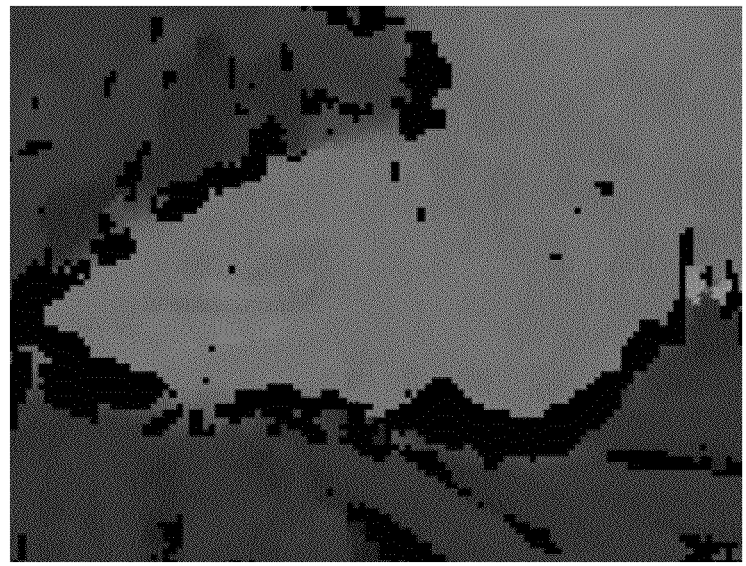
Figure 18M:

In general, the confidence map provides metadata describing the depth estimates contained within the depth map that quantifies numerically the accuracy of detected depths in the image. In many embodiments, the confidence map may be provided in an external delivery format along with the depth map for use with the depth map in applications including (but not limited to) machine vision, gesture recognition, post capture image refocusing, real-time applications, image special effects, super-resolution, or other applications. An example of the manner in which a confidence map can be utilized in a depth estimation process to filter a depth map in accordance with an embodiment of the invention is illustrated in FIGS. 18C-18H. Turning first to FIG. 18C is an image of a scene containing objects at different depths synthesized using a super-resolution process from multiple images captured in different color channels (specifically Red, Green and Blue color channels). A depth map generated from the reference viewpoint using processes similar to those outlined above is illustrated in FIG. 18D. As can be readily appreciated, the depth map is noisy. A confidence map generated using any of a variety of the metrics outlined above can be generated as part of the process of generating a depth map. A binary confidence map generated by thresholding SNR in accordance with an embodiment of the invention is illustrated in FIG. 18E. An 8-bit confidence map generated based upon SNR in accordance with an embodiment of the invention is illustrated in FIG. 18F. A binary confidence map generated by combining a confidence factor generated by thresholding SNR and a confidence factor generated by thresholding the number of corresponding pixels that are occluded in accordance with an embodiment of the invention is illustrated in FIG. 18G. In several embodiments, the confidence map can be utilized to filter the depth map. A depth map that is filtered based upon a binary confidence map generated by thresholding SNR in accordance with an embodiment of the invention is illustrated in FIG. 18H. Comparing the depth maps shown in FIGS. 18D and 18E reveals the value of the use of the confidence map in interpreting depth information generated using any depth estimation process. Although a specific confidence metric and filtering process are described above with reference to FIGS. 18C-18H, any of a variety of confidence metrics can be utilized in the filtering and/or additional processing of depth estimates and/or depth maps in accordance with embodiments of the invention. The generation of confidence maps and the use of confidence maps to filter depth maps in accordance with embodiments of the invention is further illustrated in the close up images shown in FIGS. 18I-18L. With specific regard to FIG. 18I, a close up image of an object synthesized from a light field of images captured in Red, Green, and Blue color channels (each image containing image data in a single color channel) using super-resolution processing is shown. A depth map generated using the techniques outlined above is illustrated in FIG. 18J. A binary confidence map generated by thresholding SNR generated in accordance with an embodiment of the invention is illustrated in FIG. 18K. A multibit resolution confidence map generated in accordance with an embodiment of the invention using SNR is illustrated in FIG. 18L. A binary confidence map generated by thresholding the SNR of the region surrounding each pixel and by thresholding the number of pixels in the images within the light field that correspond to a pixel location in the image from the reference viewpoint that are occluded in accordance with an embodiment of the invention is illustrated in FIG. 18M. A depth map filtered using the binary confidence map shown in in FIG. 18M is illustrated in FIG. 18N.

In several embodiments, a confidence map generated using one or more of the metrics described above can be inserted as an additional channel of information into the JPEG-DZ file format or other file formats. In several embodiments, the confidence map is encoded and decoded using processes similar to those outlined in U.S. patent application Ser. No. 13/631,731 to Venkataraman et al. entitled "Systems and Methods for Encoding Light Field Image Files", filed Sep. 28, 2012. The disclosure of U.S. patent application Ser. No. 13/631,731 is herein incorporated by reference in its entirety. Although specific metrics for determining confidence are described above, any of a variety of metrics for determining confidence appropriate to the requirements of a specific application can be utilized in accordance with embodiments of the invention.

Reducing Computational Complexity

A variety of strategies can be utilized to reduce the computational complexity of the processes outlined above for determining depth maps and for determining the visibility of images captured by a camera array. In several embodiments, a depth map is constructed by only searching for depth at a reduced (i.e. sparse) subset of pixel locations. The depth search is done at fewer points (i.e. a sparser set of points in the image) and for points that depth is not calculated, the depth is assigned through other means. By the end, this sparse depth search provides a depth for every pixel location in a reference image where some pixels are searched and others are filled in through interpolation. As previously stated, not every pixel in the final depth map has a depth obtained by comparing the similarity of the pixel to corresponding pixels in the captured images. Instead, in regions where no correspondence search is done, the depths of many of the pixels are determined using processes including (but not limited to) averaging the depths of surrounding pixels (where the correspondence search has been run) or interpolating the depths of adjacent pixels which have been calculated. By reducing the number of pixels for which depth measurements are performed, the amount of computation used to generate a depth map can be reduced. In several embodiments, the amount of computation used when detecting a depth map can also be reduced by detecting textureless areas of the image and using processes including (but not limited to) assigning a single depth value from the nearest indicator pixel where depth has been calculated, averaging the depths of surrounding pixels or interpolating the depths of adjacent pixels to determine the depth of pixels in the textureless areas of the image. In other embodiments, any of a variety of processes for reducing the computational complexity of generating a depth map can be utilized as appropriate to the requirements of specific applications in accordance with embodiments of the invention including varying the precision of the depth estimates within the depth map based upon characteristics of the scene including (but not limited to) regions containing edges, and/or based upon object distance. Processes for generating depth maps from sparse depth searches and for detecting textureless regions in images in accordance with embodiments of the invention are discussed further below.

Generating Depth Maps From Sparse Depth Search

Processes for generating depth maps through sparse search in accordance with embodiments of the invention typically involve determining depth of a sparse set of pixels spaced or distributed throughout the reference image. Based upon this initial depth map consisting of sparse points, depth transitions can be detected and the depths of pixels surrounding the depth transitions can be directly measured using the processes outlined above. The depths of the remaining pixels can be determined based upon the depths of sparse pixels in the depth map. In many embodiments, the depth measurements are performed using a subset of the pixels in the reference image at the resolution at which they were captured.

Figure 13:
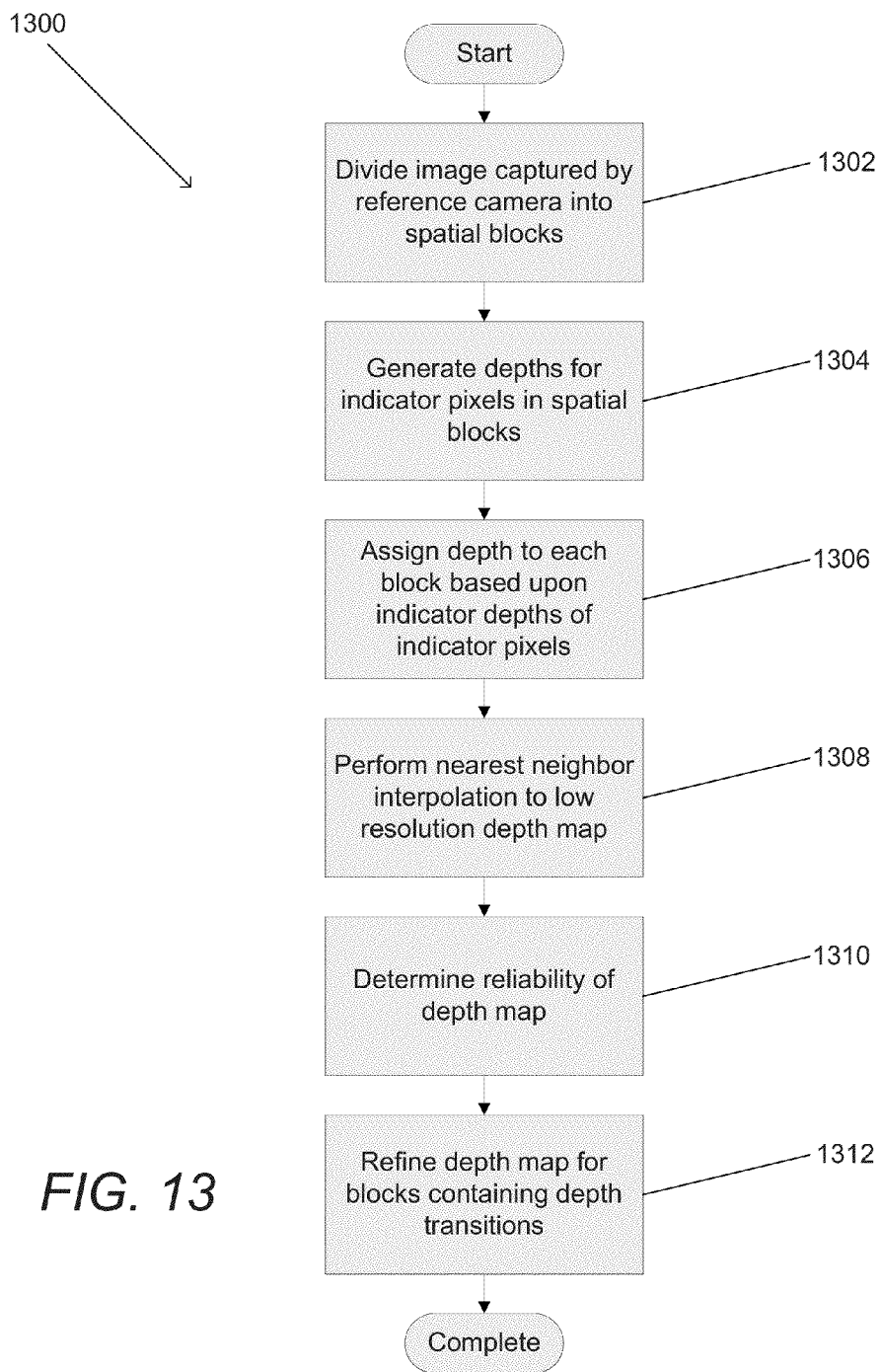
FIG. 13 is a flowchart illustrating a process for generating a sparse depth map in accordance with an embodiment of the invention.

A process for determining a depth map through sparse search in accordance with an embodiment of the invention is illustrated in FIG. 13. The process 1300 includes dividing (1302) the reference image into spatial blocks (or groups of associated pixels) and generating (1304) depth measurements for a sparser subset of indicator pixels within the spatial blocks. Here, spatial block may be taken to refer interchangeably to a rectangular block of pixels, or a subset of associated pixels that need not conform to any particular shape.

Figure 14:
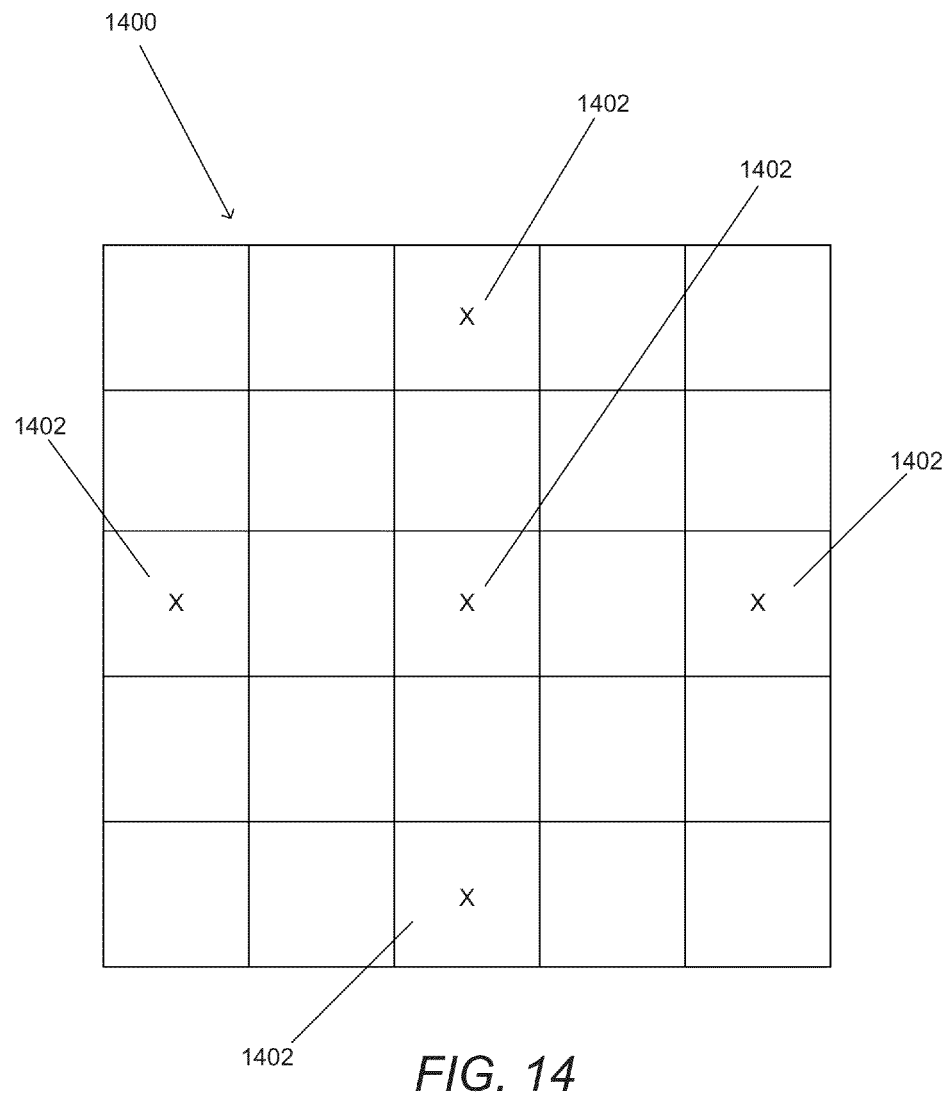
FIG. 14 conceptually illustrates a set of pixels that can be utilized as indicator pixels when generating a sparse depth map in accordance with an embodiment of the invention.

Indicator pixels are a subset of the pixels within the spatial block (or group of associated pixels) and are typically selected to provide information concerning variation in depth across the spatial block. A spatial block 1400 including a plurality of indicator pixels 1402 in accordance with an embodiment of the invention is illustrated in FIG. 14. The indicator pixels 1402 are selected at the edges and at the center of the spatial block. Although specific indicator pixels are illustrated in FIG. 14, the arrangement of indicators within a spatial block or group of associated pixels can be varied and/or any of a variety of pixels within a spatial block can be selected as indicator pixels as appropriate to the requirements of a specific application. In a number of embodiments, different shaped spatial blocks are utilized and the shape of the spatial block can be varied. In several embodiments, the arrangement of indicator pixels within the spatial blocks can be varied. In many embodiments, the indicator pixels are selected based upon scene content. In certain embodiments, the indicator pixels are selected based on which points within the spatial block have the highest SNR in the reference image to increase the likelihood that the points most likely to give confident depth results are used. In another embodiment, fixed spatial positions are chosen for some indicator pixels (as indicated in FIG. 14) for all blocks, and some subset of indicator pixels are assigned to points with highest SNR in the spatial block (i.e. a mixed configuration). In another embodiment, a segmentation process can be used to create relevant spatial regions based on scene content. Although a rectangular spatial block is shown other techniques could be used for splitting the image into spatial clusters, which contain some indicator pixels as described above. Furthermore spatial blocks can be larger in certain portions of the image than in others.

Referring back to FIG. 13, depth can be assigned (1306) to the pixels in each block based upon the depths of the indicator pixels. In several embodiments, the assigned depth is obtained through interpolation of the neighboring indicator pixels. In several embodiments, the depth of a non-indicator pixel may be calculated as a normalized weighted average of the distances to the nearest indicator pixels within a fixed neighborhood. Alternatively, nearest neighbor interpolation (1308) can be utilized to assign depths to the pixels in the spatial block based upon the depth measurements of the indicator pixels. In another embodiment, weights for the interpolation can incorporate intensity similarity as well as spatial distance to the nearest indicator pixels. In another embodiment, a non-linear regression such as (but not limited to) a Kernel Regression may be used to fill in the missing positions between depths sampled at the indicator pixel positions. In another embodiment, a single depth for the entire block is assigned by minimizing the summed costs of the indicator pixels within the block. In other embodiments, any of a variety of techniques can be utilized to generate depth information for pixels within a spatial block.

In many embodiments, the reliability of each of the spatial blocks in the depth map is determined (1310). Within the spatial block, depths will have been estimated both for indicator pixels (where search has occurred) and non-indicator pixels (where depths have been interpolated based on indicator pixel results). For the indicator and non-indicator pixels, the costs of the estimated depths within the block are determined. The costs of each pixel in the block are summed to create a reliability indicator. If the total cost of all pixels within the block is greater than a threshold, then the spatial block is marked as unreliable due to the fact that the estimated depths for some pixels appear to have poor correspondence. Where a spatial block has been determined to have low reliability of poor spatial correspondence, then the block is likely to contain a depth transition or occlusion. If such is the case, then the full correspondence search and occlusion processing can be run within the spatial block.

If a spatial block is determined to have a depth transition per the criteria above, then the spatial block may be 'split' and new sets indicator pixels selected in each of the two child spatial blocks and the process iterated. In one embodiment, the block may be split in half. In another embodiment, the block may be split into unequal regions depending on the depths solved by the indicator pixels within the spatial block.

Where depth transitions are detected within and/or between spatial blocks, the depth map can be refined (1312) by performing additional depth measurements within the spatial block that contains the depth transitions. In this way, the computational complexity of generating the depth map is reduced by reducing the number of depth measurements performed in generating an accurate depth map.

Although a specific process for generating a depth map from sparse searches in accordance with embodiments of the invention is illustrated in FIG. 13, any of a variety of processes that generate a depth map by performing fewer depth measurements in regions of similar or slowly transitioning depth can be utilized in accordance with embodiments of the invention.

Reducing Computation in Textureless Regions of Images

In many embodiments, the process of generating a depth map involves reducing the amount of computation needed for textureless regions of the image. Textureless areas can be ambiguous with parallax, because the corresponding pixels at many hypothesized depths may be similar. Therefore, depth measurements within a textureless area can generate unreliable and noisy results. In many embodiments, the SNR in the region surrounding a pixel is used when determining the depth of the pixel to identify whether the pixel is in a textureless area. An initial depth estimate or a set of initial depth estimates for a given pixel can be determined based upon the depth of at least one adjacent pixel for which a depth has previously been determined. When the variance of the corresponding pixels for the given pixel (or any other similarity measure) is below the SNR threshold in the region surrounding the pixel, the pixel can be assumed to be part of a textureless area and (one of) the approaches described below can be used to select the depth of pixel. Otherwise, a depth measurement can be performed using a process similar to the processes described above.

In many embodiments, textureless regions may be detected using a fixed threshold on the SNR. The computation for the search in such regions may be reduced by reducing the number of depths searched. In many embodiments, the full set of depths will be searched until a minimum cost depth is identified that is below a noise-dependent threshold that takes into account the noise characteristics of the sensor. When the minimum cost is found to be below the threshold the depth is accepted as the depth of the textureless region and no more depths are searched (i.e. the search is terminated as soon as a depth that has "close enough" correspondence is found). In many embodiments, the search in textureless regions may save computation by searching the full range of disparity but at larger increments than are done in the normal search for a region with texture (i.e. reducing the number of depths searched)—the best cost will be selected as the depth of the pixel in the textureless region.

Figure 15:
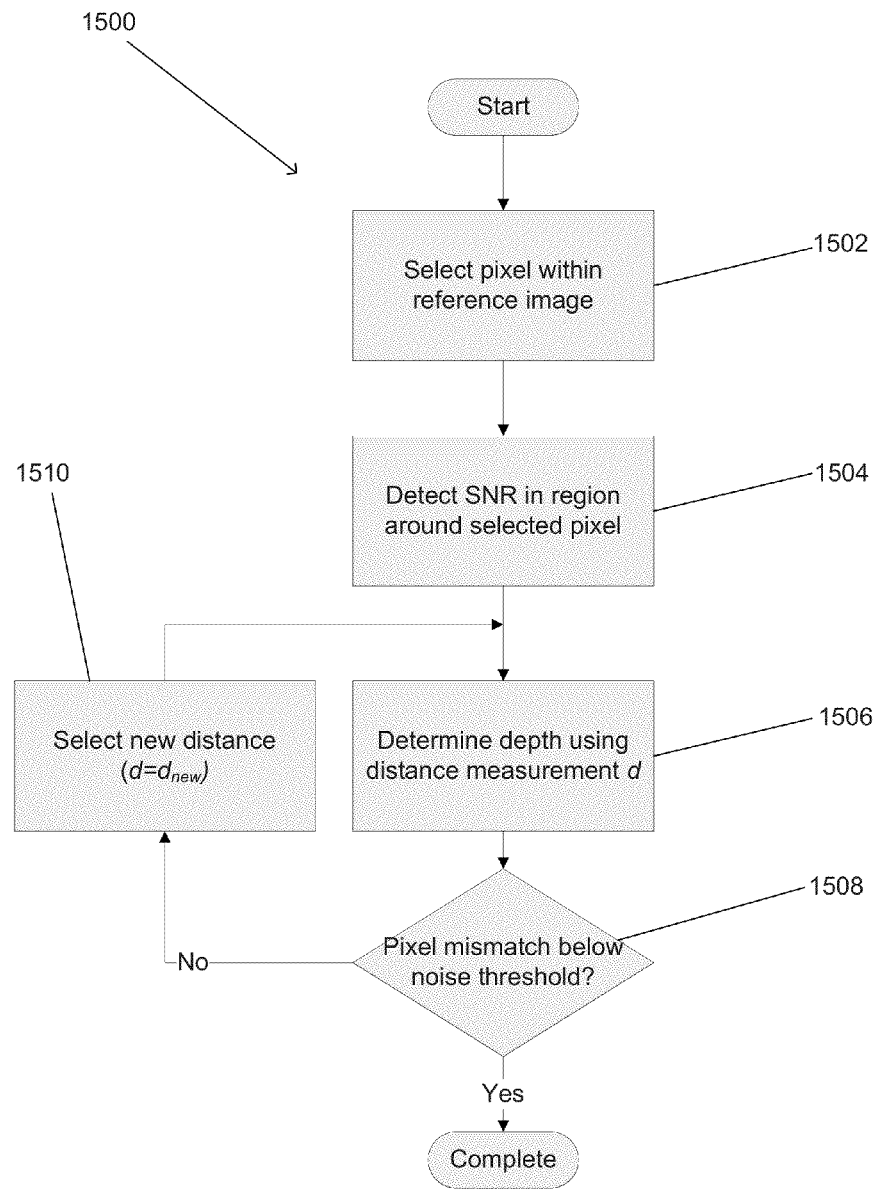
FIG. 15 is a flowchart illustrating a process for detecting textureless regions using the SNR surrounding a pixel in accordance with an embodiment of the invention.

A process for detecting textureless regions using the SNR surrounding a pixel in accordance with an embodiment of the invention is illustrated in FIG. 15. The process 1500 includes selecting (1502) a pixel from the reference image and detecting (1504) the SNR in the region around the selected pixel. An initial hypothesized depth d can be determined (1506) for the pixel. In many embodiments, the initial hypothesized depth d is determined based upon the depth of one or more pixels in the region surrounding the selected pixel. A determination (1508) is then made concerning whether the variance or cost of the corresponding pixels at the hypothesized depth is below a threshold that can be (but is not limited to) predetermined or a function of the SNR in the region surrounding the selected pixel. In other embodiments, any of a variety of similarity measures can be utilized to determine whether the region surrounding the pixel is textureless. In the event that variance or cost of the corresponding pixels is below a noise or predetermined threshold, then the hypothesized depth is selected as the most likely depth on the assumption that the pixel is located within a textureless region. When the variance or cost of the corresponding pixels exceeds the noise or predetermined threshold, then the depth of a pixel is determined in accordance with a process similar to the processes described above.

Although a specific process for detecting textureless areas within a reference image are described above with respect to FIG. 15, any of a variety of processes for detecting textureless areas in an image can be utilized in accordance with embodiments. Furthermore, any of a variety of processes can be utilized to detect other characteristics of an image that can be relied upon to reduce the number of depth measurements that are made in generating a reliable depth map in accordance with embodiments of the invention.

Generating Depth Maps from Virtual Viewpoints

Figure 12:
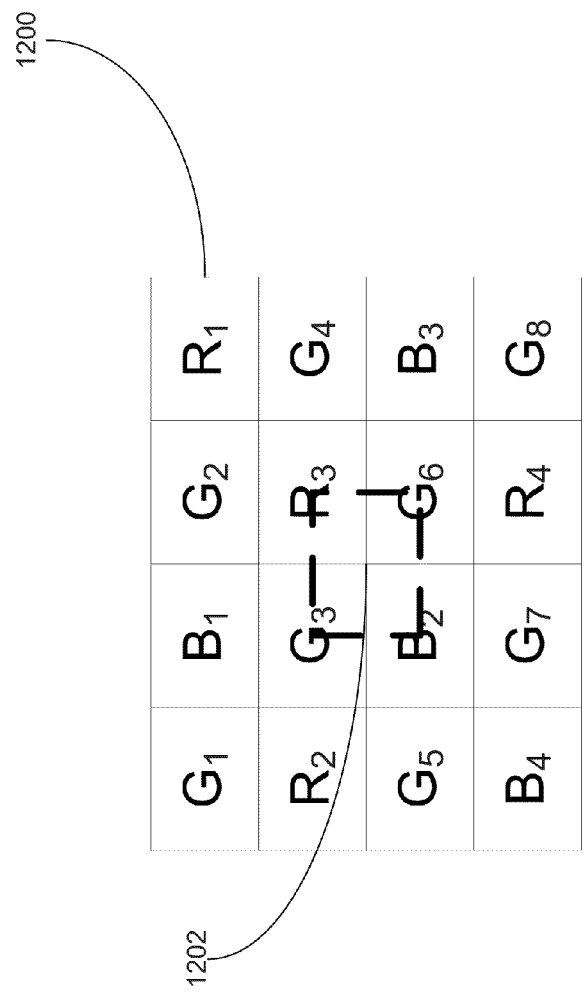
FIG. 12 conceptually illustrates one of many virtual viewpoints that can be defined with respect to a 4×4 array camera in accordance with an embodiment of the invention.

While much of the discussion provided above describes the generation of depth maps with respect to images captured by a reference camera, systems and methods in accordance with embodiments of the invention can synthesize images from virtual viewpoints. A virtual viewpoint is a reference viewpoint that does not correspond to the viewpoint of any cameras within a camera array. Accordingly, irrespective of the number of color channels within a camera array, none of the color channels include a camera in which image data is captured from the reference viewpoint. An example of a virtual viewpoint that can be defined in accordance with an embodiment of the invention is illustrated in FIG. 12. The array camera module 1200 includes a 4×4 array of cameras including 8 Green cameras, 4 Red cameras, and 4 Blue cameras. A virtual camera 1202 is defined with a virtual viewpoint at the center of the array camera module. Although a specific virtual viewpoint is illustrated in FIG. 12, any virtual viewpoint can be arbitrarily defined with respect to the cameras within a camera array.

When determining a virtual viewpoint depth map, there is no explicit reference camera which can be searched and used for cost metric comparisons. In many embodiments, the depth of a given pixel (x, y) in an image synthesized from the virtual viewpoint is determined by calculating the effective baseline from the virtual imager with respect to all other cameras in the array. The baseline for a camera at position (i,j) with respect to the virtual viewpoint would be $(i,j)-(i_v,j_v)$ where $(i_v,j_v)$ is the location of the virtual viewpoint 1202. Once the baselines between the individual cameras is determined with respect to the virtual viewpoint, the process of estimating depth proceeds by searching for depths at which corresponding pixels having the highest similarity. For each pixel (x, y) in the virtual reference camera (i.e. an image from the virtual viewpoint), the search can proceed much as in the typical parallax scenario, where for each depth d, the disparity with respect to each of the alternate view cameras is determined at that depth, and then the similarity of corresponding pixels in one or more of the color channels is determined using an appropriate cost metric. In many embodiments, the combination cost metric described above for determining the similarity of pixels in color channels that do not contain the reference camera can be utilized. In many embodiments, a camera adjacent the virtual viewpoint in a specific color channel can be used as a reference camera for the purpose of determining the similarity of the pixel in the chosen reference camera with corresponding pixels in image data captured by other cameras in the color channel. In many embodiments, a Green camera is chosen as a reference camera for the purpose of determining the similarity of corresponding Green pixels and a combination cost metric is used for corresponding pixels in other color channels. In many embodiments, the process of determining an initial depth map for the virtual viewpoint can involve forming groups of cameras corresponding to patterns of visibility within the scene in a similar manner to that described above with respect to FIGS. 8A-8I.

A depth map generated for a virtual viewpoint can be utilized to synthesize a high resolution image from a virtual viewpoint using a super-resolution process in accordance with embodiments of the invention. The primary difference in the synthesis of a high resolution image from a virtual viewpoint is that the high resolution grid is from a virtual viewpoint, and the pixels are fused to the high resolution grid using correspondences calculated with baselines which are with respect to the virtual view position and not a physical reference camera. In this case there is no physical reference camera having pixels that map regularly on the high resolution grid. As can be readily appreciated, processes for determining confidence maps for depth maps with respect to virtual viewpoints can be determined using similar accommodations related to analyzing the synthesized reference image or choosing an image close to the virtual viewpoint as a proxy for performing SNR and/or other related measurements. Although specific processes for generating depth maps with respect to virtual viewpoints are described above, any of a variety of processes incorporating the cost metrics and techniques outlined above can be utilized to generate depth estimates for virtual viewpoints in accordance with embodiments of the invention. Systems for performing parallax detection and correction and for generating depth maps in accordance with embodiments of the invention are discussed further below.

Systems for Performing Parallax Detection

Figure 16:
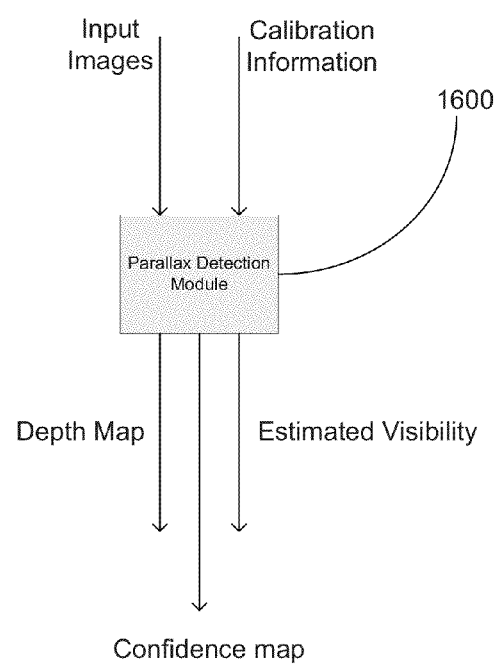
FIG. 16 is a system for generating a depth map and visibility information in accordance with an embodiment of the invention.

A system for generating a depth map and visibility information using processes similar to those described above is illustrated in FIG. 16. The system includes a parallax detection module 1600 that takes as an input captured images that form a light field and calibration information for an array camera and outputs a depth map, and the estimated visibility of the pixels of the captured images. In many embodiments, the parallax detection module 1600 also outputs a confidence map indicating the reliability of the depth measurements for specific pixels within the reference image. As is discussed further below, the depth map, estimated visibility information, and/or confidence map can be provided to a super-resolution processing module within an array camera to generate a higher resolution image from the captured images and to any of a variety of applications that can utilize depth, confidence and/or visibility information. In many embodiments, the parallax detection module and the super-resolution module are implemented in software and/or firmware on a microprocessor within the array camera. In several embodiments, the software associated with the parallax detection module and the super-resolution module is stored within memory within the array camera. In other embodiments, the parallax detection module and/or the super-resolution module can be implemented using any appropriately configured hardware and/or software. The generation of high resolution images from a light field captured by an array camera using a depth map generated in accordance with embodiments of the invention is discussed further below.

Super-Resolution Processing Using Depth Maps

As is noted in U.S. patent application Ser. No. 12/967,807 (incorporated by reference above) disparity between images can introduce significant artifacts when performing super-resolution processing. Therefore, the super-resolution processes disclosed in U.S. patent application Ser. No. 12/967,807 can involve applying scene dependent geometric corrections to the location of each of the pixels in the images captured by an array camera prior to using the images to synthesize a higher resolution image. The baseline and back focal length of the cameras in an array camera can be readily determined, therefore, the unknown quantity in estimating the scene dependent geometric shifts observed in the captured images is the distance between the array camera and different portions of the scene. When a depth map and visibility information is generated in accordance with the processes outlined above, the scene dependent geometric shifts resulting from the depths of each of the pixels can be determined and occluded pixels can be ignored when performing super-resolution processing. In many embodiments, a confidence map is generated as part of the process of generating a depth map and the confidence map is provided as an input to the super-resolution process to assist the super-resolution process in evaluating the reliability of depth estimates contained within the depth map when performing fusion of the pixels from the input images.

Figure 17:
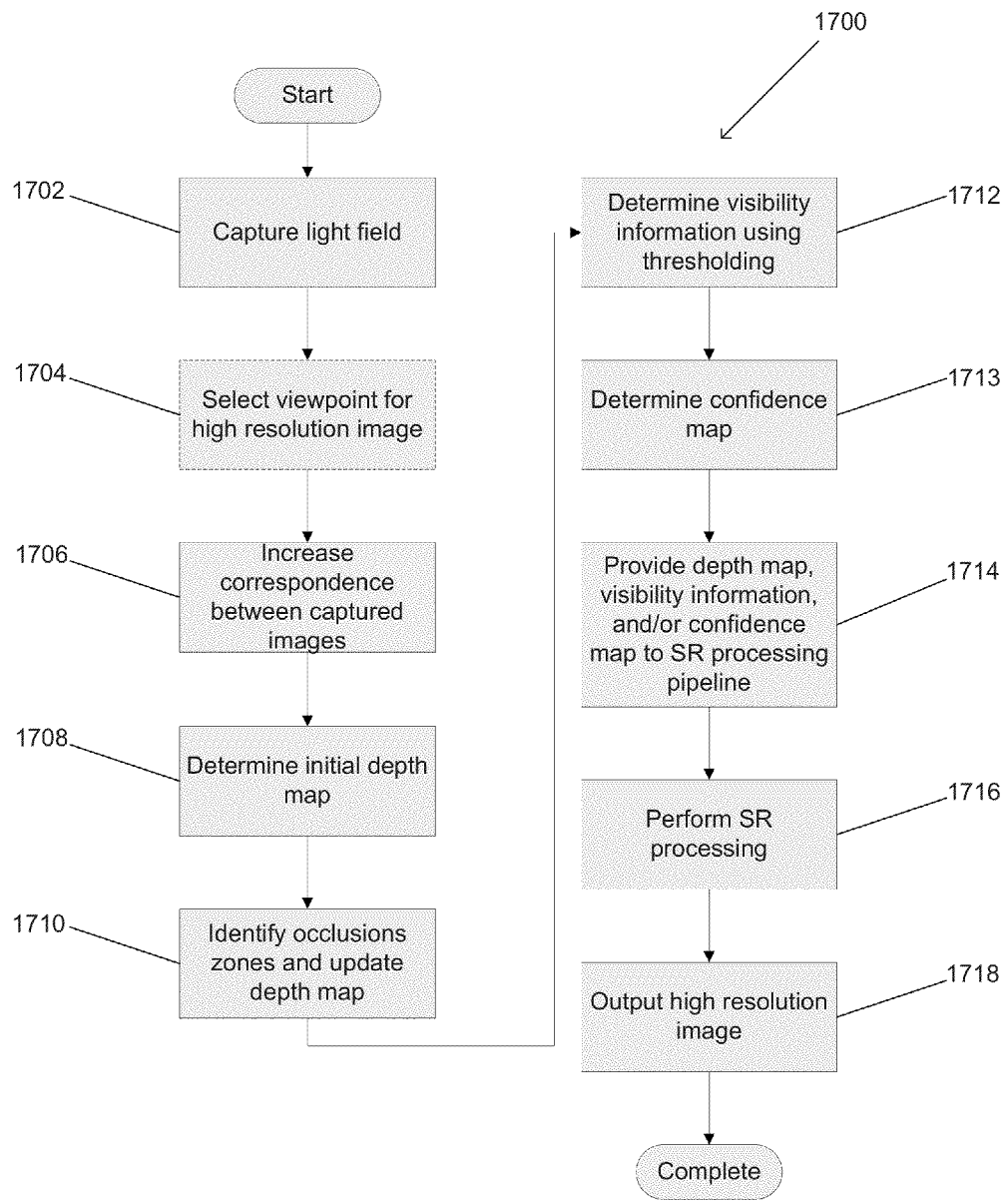
FIG. 17 is a flowchart illustrating a process for synthesizing a higher resolution image from a plurality of lower resolution images captured from different viewpoints using super-resolution processing in accordance with an embodiment of the invention.

A process for generating a high resolution image using a light field captured by an array camera involving the generation of a depth map in accordance with an embodiment of the invention is illustrated in FIG. 17. The process 1700 involves capturing (1702) a light field using an array camera and selecting (1704) a reference viewpoint that can be utilized to synthesize a high resolution image. In many embodiments, the reference viewpoint is predetermined based upon the configuration of the array camera. In a number of embodiments, calibration information is utilized to increase (1706) the correspondence between captured images. In many embodiments, the correspondence between captured images involves resampling the images. An initial depth map is determined (1708) and occlusions are determined and used to update (1710) the depth map. In several embodiments, the process of detecting occlusions and updating the depth map is iterative.

In a number of embodiments, the depth map is utilized to generate (1712) information concerning the visibility of the pixels within the captured light field from the reference viewpoint. In several embodiments, a confidence map is (optionally) generated (1713) with respect to the depth estimates contained within the depth map and the depth map, the visibility information, and/or the confidence map are provided (1714) to a super-resolution processing pipeline. In several embodiments, the super-resolution processing pipeline is similar to any of the super-resolution processing pipelines disclosed in U.S. patent application Ser. No. 12/967,807. The super-resolution processing pipeline utilizes information including the light field, the depth map, the visibility information, and the confidence map to synthesize (1718) a high resolution image from the reference viewpoint, which is output (1718) by the array camera. In several embodiments, the process of synthesizing a higher resolution image involves a pilot fusion of the image data from the light field onto a higher resolution grid. The result of the pilot fusion can then be utilized as a starting point to synthesize a higher resolution image using the super-resolution process.

As is described in U.S. patent application Ser. No. 12/967,807, the process illustrated in FIG. 17 can be performed to synthesize a stereoscopic 3D image pair from the captured light field. Although a specific process for synthesizing a high resolution image from a captured light field is illustrated in FIG. 17, any of a variety of processes for synthesizing high resolution images from captured light fields involving the measurement of the depth of pixels within the light field can be utilized in accordance with embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method of estimating distances to objects within a scene from a light field comprising a set of images captured from different viewpoints and within multiple color channels using a processor configured by an image processing application, the method comprising:

selecting a reference viewpoint relative to the viewpoints of the set of images captured from different viewpoints and within multiple color channels;

normalizing the set of images to increase the similarity of pixels from the set of images that correspond in a specific color channel from the multiple color channels;

determining depth estimates for pixel locations in an image from the reference viewpoint using at least a subset of the set of images, where a depth estimate for a given pixel location in the image from the reference viewpoint is determined by:

identifying pixels in the at least a subset of the set of images that correspond to the given pixel location in the image from the reference viewpoint based upon expected disparity at a plurality of depths;

in each of a plurality of color channels selected from the multiple color channels, comparing the similarity of the pixels that are identified as corresponding in the selected color channel at each of the plurality of depths; and selecting the depth from the plurality of depths at which the identified corresponding pixels in each of the plurality of color channels have the highest degree of similarity as a depth estimate for the given pixel location in the image from the reference viewpoint.

2. The method of claim 1, wherein a cost function is utilized to determine the similarity of the pixels identified as corresponding in the plurality of color channels.

3. The method of claim 2, wherein determining the similarity of corresponding pixels further comprises spatially filtering the calculated costs.

4. The method of claim 3, wherein the spatial filtering of the calculated costs utilizes a filter selected from the group consisting of:

a fixed-coefficient filter; and an edge-preserving filter.

5. The method of claim 4, wherein selecting the depth from the plurality of depths at which the identified corresponding pixels in each of the plurality of color channels have the highest degree of similarity as the depth estimate for the given pixel location in the image from the reference viewpoint further comprises selecting the depth from the plurality of depths at which the spatially filtered cost function for the identified corresponding pixels in each of the plurality of color channels indicates the highest level of similarity.

6. The method of claim 2, wherein the cost function is an aggregated cost function CV(x,y,d) over each image i within the images from the set of images that are in the same color channel as a reference image, where the cost function includes the following term $$\sum_i \frac{\text{Cost}^{i,Ref}(x, y, d) \times V^{i,Ref}(x, y)}{\text{number of images in which } (x, y) \text{ is visible}}$$

where $\text{Cost}^{i,Ref}$ (x,y,d) is a similarity measure (i.e. the cost function) for a pixel location (x, y) in the image from the reference viewpoint,
d is depth of pixel location (x, y), and
$V^{i,Ref}$ (x,y) is the visibility of pixel location (x, y) in image i.

7. The method of claim 6, wherein the individual costs $\text{Cost}^{i,Ref}$(x,y,d) are computed based on each disparity hypothesis d for the pixel location (x, y) in the image from the reference viewpoint (Ref) for the image i in the set of images in the same color channel as a reference image as follows:

$$\text{Cost}^{i,Ref}(x,y,d) = S\{I^i(x,y,d), I^{Ref}(x,y,d)\}$$

where S is a similarity measure, and
$I^i$ is the normalized image i from the set of images.

8. The method of claim 7, wherein the aggregated cost function is spatially filtered using a filter so that the weighted aggregated cost function is as follows:

$$FilteredCV(x, y, d) = \frac{1}{Norm} \sum_{\substack{(x_1, y_1) \\ \in N(x,y)}} CV(x_1, y_1, d) \times$$

$$wd(x, y, x_1, y_1) \times wr(I_{Ref}(x, y) - I_{Ref}(x_1, y_1))$$

where N(x, y) is the immediate neighborhood of the pixel location (x, y),
Norm is a normalization term,
wd is a weighting function based on pixel distance, and
wr is a weighting function based on intensity difference.

9. The method of claim 8, wherein the filter is a box filter and wd and wr are constant coefficients.

10. The method of claim 8, wherein the filter is a bilateral filter and wd and wr are both Gaussian weighting functions.

11. The method of claim 8, wherein a depth estimate for a pixel location (x, y) in the image from the reference viewpoint is determined by selecting the depth that minimizes the filtered cost at each pixel location in the depth map as follows:

$$D(x,y) = \text{argmin}\{FilteredCV(x,y,d)\}.$$

12. The method of claim 2, wherein the cost function incorporates the L1 norm of pixels from the multiple color channels.

13. The method of claim 2, wherein the cost function incorporates the L2 norm of pixels from the multiple color channels.

14. The method of claim 2, wherein:
the set of images are captured within multiple color channels including at least Red, Green and Blue color channels;
selecting a reference viewpoint relative to the viewpoints of the set of images captured from different viewpoints comprises selecting one of the images in the Green color channel as a Green reference image and selecting the viewpoint of the Green reference image as the reference viewpoint; and
the cost function Cost(x,y,d) for a pixel location (x, y) in the image from the reference viewpoint at a depth d is:

$$\text{Cost}(x, y, d) = \gamma_G(x, y) \cdot \text{Cost}_G(x, y, d) +$$
$$\gamma_R(x, y) \cdot \text{Cost}_R(x, y, d) + \gamma_B(x, y) \cdot \text{Cost}_B(x, y, d)$$

where $\text{Cost}_G$ (x,y,d) is the measure of the similarity of a pixel location (x, y) in the image from the reference viewpoint to corresponding pixels in locations within a set of Green images based upon the depth d,
$\text{Cost}_R$ (x,y,d) is the measure of the similarity of corresponding pixels in locations within a set of Red images determined based upon the depth d and the pixel location (x, y) in the image from the reference viewpoint,
$\text{Cost}_B$ (x,y,d) is the measure of the similarity of corresponding pixels in locations within a set of Blue images determined based upon the depth d and the pixel location (x, y) in the image from the reference viewpoint, and
$\gamma_G$, $\gamma_R$, and $\gamma_B$ are weighting factors for the Green, Red and Blue cost functions respectively.

15. The method of claim 14, wherein the $\text{Cost}_G$ (x,y,d) uses a similarity measure selected from the group consisting of an L1 norm, an L2 norm, and variance across the pixels in the images in the set of images that are within the Green color channel.

16. The method of claim 14, wherein the cost measures for the Red ($\text{Cost}_R$ (x,y,d)) and Blue color channels ($\text{Cost}_B$ (x,y,d)) are determined by calculating the aggregated difference between unique pairs of corresponding pixels in images within the color channel.

17. The method of claim 16, wherein calculating the aggregated difference between each unique pair of corresponding pixels in images within a color channel comprises determining a combination cost metric for unique pairs of corresponding pixels in images within the color channel.

18. The method of claim 17, wherein the combination cost metric ($\text{Cost}_R$ (x,y,d)) for a Red color channel including four images ($R_A$, $R_B$, $R_C$, and $R_D$) can be determined as follows:

$$\text{Cost}_R(x, y, d) = |R_A(x_a, y_A) - R_B(x_B, y_B)| + |R_A(x_A, y_A) - R_C(x_C, y_C)| +$$
$$|R_A(x_A, y_A) - R_D(x_D, y_D)| + |R_B(x_B, y_B) - R_C(x_C, y_C)| +$$
$$|R_B(x_B, y_B) - R_D(x_D, y_D)| + |R_C(x_C, y_C) - R_D(x_D, y_D)|$$

where $(x_A, y_A)$, $(x_B, y_B)$, $(x_C, y_C)$, and $(x_D, y_D)$ are corresponding pixel locations determined based upon the disparity in each of the images $R_A$, $R_B$, $R_C$, and $R_D$ respectively at depth d.

19. The method of claim 17, wherein the combination cost metric is determined utilizing at least one selected from the group consisting of:
the L1 norm of the pixel brightness values;
the L2 norm of the pixel brightness values; and
the variance in the pixel brightness values.

20. The method of claim 14, wherein the weighting factors $\gamma_G$, $\gamma_R$, and $\gamma_B$ are fixed.

21. The method of claim 14, wherein the weighting factors $\gamma_G$, $\gamma_R$, and $\gamma_B$ vary spatially with the pixel location (x, y) in the image from the reference viewpoint.

22. The method of claim 21, wherein:
the weighting factors $\gamma_G$, $\gamma_R$, and $\gamma_B$ vary based upon the estimated signal-to-noise ratio (SNR) at the pixel location (x, y) in the image from the reference viewpoint; and
strong SNR at the pixel location (x, y) in the image from the reference viewpoint is used to reduce the weighting applied to the Red and Blue color channels.

23. A method of synthesizing a higher resolution image from a light field comprising a set of lower resolution images captured from different viewpoints and within multiple color channels, the method comprising:
estimating distances to objects within a scene from the light field comprising a set of images captured from different viewpoints and within multiple color channels using a processor configured by an image processing application, the method comprising:
selecting a reference viewpoint relative to the viewpoints of the set of images captured from different viewpoints and within multiple color channels;
normalizing the set of images to increase the similarity of pixels from the set of images that correspond in a specific color channel from the multiple color channels;
determining depth estimates for pixel locations in an image from the reference viewpoint using at least a subset of the set of images, where a depth estimate for a given pixel location in the image from the reference viewpoint is determined by:
identifying pixels in the at least a subset of the set of images that correspond to the given pixel location in the image from the reference viewpoint based upon expected disparity at a plurality of depths;
in each of a plurality of color channels selected from the multiple color channels, comparing the similarity of the pixels that are identified as corresponding in the selected color channel at each of the plurality of depths; and
selecting the depth from the plurality of depths at which the identified corresponding pixels in each of the plurality of color channels have the highest degree of similarity as a depth estimate for the given pixel location in the image from the reference viewpoint
determining the visibility of the pixels in the set of images from the reference viewpoint by:
identifying corresponding pixels in the set of images using the depth estimates; and
determining that a pixel in a given image is not visible in the reference viewpoint when the pixel fails a photometric similarity criterion determined based upon a comparison of corresponding pixels within the color channel to which the pixel belongs; and
fusing pixels from the set of images using the processor configured by the image processing application based upon the depth estimates to create a fused image having a resolution that is greater than the resolutions of the images in the set of images by:
identifying the pixels from the set of images that are visible in an image from the reference viewpoint using the visibility information;
applying scene dependent geometric shifts to the pixels from the set of images that are visible in an image from the reference viewpoint to shift the pixels into the reference viewpoint, where the scene dependent geometric shifts are determined using the current depth estimates; and
fusing the shifted pixels from the set of images to create a fused image from the reference viewpoint having a resolution that is greater than the resolutions of the images in the set of images.

24. The method of claim 23, further comprising synthesizing an image from the reference viewpoint using the processor configured by the image processing application to perform a super-resolution process based upon the fused image from the reference viewpoint, at least a subset of the set of images captured from different viewpoints, the current depth estimates, and the visibility information.

25. An image processing system, comprising:
a processor;
memory containing a set of images captured from different viewpoints and within multiple color channels and an image processing application;
wherein the image processing application configures the processor to:
select a reference viewpoint relative to the viewpoints of the set of images captured from different viewpoints and within multiple color channels;
normalize the set of images to increase the similarity of corresponding pixels within the set of images that correspond in a specific color channel from the multiple color channels;
determine depth estimates for pixel locations in an image from the reference viewpoint using at least a subset of the set of images, where a depth estimate for a given pixel location in the image from the reference viewpoint is determined by:
identifying pixels in the at least a subset of the set of images that correspond to the given pixel location in the image from the reference viewpoint based upon expected disparity at a plurality of depths;
in each of a plurality of color channels selected from the multiple color channels, comparing the similarity of the pixels that are identified as corresponding in the selected color channel at each of the plurality of depths; and
selecting the depth from the plurality of depths at which the identified corresponding pixels in each of the plurality of color channels have the highest degree of similarity as a depth estimate for the given pixel location in the image from the reference viewpoint.

26. The image processing system of claim 25, wherein the image processing application further configures the processor to:
determine the visibility of the pixels in the set of images from the reference viewpoint by:
identifying corresponding pixels in the set of images using the finalized depth estimates; and
determining that a pixel in a given image is not visible in the reference viewpoint when the pixel fails a photometric similarity criterion determined based upon a comparison of corresponding pixels within the color channel to which the pixel belongs; and fuse pixels from the set of images using the depth estimates to create a fused image having a resolution that is greater than the resolutions of the images in the set of images by:
identifying the pixels from the set of images that are visible in an image from the reference viewpoint using the visibility information;
applying scene dependent geometric shifts to the pixels from the set of images that are visible in an image from the reference viewpoint to shift the pixels into the reference viewpoint, where the scene dependent geometric shifts are determined using the finalized depth estimates; and
fusing the shifted pixels from the set of images to create a fused image from the reference viewpoint having a resolution that is greater than the resolutions of the images in the set of images.

27. The image processing system of claim 25, where the image processing system is part of an array camera that further comprises a plurality of cameras having different viewpoints of a scene and the image processing application configures the processor to capture the plurality of images using the plurality of cameras.

28. The image processing system of claim 27, where the plurality of cameras include a plurality of different color filters so that the captured plurality of images form multiple color channels.

29. The image process system of claim 28, wherein the multiple color channels include Red, Green and Blue color channels.

30. The image processing system of claim 28, wherein each of the plurality of cameras includes a filter selected from the group consisting of one or more Blue filters, one or more Green filters, one or more Red filters, one or more shifted spectral filters, one or more near-IR filters, and one or more hyper-spectral filters.

* * * * *